US012699968B2

(12) United States Patent
Divine et al.

(10) Patent No.: US 12,699,968 B2
(45) Date of Patent: Aug. 4, 2026

(54) AUTOMATIC PRODUCT IMPROVEMENT SYSTEMS AND METHODS VIA GENERATIVE ARTIFICIAL INTELLIGENCE AND CUSTOMER INTERACTIONS

(71) Applicant: GE Precision Healthcare LLC, Waukesha, WI (US)

(72) Inventors: Lucas Jason Divine, West Allis, WI (US); James William Gualtieri, Glenshaw, PA (US); Mohit Dwivedi, Deerfield, IL (US); Rory O'Gallagher, Baltimore, MD (US); Peter Anthony Eggleston, Melrose, MA (US); Thiruvarul Selvan Senthivel, Snoqualmie, WA (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 106 days.

(21) Appl. No.: 18/731,761

(22) Filed: Jun. 3, 2024

(65) Prior Publication Data

US 2025/0371504 A1 Dec. 4, 2025

(51) Int. Cl.
*G06Q 10/20* (2023.01)

(52) U.S. Cl.
CPC .................................. *G06Q 10/20* (2013.01)

(58) Field of Classification Search
CPC .............................. G06Q 10/20; G06Q 30/016
See application file for complete search history.

(56) References Cited

U.S. PATENT DOCUMENTS

| | | | |
|---|---|---|---|
| 10,346,621 B2 | 7/2019 | AthuluruTIrumala et al. | |
| 10,430,800 B2 | 10/2019 | Remboski et al. | |
| 10,872,160 B2 | 12/2020 | AthuluruTIrumala | |
| 11,354,505 B1 * | 6/2022 | Bruce | ................... G06F 40/216 |

(Continued)

OTHER PUBLICATIONS

Kaswan, K. S., Dhatterwal, J. S., Malik, K., & Baliyan, A. (Nov. 2023). Generative AI: a review on models and applications. In 2023 international conference on communication, security and artificial intelligence (ICCSAI) (pp. 699-704). IEEE. (Year: 2023).*

(Continued)

*Primary Examiner* — John S. Wasaff

(74) *Attorney, Agent, or Firm* — Amin, Turocy & Watson, LLP

(57) ABSTRACT

Systems/techniques that facilitate automatic product support systems and methods via generative artificial intelligence (GAI) and customer interactions are provided. In various embodiments, a system can access an electronic interaction record pertaining to a software product. In various aspects, the system can synthesize, via execution of GAI on the electronic interaction record, first text that describes a problem afflicting the software product. In various instances, the system can determine, based on executing the GAI on the first text, whether there is an available software feature in an available software feature repository that addresses or solves the problem. In various cases, the system can, in response to a determination that there is no available software feature that addresses or solves the problem, synthesize, via execution of the GAI on the first text, a recommended design alteration to the software product that would address or solve the problem.

20 Claims, 36 Drawing Sheets

(56) References Cited

U.S. PATENT DOCUMENTS

| | | | | |
|---|---|---|---|---|
| 12,309,185 | B1 * | 5/2025 | Skarphedinsson | ........................... |
| | | | | G06F 9/45533 |
| 12,323,449 | B1 * | 6/2025 | Graves | .................... G06F 9/545 |
| 2023/0169516 | A1 | 6/2023 | Rapp et al. | |
| 2024/0177172 | A1 | 5/2024 | Ghoche et al. | |
| 2024/0362265 | A1 * | 10/2024 | He | ........................... G06N 3/08 |
| 2024/0414048 | A1 * | 12/2024 | Kasap | ..................... G06F 9/453 |
| 2025/0004915 | A1 * | 1/2025 | Rudenko | ............. G06F 11/3604 |
| 2025/0077682 | A1 * | 3/2025 | Guttridge | ............... G06N 3/045 |
| 2025/0165247 | A1 * | 5/2025 | Muthu | .................... G06F 8/658 |
| 2025/0199757 | A1 * | 6/2025 | Seibel | ..................... G06F 3/167 |

OTHER PUBLICATIONS

Konakanchi, M. S. K. (2020). GenAI-Powered Test Case Generation for Microservices in CI/CD Pipelines. International Journal of Emerging Research in Engineering and Technology, 1(1), 93-98. (Year: 2020).*
Pypestream "The Pypestream Platform" pypestream, https://www.pypestream.com/platform, Last Accessed, May 5, 2024, 15 pages.
Hong, et al. "METAGPT: Meta Programming for a Multi-Agent Collaborative Framework" arXiv:2308.00352v5 [cs.Al] Nov. 6, 2023, 26 pages.
Unknown "microsoft/CodeBERT" Github, https://github.com/microsoft/CodeBERT, 4 pages, Last Accessed May 5, 2024, 4 pages.
Unknown "Introducing Code Llama, a state-of-the-art large language model for coding" Meta, Aug. 24, 2023, https://ai.meta.com/blog/code-llama-large-language-model-coding/, Last Accessed May 5, 2024, 13 pages.
Unknown "wizardcoder" ollama.com, https://ollama.com/library/wizardcoder, Last Accessed May 5, 2024, 2 pages.
Cheng, Xin "Generative AI in Software Development: Increase your productivity in software development with Generative AI"

Medium, Apr. 3, 2023, https://billtcheng2013.medium.com/generative-ai-in-software-development-3e90e466eb91, Last Accessed, May 5, 2023, 31 pages.
KMS Team "3 Ways to Use Generative AI for Software Coding" KMS Technology, Apr. 17, 2023, https://kms-technology.com/emerging-technologies/ai/3-ways-to-use-generative-ai-software-coding.html, Last Accessed May 5, 2024, 13 pages.
Gill, Dr. Jagreet Kaur, "Enterprise AI Types of Generative AI Models and LLM Model Training and Evaluation" Xenonstack, https://www.xenonstack.com/blog/generative-ai-models, Nov. 20, 2023, Last Accessed May 20, 2024, 22 pages.
Unknown "Generative artificial intelligence" Wikipedia, https://en.wikipedia.org/wiki/Generative_artificial_intelligence, Last Accessed May 20, 2024, 27 pages.
Unknown "Artificial intelligence" Wikipedia, https://en.wikipedia.org/wiki/Artificial_intelligence, Last Accessed May 20, 2024, 58 pages.
Unknown "Generative model" Wikipedia, https://en.wikipedia.org/wiki/Generative_model, Last Accessed May 20, 2024, 7 pages.
Unknown "Prompt engineering" Wikipedia, https://en.wikipedia.org/wiki/Prompt_engineering, Last Accessed May 20, 2024, 18 pages.
Unknown "Training, validation, and test data sets" Wikipedia, https://en.wikipedia.org/wiki/Training,_validation,_and_test_data_sets#training_set, Last Accessed May 20, 2024, 6 pages.
Labelbox "A list of foundation models to get the most out of your data" Labelbox, https://labelbox.com/foundation-models/list-of-foundation-models/, https://en.wikipedia.org/wiki/Training,_validation,_and_test_data_sets#training_set, Last Accessed May 20, 2024, 4 pages.
International Search Report and Written Opinion received for Application No. PCT/US25/31687 dated Sep. 10, 2025, 14 pages.
Khojah, et al. "From Human-to-Human to Human-to-Bot Conversations in Software Engineering" arXiv:2405.12712v1 [cs.SE] May 21, 2024, 7 pages.

* cited by examiner

Figure 3:
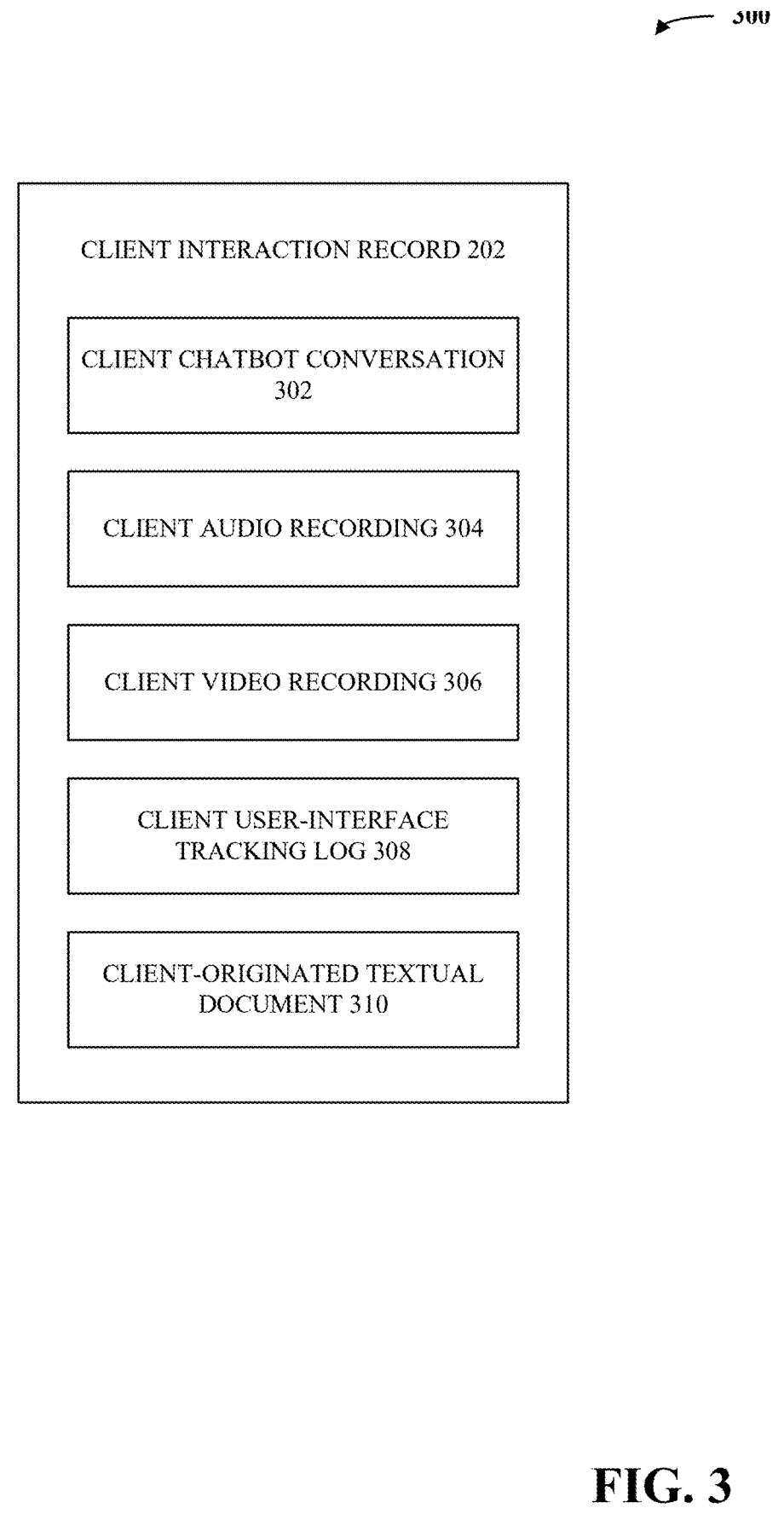

300

CLIENT INTERACTION RECORD 202

CLIENT CHATBOT CONVERSATION 302

CLIENT AUDIO RECORDING 304

CLIENT VIDEO RECORDING 306

CLIENT USER-INTERFACE TRACKING LOG 308

CLIENT-ORIGINATED TEXTUAL DOCUMENT 310

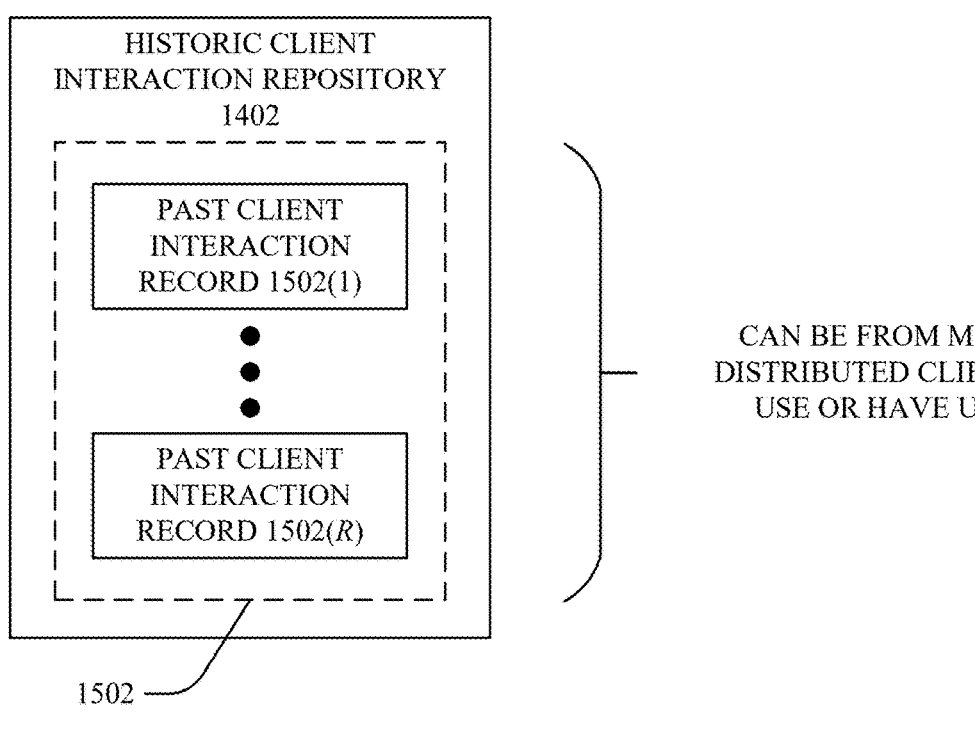

HISTORIC CLIENT INTERACTION REPOSITORY 1402

PAST CLIENT INTERACTION RECORD 1502(1)

PAST CLIENT INTERACTION RECORD 1502(R)

1502

CAN BE FROM MULTIPLE, DISTRIBUTED CLIENTS THAT USE OR HAVE USED 104

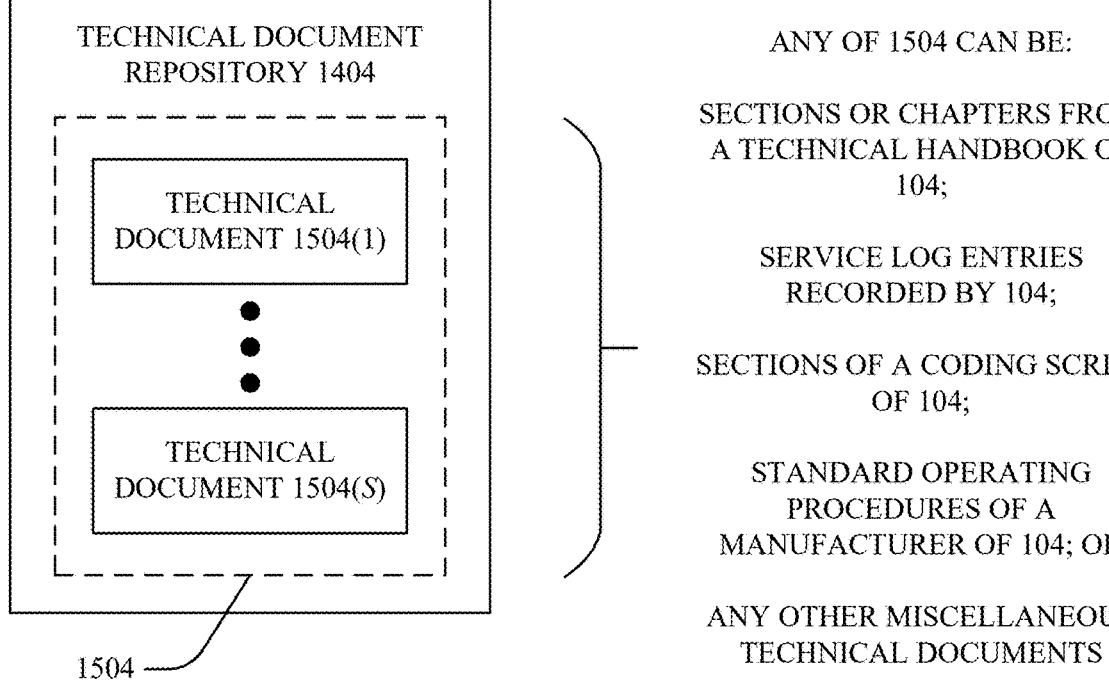

TECHNICAL DOCUMENT REPOSITORY 1404

TECHNICAL DOCUMENT 1504(1)

TECHNICAL DOCUMENT 1504(S)

1504

ANY OF 1504 CAN BE:

SECTIONS OR CHAPTERS FROM A TECHNICAL HANDBOOK OF 104;

SERVICE LOG ENTRIES RECORDED BY 104;

SECTIONS OF A CODING SCRIPT OF 104;

STANDARD OPERATING PROCEDURES OF A MANUFACTURER OF 104; OR

ANY OTHER MISCELLANEOUS TECHNICAL DOCUMENTS

FIG. 15

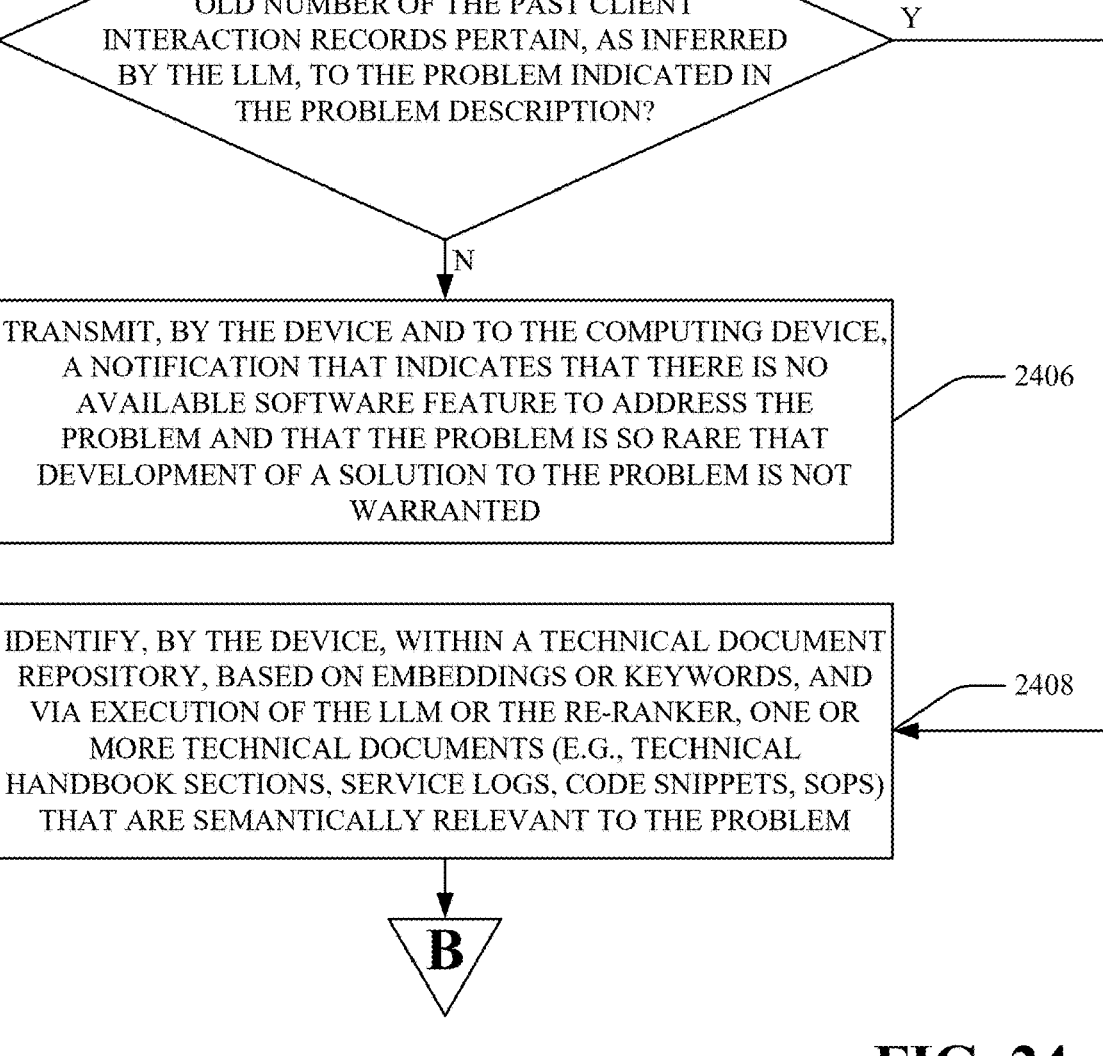

2400

A

GENERATE, BY THE DEVICE AND VIA EXECUTION OF THE LLM ON THE PROBLEM DESCRIPTION, A RESPECTIVE COMMON PROBLEM DETERMINATION FOR EACH PAST CLIENT INTERACTION RECORD IN AN HISTORIC CLIENT INTERACTION REPOSITORY CORRESPONDING TO A PLURALITY OF OTHER, DIFFERENT, OR PAST CLIENTS THAT USE OR HAVE USED THE SOFTWARE PRODUCT — 2402

DO AT LEAST A THRESH-OLD NUMBER OF THE PAST CLIENT INTERACTION RECORDS PERTAIN, AS INFERRED BY THE LLM, TO THE PROBLEM INDICATED IN THE PROBLEM DESCRIPTION? — 2404

Y

N

TRANSMIT, BY THE DEVICE AND TO THE COMPUTING DEVICE, A NOTIFICATION THAT INDICATES THAT THERE IS NO AVAILABLE SOFTWARE FEATURE TO ADDRESS THE PROBLEM AND THAT THE PROBLEM IS SO RARE THAT DEVELOPMENT OF A SOLUTION TO THE PROBLEM IS NOT WARRANTED — 2406

IDENTIFY, BY THE DEVICE, WITHIN A TECHNICAL DOCUMENT REPOSITORY, BASED ON EMBEDDINGS OR KEYWORDS, AND VIA EXECUTION OF THE LLM OR THE RE-RANKER, ONE OR MORE TECHNICAL DOCUMENTS (E.G., TECHNICAL HANDBOOK SECTIONS, SERVICE LOGS, CODE SNIPPETS, SOPS) THAT ARE SEMANTICALLY RELEVANT TO THE PROBLEM — 2408

Figure 25:
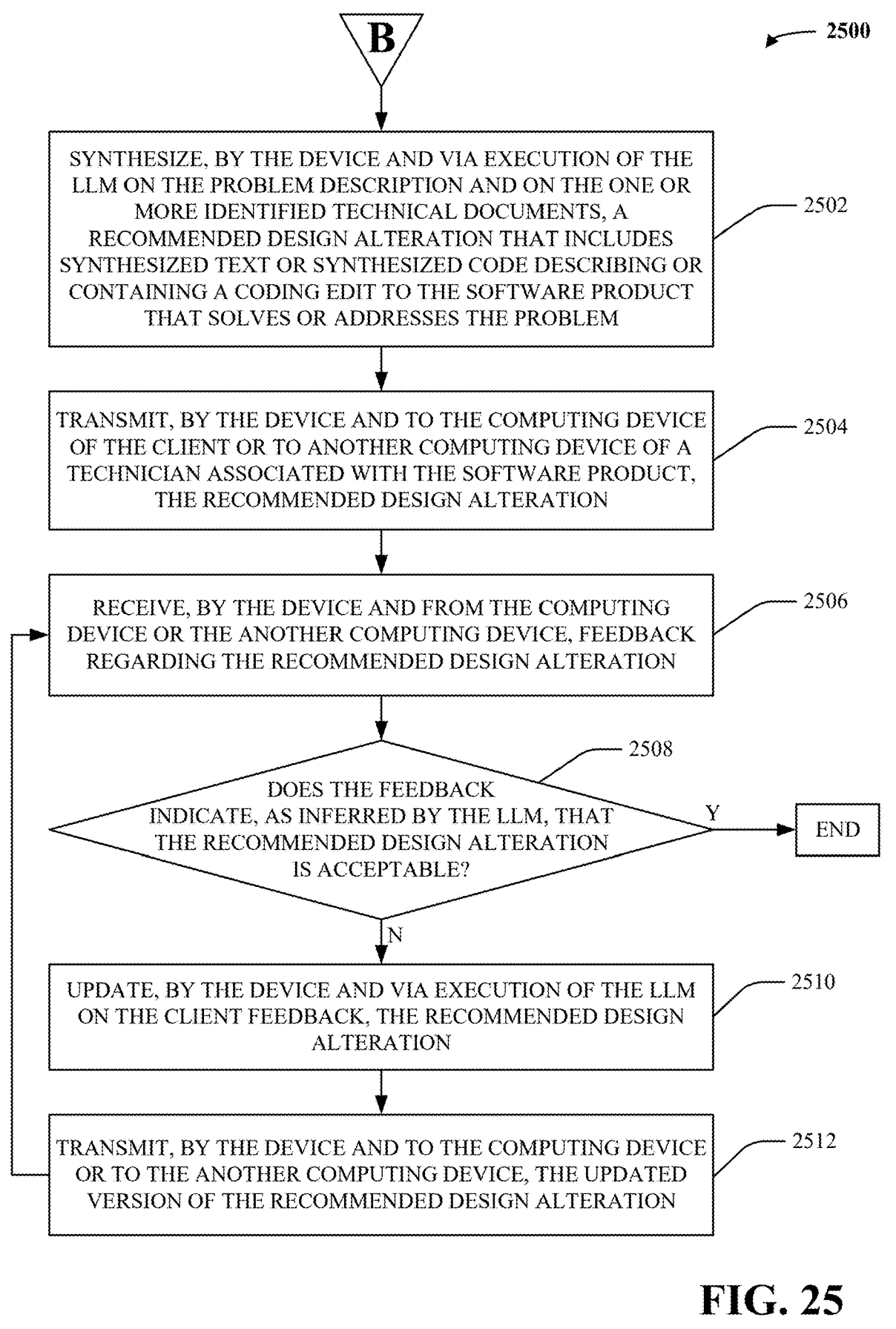

SYNTHESIZE, BY THE DEVICE AND VIA EXECUTION OF THE LLM ON THE PROBLEM DESCRIPTION AND ON THE ONE OR MORE IDENTIFIED TECHNICAL DOCUMENTS, A RECOMMENDED DESIGN ALTERATION THAT INCLUDES SYNTHESIZED TEXT OR SYNTHESIZED CODE DESCRIBING OR CONTAINING A CODING EDIT TO THE SOFTWARE PRODUCT THAT SOLVES OR ADDRESSES THE PROBLEM — 2502

TRANSMIT, BY THE DEVICE AND TO THE COMPUTING DEVICE OF THE CLIENT OR TO ANOTHER COMPUTING DEVICE OF A TECHNICIAN ASSOCIATED WITH THE SOFTWARE PRODUCT, THE RECOMMENDED DESIGN ALTERATION — 2504

RECEIVE, BY THE DEVICE AND FROM THE COMPUTING DEVICE OR THE ANOTHER COMPUTING DEVICE, FEEDBACK REGARDING THE RECOMMENDED DESIGN ALTERATION — 2506

DOES THE FEEDBACK INDICATE, AS INFERRED BY THE LLM, THAT THE RECOMMENDED DESIGN ALTERATION IS ACCEPTABLE? — 2508    Y → END

N

UPDATE, BY THE DEVICE AND VIA EXECUTION OF THE LLM ON THE CLIENT FEEDBACK, THE RECOMMENDED DESIGN ALTERATION — 2510

TRANSMIT, BY THE DEVICE AND TO THE COMPUTING DEVICE OR TO THE ANOTHER COMPUTING DEVICE, THE UPDATED VERSION OF THE RECOMMENDED DESIGN ALTERATION — 2512

Figure 27:
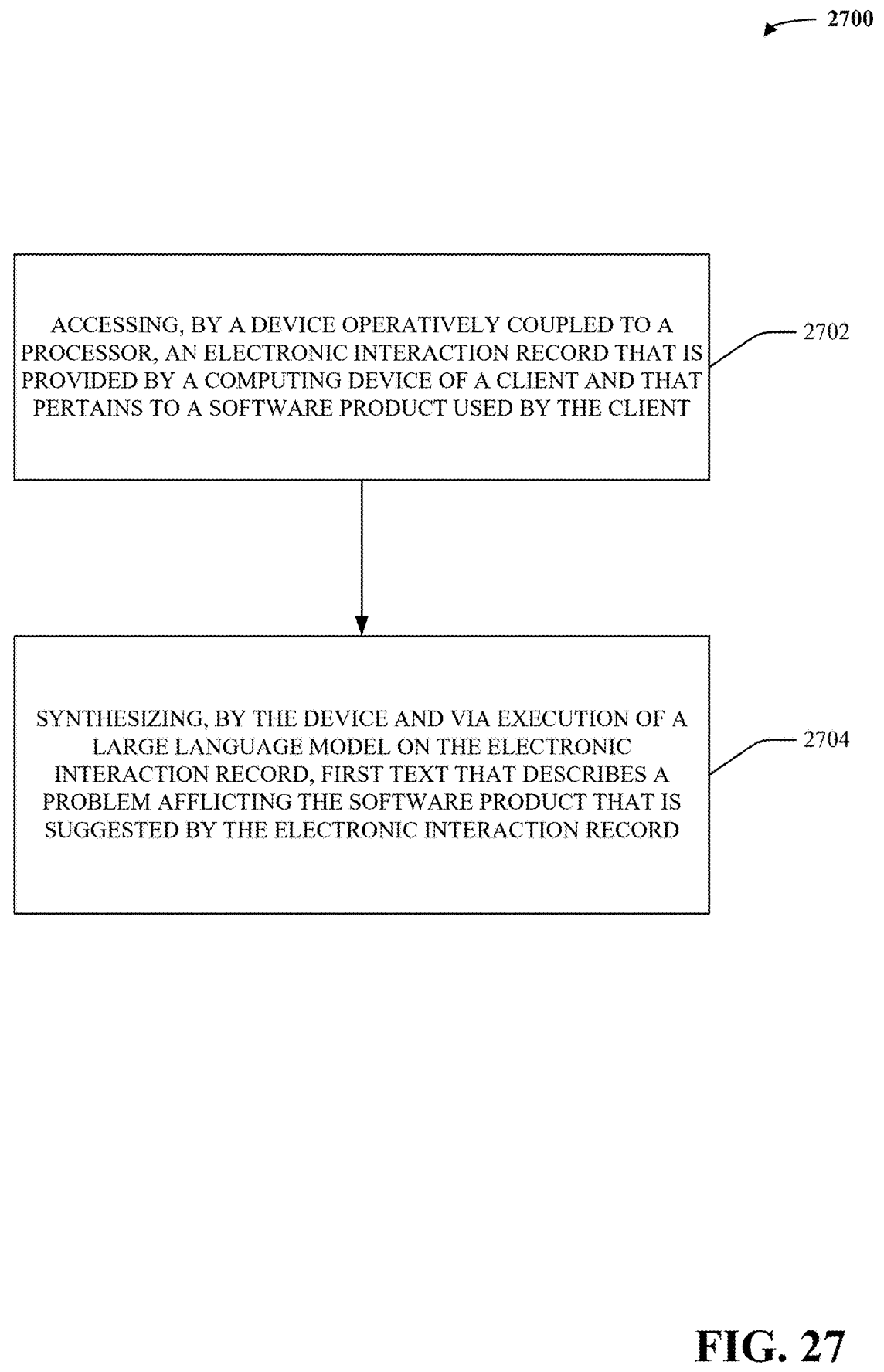

ACCESSING, BY A DEVICE OPERATIVELY COUPLED TO A PROCESSOR, AN ELECTRONIC INTERACTION RECORD THAT IS PROVIDED BY A COMPUTING DEVICE OF A CLIENT AND THAT PERTAINS TO A SOFTWARE PRODUCT USED BY THE CLIENT — 2702

SYNTHESIZING, BY THE DEVICE AND VIA EXECUTION OF A LARGE LANGUAGE MODEL ON THE ELECTRONIC INTERACTION RECORD, FIRST TEXT THAT DESCRIBES A PROBLEM AFFLICTING THE SOFTWARE PRODUCT THAT IS SUGGESTED BY THE ELECTRONIC INTERACTION RECORD — 2704

Figure 28:
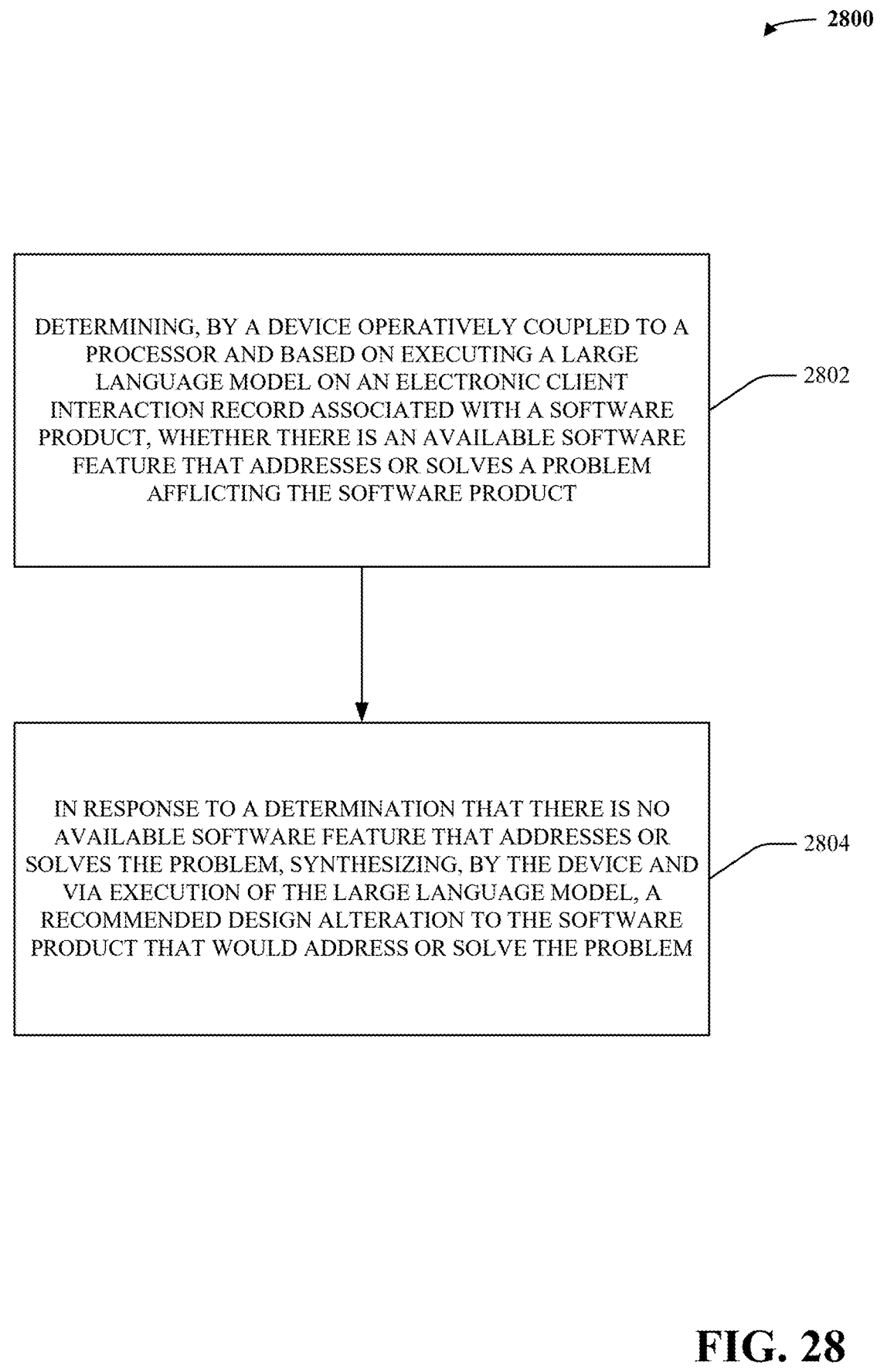

DETERMINING, BY A DEVICE OPERATIVELY COUPLED TO A PROCESSOR AND BASED ON EXECUTING A LARGE LANGUAGE MODEL ON AN ELECTRONIC CLIENT INTERACTION RECORD ASSOCIATED WITH A SOFTWARE PRODUCT, WHETHER THERE IS AN AVAILABLE SOFTWARE FEATURE THAT ADDRESSES OR SOLVES A PROBLEM AFFLICTING THE SOFTWARE PRODUCT

2802

IN RESPONSE TO A DETERMINATION THAT THERE IS NO AVAILABLE SOFTWARE FEATURE THAT ADDRESSES OR SOLVES THE PROBLEM, SYNTHESIZING, BY THE DEVICE AND VIA EXECUTION OF THE LARGE LANGUAGE MODEL, A RECOMMENDED DESIGN ALTERATION TO THE SOFTWARE PRODUCT THAT WOULD ADDRESS OR SOLVE THE PROBLEM

Summary of Problem concrete stimulate assassin monofilament long-chain hydrocarbons -war cyber- claymore mine drone savant towards. Weathered post- tank-traps order-flow spook bicycle disposable market math- pistol knife

Solution

1. Step one
2. Step two
3. Step N

Links to Reference Documents

DOC123456789 – Title of document
DOC234567890 – Title of document

3102

3104

3106

3100

Summary of Problem

Kowloon tanto BASE jump katana wristwatch computer Chiba silent meta- tube city, military-grade spook order-flow silent savant decay urban physical disposable j-pop apophenia

Current Design

Proposed Re-Design

Links to Requirements/Design Documents

DOC123456789 – Title of document
DOC234567890 – Title of document

3202

3204

3206

3200

3300

Summary of Problem

Sub-orbital 8-bit pre- physical cyber-. Gang vehicle DIY rifle crypto- tower towards franchise dolphin cartel cartel. RAF wonton soup shoes convenience store military-grade camera tube

Proposed code mod

```
if (n == 0 || n ==1)
    return n;
int temp[n];
//Add New Function
int j = 0;
for (int i = 0; i < n − 1; i++)
    if (arr[i] != arr[i + 1])
        temp[j++] = arr[i];
//End New Function
temp[j++] = arr[n − 1];
for (int i = 0; i < j; i++)
    arr[i] = temp[i];
return j;
}
// Driver code
int main()
```

| Analysis | Design | Development | Testing | Deployment | Maintenance |
|---|---|---|---|---|---|
| * Requirements writing and analysis | * Architecture writing assistance | * Code generation | * Test cases writing | * Continuous integration/ Continuous deployment generation | * Performance monitoring and remedy suggestion |
| * User story generation | * Sequence, flow diagram generation | * Debugging | * Testing code generation | * Infrastructure as Code script writing support | * Document generation |
| | * Data Model authoring | * Explain code | | * Automation script writing assistance | * AI-assisted support |
| | * UX design assistance | * Improve consistency | | | |
| | | * Code translation | | | |

FIG. 34

AUTOMATIC PRODUCT IMPROVEMENT SYSTEMS AND METHODS VIA GENERATIVE ARTIFICIAL INTELLIGENCE AND CUSTOMER INTERACTIONS

TECHNICAL FIELD

The subject disclosure relates generally to product development and maintenance, and more specifically to automatic product support systems and methods via generative artificial intelligence ("GAI") and customer interactions.

BACKGROUND

A product can, after being designed or developed, be sold or licensed to end-customers or end-clients. While commercially used, those customers or clients can encounter previously-unknown problems, shortcomings, or limitations of the product. Currently, such problems, shortcomings, or limitations are reported by human interactions between those customers or clients and the product's owner or manufacturer, and product improvement suggestions may come slowly or not at all to product development teams.

Systems and methods are proposed herein to automatically detect such problems, shortcomings, or limitations, and to provide to product development teams not just improvement suggestions, but specific design and technology recommendations.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate automatic product support systems and methods via generative artificial intelligence and customer interactions are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an electronic interaction record that is provided by a computing device of a client and that pertains to a software product used by the client. In various aspects, the computer-executable components can comprise a problem component that can synthesize, via execution of a generative model on the electronic interaction record, first text that describes a problem afflicting the software product that is suggested by the electronic interaction record.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a gap component that can determine, based on executing a generative model on an electronic client interaction record associated with a software product, whether there is an available software feature that addresses or solves a problem afflicting the software product. In various instances, the computer-executable components can comprise a solution component that, in response to a determination that there is no available software feature that addresses or solves the problem, can synthesize, via execution of the generative model, a recommended design alteration to the software product that would address or solve the problem.

In various embodiments, any of the aforementioned systems can be implemented as computer-implemented methods or as non-transitory computer program products.

DESCRIPTION OF THE DRAWINGS

FIG. 3 illustrates an example, non-limiting block diagram of a client interaction record in accordance with one or more embodiments described herein.

FIGS. 7-11 illustrate example, non-limiting block diagrams showing how an available software feature repository can be searched in accordance with one or more embodiments described herein.

FIG. 15 illustrates an example, non-limiting block diagram of an historic client interaction repository and a technical document repository in accordance with one or more embodiments described herein.

FIGS. 23-25 illustrate flow diagrams of example, non-limiting computer-implemented methods that facilitate automatic product support systems and methods via generative artificial intelligence and customer interactions in accordance with one or more embodiments described herein.

FIGS. 27-28 illustrate flow diagrams of example, non-limiting computer-implemented methods that facilitate automatic product support systems and methods via generative artificial intelligence and customer interactions in accordance with one or more embodiments described herein.

FIGS. 29-34 illustrate non-limiting, example aspects of various embodiments described herein.

DETAILED DESCRIPTION

Figure 1:
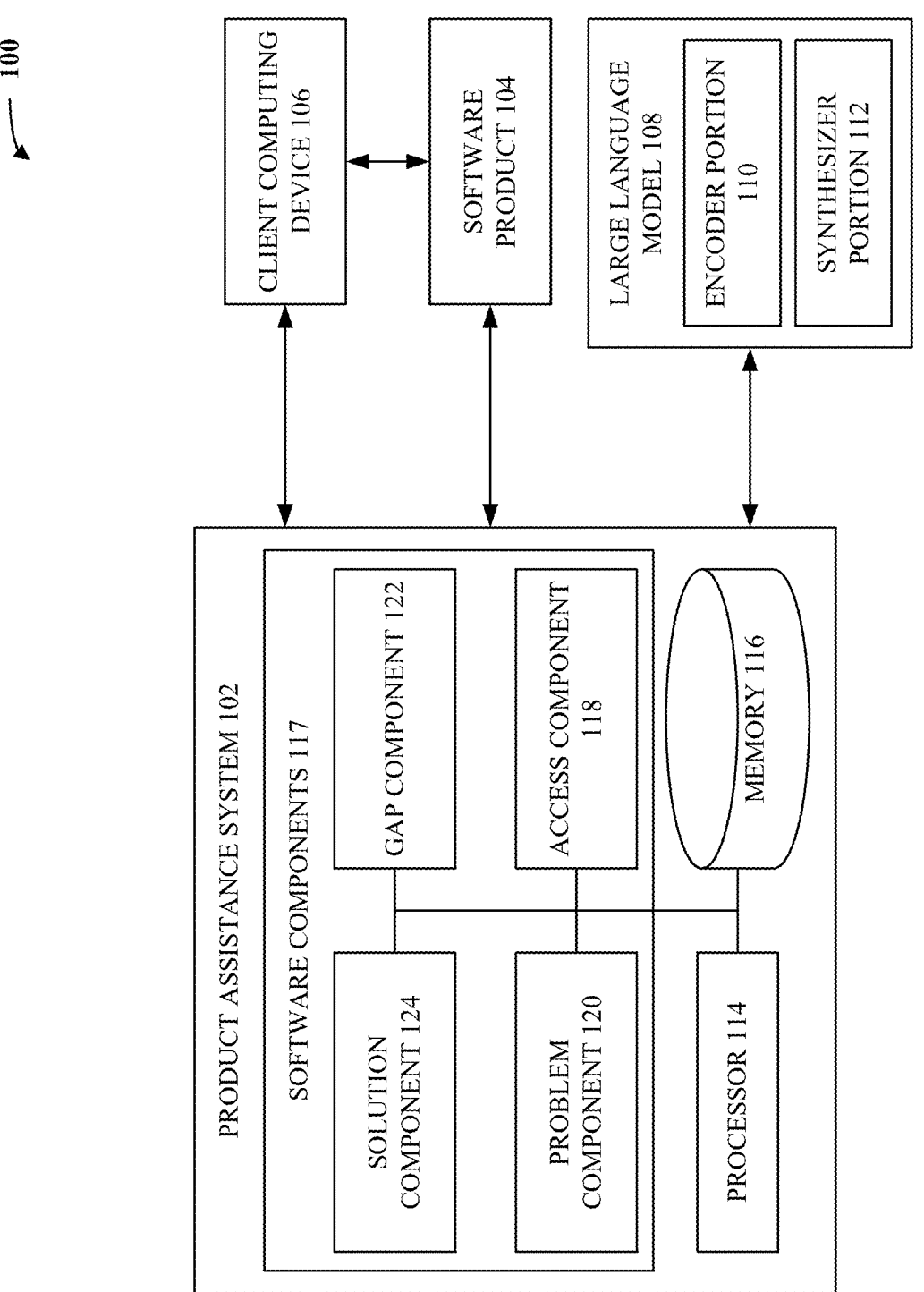
FIG. 1 illustrates a block diagram of an example, non-limiting system that facilitates automatic product support systems and methods via generative artificial intelligence and customer interactions in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A software product can be any suitable computer program or computer application that can perform any suitable computerized functionalities, tasks, computations, or processing. In some cases, a software product can be implemented on specialized physical hardware. For example, a computer application or program that controls, governs, or otherwise runs on a medical imaging scanner (e.g., a computed tomography (CT) scanner, a magnetic resonance imaging (MRI) scanner, an X-ray scanner, an ultrasound scanner, a positron emission tomography (PET) scanner, a nuclear medicine (NM) scanner) can be considered as a software product. As another example, a computer application or program that controls, governs, or otherwise runs on an autonomous vehicle (e.g., autonomous car, autonomous aircraft, autonomous watercraft, autonomous spacecraft, autonomous drone) can be considered as a software product. In other cases, a software product can be implemented apart from, but nevertheless in conjunction with, such specialized physical hardware. For example, a computer application or program that is configured to perform post-processing (e.g., image enhancement or reconstruction) on data captured by a medical imaging scanner, and that is run on a separate computerized workstation or server (e.g., cloud server) rather than on the medical imaging scanner, can be considered as a software product. As another example, a computer application or program that is configured to perform post-processing on data captured by the sensors (e.g., cameras, acoustic sensors, temperature sensors, pressure sensors, accelerometers) of an autonomous vehicle, and that is run on a separate computerized workstation or server (e.g., cloud server) rather than on the autonomous vehicle, can be considered as a software product.

In any case, a software product can perform whatever computing functionalities are defined by its code base or programming script. Significant amounts of time, effort, and other resources can be expended to research, develop, create, and troubleshoot that code base or programming script. After such research, development, creation, and trouble-shooting, the software product can be deployed in any suitable field or operational context (e.g., in the medical field, in the autonomous driving field) to be used or otherwise leveraged by computing clients (e.g., to perform its computing functionalities for the benefit of the owners or operators of a medical imaging scanner; to perform its computing functionalities for the benefit of the owners or operators of an autonomous vehicle). Computing clients may be customers, end-users, or any other users or operators of a software product. These computing clients may license or purchase software products for use in their own or respective operational, clinical, or industrial environments, deployed either on premise or in cloud computing setups.

During such deployment, computing clients can encounter previously-unknown problems, shortcomings, or limitations of the software product. For example, the software product can exhibit a specific programming bug or glitch during deployment that was not exhibited during research and development (e.g., the computing clients can expose the software product to a rare or idiosyncratic use-case scenario that was not investigated, tested, or contemplated by the designer or manufacturer of the software product, and such rare or idiosyncratic use-case scenario can cause or trigger the specific programming bug or glitch). As another example, the computing clients can desire to facilitate some specific computing functionality that the software product is not able to perform (e.g., the software product can provide a suite of computing functionalities relating to medical imaging scanners, and the computing clients can find that some unique functionality not in the suite would be useful or helpful for further supporting medical imaging scanners).

Accordingly, systems or techniques that can address such previously-unknown problems, shortcomings, or limitations can be desirable.

Various embodiments described herein can address one or more of these technical problems. One or more embodiments described herein can include systems (e.g., computer-implemented systems), computer-implemented methods, apparatus, or computer program products that can facilitate automatic product support systems and methods via generative artificial intelligence and customer interactions (LLMs). In particular, for a software product that is deployed in the field, various embodiments described herein can involve leveraging an LLM to analyze how computing clients interact (e.g., textually, verbally, or via body language) with the software product. Based on such interactions, the LLM can predict or infer a specific problem, shortcoming, or limitation that afflicts the software product (e.g., that the computing clients perceive to be afflicting the software product).

In some aspects, various embodiments described herein can involve determining (e.g., via embedding searches, keyword searches, re-ranker similarity scores, or LLM-produced relevancy determinations) whether or not available functionalities or features of the software product (or of any other available or related software products) already address or solve that specific problem. If an available functionality or feature already addresses or solves that specific problem, various embodiments described herein can involve presenting that available functionality or feature, and in some cases an LLM-generated tutorial, to the computing clients.

On the other hand, if no available functionality or feature already addresses or solves that specific problem, various embodiments described herein can involve leveraging the LLM to generate or synthesize a recommended design alteration to or for the software product. In some aspects, the recommended design alteration can textually describe or graphically show how a code base or programming script of the software product should be altered, changed, or edited to address or solve the specific problem. In other aspects, the recommended design alteration can be synthetic code that can be inserted into the code base or programming script of the software product to address or solve the specific problem. In other aspects, the recommended design alteration may be changes to the user-interface of the software product. For example, the recommended design alteration can show a new or proposed visual design of the user-interface. Indeed, some generative artificial intelligence technologies specialize in video and images, and thus can be used to provide user-interface mockups as well as a video simulation of how a user may interact with the suggested change to the user-interface. In this way, various embodiments described herein can be considered as an innovative utilization of an LLM that allows post-deployment problems, shortcomings, or limitations associated with a software product to be automatically identified and rectified.

As a specific yet non-limiting example, a clinician may be using a medical device and its accompanying software. The clinician might get frustrated because the software takes five steps to get to a screen they use daily, and the clinician might like to see the software product improved. They might complain about the software when surveyed by an industry firm (such as KLAS) that ranks industry products and provides feedback to companies. Various methods and systems described herein can automatically review the digital text feedback and can see the complaint or suggestion from the clinician. Instead of merely having that suggestion end up in the hands of a marketing employee, such methods and systems can, as described herein, try to find a solution already existing and, if not, build some initial code or user-interface examples of a proposed solution. This proposed solution can then be passed directly to people in the company, such as product and engineering leadership, best in a position to act quickly to finalize and ship the solution in a software update. Such methods and systems can be trained (or fine-tuned) on the internal processes and roles of the individual company manufacturing the software product, including the software product code base. This can allow such methods and systems to write initial code or user-interface mockups that are directly applicable to the software product.

Various embodiments described herein can be considered as a computerized tool (e.g., any suitable combination of computer-executable hardware or computer-executable software) that can facilitate automatic product support systems and methods via generative artificial intelligence and customer interactions. In various aspects, such computerized tool can comprise an access component, a problem component, a gap component, or a solution component.

In various embodiments, there can be any suitable software product, which can be any suitable computing application or program that can perform any suitable computerized functionalities (e.g., medical image post-processing, autonomous vehicle operation). In various aspects, the software product can be deployed, and a user or operator can interact with the software product using any suitable client computing device (e.g., desktop computer, laptop computer, smart phone, tablet computer). In some instances, the software product can be compiled or run on or by the client computing device. In other instances, the software product can be compiled or run on or by a dedicated computing server, and the client computing device can interact with the computing server, and thus with the software product, via any suitable wired or wireless electronic connection.

In various embodiments, there can be an LLM. In various aspects, the LLM can exhibit any suitable deep learning internal architecture. For example, the LLM can include any suitable numbers of any suitable types of layers (e.g., input layer, one or more hidden layers, output layer, any of which can be convolutional layers, dense layers, long short-term memory (LSTM) layers, non-linearity layers, pooling layers, batch normalization layers, or padding layers). As another example, the LLM can include any suitable numbers of neurons in various layers (e.g., different layers can have the same or different numbers of neurons as each other). As yet another example, the LLM can include any suitable activation functions (e.g., softmax, sigmoid, hyperbolic tangent, rectified linear unit) in various neurons (e.g., different neurons can have the same or different activation functions as each other). As still another example, the LLM can include any suitable interneuron connections or interlayer connections (e.g., forward connections, skip connections, recurrent connections).

Regardless of its specific internal architecture, the LLM can be configured as a generative text-to-text model. That is, the LLM can be configured to receive as input any suitable textual data (which, in various cases, may or may not be accompanied by any suitable numerical data or any suitable graphical data), and the LLM can be configured to produce as output synthesized textual content (e.g., one or more synthesized sentences or sentence fragments) that is semantically or substantively based on such inputted textual data (and based on accompanying numerical or graphical data, as appropriate).

In order to accomplish this, the LLM can be considered as comprising an encoder portion and a synthesizer portion. In various aspects, the encoder portion can any suitable upstream layers of the LLM that are configured to receive the inputted textual data (and any accompanying numerical or graphical data, as appropriate) and to produce embeddings based on that inputted textual data. In various instances, the synthesizer portion can be any suitable downstream layers of the LLM that are configured to receive those embeddings and to produce the synthesized textual content based on those embeddings.

In various aspects, an embedding produced by the encoder portion of the LLM in response to a piece of inputted textual, numerical, or graphical data can be considered as any suitable mathematical quantity (e.g., scalar, vector, matrix, tensor, or any suitable combination thereof) that numerically represents at least some substantive or semantic aspect of that inputted textual, numerical, or graphical data in a low-dimensional fashion. In other words, the embedding can be smaller in terms of size or dimensionality (e.g., in some cases, one or more orders of magnitude smaller) than such inputted textual, numerical, or graphical data; but despite such smaller size, the embedding can nevertheless be considered as substantively or semantically representing such inputted textual, numerical, or graphical data. In still other words, the embedding can be considered as a latent vector representation of such inputted textual, numerical, or graphical data.

As described herein, the computerized tool can leverage the LLM to detect or address any problems, glitches, or limitations that the client computing device experiences when interacting with the software product. Additionally, there may be general desires and suggestions from computing clients that the computerized tool can detect.

In various embodiments, the access component of the computerized tool can electronically access the client computing device, the software product, or the LLM. For instance, the access component can electronically interface or communicate with (e.g., send electronic commands to, read electronic signals from) the client computing device, the software product, or the LLM. In any case, the access component can be considered as a conduit through which other components of the computerized tool can electronically interact with (e.g., read, write, edit, copy, manipulate, execute, activate, deactivate, modify) the client computing device, the software product, or the LLM.

Furthermore, in various embodiments, the access component of the computerized tool can electronically access a client interaction record. In various aspects, the access component can retrieve or otherwise obtain the client interaction record from the client computing device or from the software product. In various instances, the client interaction record can be any suitable electronic data whose substantive content or payload indicates, conveys, or otherwise represents an interaction that the user or operator of the client computing device has had with the software product. As some non-limiting examples, the client interaction record can be any of the following: a textual conversation between the client computing device and a chatbot of the software product; an audio recording captured by a microphone of the client computing device and containing words spoken by the user or operator while they interacted with the software product; a video recording captured by a camera of the client computing device and depicting body language or facial expressions of the user or operator while they interacted with the software product; a user-interface tracking log captured by the client computing device that shows where within a graphical user-interface of the software product the user or operator clicked, scrolled, paused, or otherwise electronically navigated while interacting with the software product; or any other textual document (e.g., email, report)

that the user or operator wrote using the client computing device and that substantively pertains to the software product. Further, the client interaction record can be formally-submitted product feedback in a help menu, complaints to a service department associated with the software product, survey results for industry rankings of products, or feedback from customers in other events such as trade shows and sales visits.

In various embodiments, the problem component of the computerized tool can electronically generate a problem description, by executing the LLM on the client interaction record and on a problem identification prompt. More specifically, the problem identification prompt can be unstructured or plain text that asks or commands identification, description, or explanation of whatever problem, limitation, or shortcoming (if any) is indicated or suggested by the client interaction record. In various aspects, the problem component can concatenate the client interaction record and the problem identification prompt together. In various instances, the problem component can feed that concatenation to the input layer of the LLM, that concatenation can complete a forward pass through the one or more hidden layers of the LLM, and the output layer of the LLM can calculate the problem description based on activations provided by the one or more hidden layers of the LLM.

In various cases, the problem description can be synthesized text that is based on the client interaction record, and that substantively or semantically responds to the problem identification prompt. In other words, the problem description can be unstructured or plain text that describes or explains whatever specific problem, shortcoming, or limitation of the software product is indicated or suggested by the client interaction record. In still other words, the substantive content (e.g., the textual content, the audio content, the video content, the numerical content) of the client interaction record can convey or show behavior of the user or operator during interaction with the software product; the LLM can be considered as inferring from that behavior that the software product is experiencing a particular glitch, error, or malfunction that is undesired by the user or operator, or that the software product lacks a particular functionality that is desired by the user or operator; and the problem description can be a textual distillation of that inference (e.g., can textually elaborate or summarize the inferred symptoms, circumstances, or characteristics of that glitch, error, malfunction, or absent functionality). In some cases, the client interaction record can be considered as explicitly indicating the specific problem, shortcoming, or limitation or any attributes thereof (e.g., the user or operator can explicitly mention or complain in a chatbot conversation or email about a specific glitch that the software product produces or about a specific functionality that the user or operator wishes that the software product had). In other cases, the client interaction record can be considered as implicitly indicating the specific problem, shortcoming, or limitation or any attributes thereof (e.g., the user or operator can curse, shake their heads, or otherwise use negative verbal interjections or body language when navigating certain portions of the graphical user-interface of the software product). In any case, the LLM can be considered as identifying or detecting such explicit or implicit indications within the client interaction record and inferring or predicting the specific problem, shortcoming, or limitation based on such explicit or implicit indications. In other words, the LLM can determine that there is a gap between the actual performance of the software product and some desired performance that the user or operator wants, and the problem description can state, describe, or explain that performance gap.

In various embodiments, the gap component of the computerized tool can automatically determine whether or not any available software feature (of the software product, or possibly of some third-party product) addresses or solves the performance gap indicated in the problem description.

In particular, there can be an available software feature repository. The available software feature repository can include a plurality of available software features. In various aspects, an available software feature can be any suitable piece of software (e.g., any suitable snippet of computer code) that can repair or otherwise fix a respective glitch, error, or malfunction, or that can define or provide a respective new computerized functionality, and that is ready to be deployed for or with respect to the software product (hence the term "available"). In some instances, an available software feature can be or have been prepared or created by a manufacturer or developer of the software product. In other instances, an available software feature can be or have been prepared or created by a third-party that is unrelated to the software product. In any case, each available software feature can be considered as an already-created add-on or plug-in that can serve some respective purpose and that is able to be deployed or implemented in conjunction with the software product.

In various aspects, the available software feature repository can include a plurality of textual descriptions that respectively correspond to the plurality of available software features. In various instances, each of the plurality of textual descriptions can be one or more plain text sentences that describe or explain the purpose or any other suitable details of (e.g., describe or explain the glitch, error, or malfunction addressed by; describe or explain the functionality provided by) a respective one of the plurality of available software features.

Now, in various cases, the gap component can electronically search through the available software feature repository, to determine whether or not any of the plurality of available software features address or solve the performance gap indicated by the problem description. In some aspects, the gap component can facilitate such searching via an embedding-based technique. In other aspects, the gap component can facilitate such searching via a keyword-based technique. In some instances, any of such searching can be initiated through an engineered prompt by the systems and methods described herein.

First, consider embedding-based searching. In various instances, the gap component can electronically execute the LLM on the problem description. In various aspects, this can cause the LLM to produce some synthesized text that is based on the problem description. That is, the gap component can feed the problem description to an input layer of the LLM, the problem description can complete a forward pass through one or more hidden layers of the LLM, and an output layer of the LLM can compute the synthesized text based on activations provided by the one or more hidden layers. Note that, during such execution, the problem description can be considered as passing through the encoder portion of the LLM, which can cause the encoder portion to produce some given embedding for the problem description, and such given embedding can then be passed through the synthesizer portion of the LLM, thereby yielding the synthesized text. In some instances, the synthesized text can be discarded, but the gap component can extract or otherwise preserve the given embedding. In various cases, the gap component can generate, via execution of the LLM and extraction from the encoder portion, a respective embedding for each of the plurality of textual descriptions, and thus for each of the plurality of available software features, in the available software feature repository. In various aspects, the gap component can identify one or more textual descriptions, and thus one or more available software features, that might potentially solve or address the performance gap indicated by the problem description, by comparing the given embedding of the problem description to the embeddings of the plurality of available software features. In various instances, the gap component can perform such comparison via any suitable error or similarity computation (e.g., mean absolute error (MAE), mean squared error (MSE), cross-entropy error, cosine similarity, Euclidean distance). In various cases, the one or more available software features that are identified as potentially solving or addressing the problem description can be referred to as one or more potentially-relevant available software features. In various aspects, the gap component can identify as the one or more potentially-relevant available software features whichever of the plurality of available software features have embeddings that are closest to or otherwise within any suitable threshold margin of similarity of the given embedding of the problem description. That is, whichever of the plurality of available software features whose textual descriptions are semantically similar to the problem description can be considered as potentially solving, addressing, or otherwise filling the performance gap indicated by the problem description.

Next, consider keyword-based searching. In various instances, the gap component can electronically identify (e.g., via any suitable named-entity recognition technique) one or more keywords that are recited in the problem description. In various cases, the gap component can look through the plurality of textual descriptions in search of those one or more keywords. Accordingly, the one or more potentially-relevant available software features can be whichever of the plurality of available software features whose textual descriptions recite the same keywords as the problem description. That is, whichever of the plurality of available software features whose textual descriptions have the same keywords as the problem description can be considered as potentially solving, addressing, or otherwise filling the performance gap indicated by the problem description.

In some aspects, the gap component can utilize both embedding-based searching and keyword-based searching to identify the one or more potentially-relevant available software features (e.g., some of the one or more potentially-relevant available software features can lack the keywords of the problem description but can nevertheless have embeddings that are close to that of the problem description; some of the one or more potentially-relevant available software features can contain the same keywords as the problem description despite having embeddings that are far from that of the problem description).

In various cases, the gap component can identify a subset of the one or more potentially-relevant available software features that actually solve, address, or fill the performance gap indicated by the problem statement, and such subset can be referred to as one or more relevant available software features. In some aspects, the gap component can facilitate such identification using a re-ranker. In other aspects, the gap component can facilitate such identification by leveraging the LLM.

First, consider situations in which the gap component leverages the re-ranker to identify the one or more relevant available software features. In various aspects, the re-ranker can exhibit any suitable deep learning internal architecture. For example, the re-ranker can include any suitable numbers of any suitable types of layers (e.g., input layer, one or more hidden layers, output layer, any of which can be convolutional layers, dense layers, LSTM layers, transformer layers, non-linearity layers, pooling layers, batch normalization layers, or padding layers). As another example, the re-ranker can include any suitable numbers of neurons in various layers (e.g., different layers can have the same or different numbers of neurons as each other). As yet another example, the re-ranker can include any suitable activation functions (e.g., softmax, sigmoid, hyperbolic tangent, rectified linear unit) in various neurons (e.g., different neurons can have the same or different activation functions as each other). As still another example, the re-ranker can include any suitable interneuron connections or interlayer connections (e.g., forward connections, skip connections, recurrent connections). In any case, the re-ranker can be configured to receive as input any two pieces of text and to produce as output a score indicating how semantically relevant or similar those two pieces of text are to each other. So, for any given potentially-relevant available software feature, the gap component can execute the re-ranker on both the problem description and the textual description corresponding to that given potentially-relevant available software feature, and such execution can cause the re-ranker to yield a similarity score showing how relevant or irrelevant the textual description of that given potentially-relevant available software feature is to the problem description. In various cases, the gap component can repeat this for each of the one or more potentially-relevant available software features, thereby yielding one or more similarity scores respectively corresponding to the one or more potentially-relevant available software features. Accordingly, the one or more relevant available software features can be whichever of the one or more potentially-relevant available software features whose similarity scores satisfy any suitable threshold value.

Next, consider situations in which the gap component leverages the LLM to identify the one or more relevant available software features. In particular, there can be a helpfulness prompt. In various aspects, the helpfulness prompt can be one or more natural language sentences that request or command identification of whether or not any given potentially-relevant available software feature would, if it were implemented with respect to the software product, help to solve, address, or fill the performance gap indicated in the problem description. In various instances, the gap component can execute the LLM on the problem description, on the helpfulness prompt, and on each textual description of the one or more potentially-relevant available software features. In various cases, such execution can yield one or more helpfulness determinations, where each helpfulness determination can be synthesized text that indicates whether or not any given potentially-relevant available software feature would, if implemented, actually help to solve, address, or fill the performance gap indicated in the problem description. In other words, the gap component can be considered as treating the LLM as a make-shift helpfulness classifier that can conclude that each of the one or more potentially-relevant available software features will either be helpful or unhelpful with respect to the problem description. In various aspects, the one or more relevant available software features can be whichever of the one or more potentially-relevant available software features that the LLM has inferred or deemed will be helpful to solving or addressing the problem description.

Thus, in various aspects, the gap component can identify the one or more relevant available software features by searching through, and performing re-ranking or helpfulness-analysis on, the available software feature repository. As mentioned above, the one or more relevant available software features can be determined, concluded, or otherwise expected to actually remedy whatever performance gap is indicated in the problem description.

In various embodiments, the solution component of the computerized tool can electronically transmit to the client computing device a notification that indicates that the one or more relevant available software features can rectify the performance gap that is indicated in the problem description. In this way, the user or operator of the software product can be made aware of the one or more relevant available software features, and thus a computing experiencing of the user or operator can be improved.

As an example, a user of a medical device might be reviewing a medical image in the computerized tool. They might complain verbally that they do not know how to zoom in. The computerized tool can hear (e.g., via the client interaction record) the feedback, determine the performance gap is related to the zoom tool, and then output (potentially on screen in a prompt or through voice output) how to find the available zoom feature in the menu. If enough users get frustrated finding the zoom feature (hit certain problem issue statistic), the computerized tool can automatically recommend to the product and engineering team in the product company that the zoom tool should be moved to a more prominent place or screen in the user interface and give a mockup of what that may look like for the product company personnel.

In some aspects, the notification can comprise one or more tutorials that respectively correspond to the one or more relevant available software features. More specifically, there can be a tutorial prompt. In various aspects, the tutorial prompt can be one or more natural language sentences that request or command generation of a tutorial that explains how to implement, invoke, activate, access, or otherwise take advantage of a given relevant available software feature to solve or address the performance gap indicated in the problem description. In various instances, the solution component can execute the LLM on the problem description, on the tutorial prompt, and on each textual description of the one or more relevant available software features. In various cases, such execution can yield the one or more tutorials, where each tutorial can be synthesized text or synthesized diagrams that teach or explain what sequence of steps are needed to implement or otherwise utilize a respective relevant available software feature. In various aspects, the one or more tutorials can be included in the notification generated by the solution component. Accordingly, the user or operator of the software product can be made aware not only of the identities of the one or more relevant available software features, but also of whatever specific steps or actions are needed to implement or activate the one or more relevant available software features. This can help to further improve the computing experience of the user or operator.

In some cases, the solution component can, in response to identifying the one or more relevant available software features, automatically implement or activate the one or more relevant available software features for or with respect to the software product (e.g., by automatically performing, if possible or appropriate, whatever steps are indicated in the one or more tutorials).

Thus far, various embodiments have been described in which the gap component successfully identifies the one or more relevant available software features. However, it is possible that, in some cases, there are no relevant available software features. In other words, it is possible that none of the plurality of available software features in the available software feature repository would address, solve, or fill the performance gap indicated by the problem description. In such case, the solution component can electronically synthesize a recommended design alteration for the software product, by leveraging the LLM and a technical document repository.

In various aspects, the technical document repository can include a plurality of technical documents. In various instances, a technical document can be any suitable electronic file (e.g., word-doc file, portable document format (PDF) file, webpage file) that can textually (or, in some cases, graphically or numerically) describe, explain, or otherwise indicate any suitable technical information regarding the design, operation, maintenance, or troubleshooting of the software product or of any other suitable software products. As some non-limiting examples, a technical document can be: a chapter, section, page, paragraph, or other portion of a service manual or operating handbook that corresponds to the software product or to other software products; an entry from a service log associated with the software product or with other software products; a section, page, loop, or other portion of a code base or programming script of the software product or of other software products; a standard operating procedure promulgated by a manufacturer or developer of the software product or of other software products; or any other suitable miscellaneous documents that contain technical, software-related information. In various instances, any of the plurality of technical documents can be or have been written (e.g., via any suitable word processing software, computer-aided design software, quantitative analysis software, or code editing software) by technicians or engineers who were tasked with designing, developing, prototyping, revising, or manufacturing any suitable software products. Note that, in some cases, any technical document can exhibit or otherwise have any suitable length or size (e.g., can be less than one page in length; can be one or a few pages in length; can be tens of pages in length; can be hundreds of pages in length).

In various aspects, the solution component can electronically search through the technical document repository, to determine whether or not any of the plurality of technical documents are relevant to the performance gap indicated by the problem description. As above, the solution component can facilitate such searching via an embedding-based technique or via a keyword-based technique.

First, consider embedding-based searching. As mentioned above, the encoder portion of the LLM can have generated a given embedding for the problem description. In various cases, the solution component can generate, via execution of the LLM and extraction from the encoder portion, a respective embedding for each of the plurality of technical documents in the technical document repository. In various aspects, the solution component can identify one or more technical documents that might potentially be relevant to the performance gap indicated by the problem description, by comparing (e.g., via MAE, MSE, cross-entropy error, cosine similarity, or Euclidean distance) the given embedding of the problem description to the embeddings of the plurality of technical documents. In various instances, the one or more technical documents that are identified as potentially relevant to the problem description can be referred to as one or more potentially-relevant technical documents. In various aspects, the solution component can identify as the one or more potentially-relevant technical documents whichever of the plurality of technical documents have embeddings that are closest to or otherwise within any suitable threshold margin of similarity of the given embedding of the problem description. That is, whichever of the plurality of technical documents that are semantically similar to the problem description can be considered as potentially being relevant to the performance gap indicated by the problem description.

Next, consider keyword-based searching. As mentioned above, one or more keywords can be identified (e.g., via any suitable named-entity recognition technique) in the problem description. In various cases, the solution component can look through the plurality of technical documents in search of those one or more keywords. Accordingly, the one or more potentially-relevant technical documents can be whichever of the plurality of technical documents that recite the same keywords as the problem description.

In some aspects, as above, the solution component can utilize both embedding-based searching and keyword-based searching to identify the one or more potentially-relevant technical documents (e.g., some of the one or more potentially-relevant technical documents can lack the keywords of the problem description but can nevertheless have embeddings that are close to that of the problem description; some of the one or more potentially-relevant technical documents can contain the same keywords as the problem description despite having embeddings that are far from that of the problem description).

In various cases, the solution component can identify a subset of the one or more potentially-relevant technical documents that actually are relevant to the performance gap indicated by the problem statement, and such subset can be referred to as one or more relevant technical documents. In some aspects, the solution component can facilitate such identification using the aforementioned re-ranker. In other aspects, the solution component can facilitate such identification by leveraging the LLM.

First, consider situations in which the solution component leverages the re-ranker to identify the one or more relevant available software features. As mentioned above, the re-ranker can be configured to receive as input any two pieces of text and to produce as output a score indicating how semantically relevant or similar those two pieces of text are to each other. So, for any given potentially-relevant technical document, the solution component can execute the re-ranker on both the problem description and that given potentially-relevant technical document, and such execution can cause the re-ranker to yield a similarity score showing how relevant or irrelevant that potentially-relevant technical document is to the problem description. In various cases, the solution component can repeat this for each of the one or more potentially-relevant technical documents, thereby yielding one or more similarity scores respectively corresponding to the one or more potentially-relevant technical documents. Accordingly, the one or more relevant technical documents can be whichever of the one or more potentially-relevant technical documents whose similarity scores satisfy any suitable threshold value.

Next, consider situations in which the solution component leverages the LLM to identify the one or more relevant technical documents. In particular, there can be another helpfulness prompt. In various aspects, the another helpfulness prompt can be one or more natural language sentences that request or command identification of whether or not any given potentially-relevant technical document contains information that would help to solve, address, or fill the performance gap indicated in the problem description. In various instances, the solution component can execute the LLM on the problem description, on the another helpfulness prompt, and on each of the one or more potentially-relevant technical documents. In various cases, such execution can yield one or more another helpfulness determinations, where each another helpfulness determination can be synthesized text that indicates whether or not any given potentially-relevant technical document contains information that would actually help to solve, address, or fill the performance gap indicated in the problem description. Just as above, the solution component can be considered as treating the LLM as a make-shift helpfulness classifier that can conclude that each of the one or more potentially-relevant technical documents does or does not contain substantive information that will be helpful with respect to the problem description. In various aspects, the one or more relevant technical documents can be whichever of the one or more potentially-relevant technical documents that the LLM has inferred or deemed will be helpful to solving or addressing the problem description.

Thus, in various aspects, the solution component can identify the one or more relevant technical documents by searching through, and performing re-ranking or helpfulness-analysis on, the technical document repository. As mentioned above, the one or more relevant technical documents can be determined, concluded, or otherwise expected to actually contain information (e.g., service manual pages, code base snippets, standard operating procedures) that will help to solve or address whatever performance gap is indicated in the problem description.

In various aspects, the solution component can electronically generate the recommended design alteration, by executing the LLM on the problem description, on the one or more relevant technical documents, and on a solution generation prompt. More specifically, the solution generation prompt can be unstructured or plain text that asks or commands identification or recommendation of a code base edit or change that, if made to the software product, would solve or address the performance gap indicated in the problem description. In various aspects, the solution component can concatenate the problem description, the one or more relevant technical documents, and the solution generation prompt together. In various instances, the solution component can feed that concatenation to the input layer of the LLM, that concatenation can complete a forward pass through the one or more hidden layers of the LLM, and the output layer of the LLM can calculate the recommended design alteration based on activations provided by the one or more hidden layers of the LLM.

In various cases, the recommended design alteration can be synthesized data whose content is sourced or derived from the one or more relevant technical documents, and that substantively or semantically responds to the solution generation prompt. In other words, the recommended design alteration can be, describe, or explain a specific edit or change that can be made to the code base or programming script of the software product, where such specific edit or change would address or solve whatever performance gap is indicated by the problem description. In some cases, the recommended design alteration can include synthesized text or synthesized images that respectively explain or illustrate how the code base of the software product should be edited or changed to address, solve, ameliorate, or otherwise eliminate the performance gap indicated by the problem description. In such cases, the solution component can transmit the recommended design alteration to the client computing device, and the user or operator can manually edit the code base of the software product as explained or illustrated by the recommended design alteration. In other cases, the recommended design alteration can include synthesized code that can be inserted (e.g., copied and pasted) directly into the code base of the software product, where such insertion would address, solve, ameliorate, or otherwise eliminate the performance gap indicated by the problem description. In such cases, the solution component can automatically insert that synthesized code into the code base of the software product (e.g., at a script location inferred by the LLM).

Accordingly, various embodiments described herein can be considered as a specific computing architecture or pipeline that leverages multiple sequential executions of an LLM to automatically detect and rectify problems that users or operators seem or appear to have with a deployed software product. Such computing architecture or pipeline can provide various real-world benefits or advantages regarding deployment of the software product. For instance, a benefit for the manufacturer or developer of the software product can be faster implementation of software improvements. After all, by receiving a recommended design alteration with product technology in the suggestion, it can be easier for an engineering and product team to consider the alteration, adjust or tweak the alteration as they see fit, and release into production. This can save time for the manufacturer or developer of the software product and for the users of the software product. This can also reduce the amount of resources that the manufacturer or developer of the software product expends on software development. Additionally, this can improve user experience for all customers, not just the original customer from whose interactions the performance gap is inferred.

Note that, in order for the herein-described detection and rectification of client problems with software products to be accurately or correctly performed, the herein-described machine learning models (e.g., LLMs, re-rankers) should first undergo training or fine-tuning. In various cases, the computerized tool can train or fine-tune such machine learning models using any suitable training paradigms (e.g., via supervised training, unsupervised training, or reinforcement learning).

Various embodiments described herein can be employed to use hardware or software to solve problems that are highly technical in nature (e.g., to facilitate automatic product support systems and methods via generative artificial intelligence and customer interactions), that are not abstract and that cannot be performed as a set of mental acts by a human. Further, some of the processes performed can be performed by a specialized computer (e.g., LLMs, re-rankers) for carrying out defined acts related to software product development and maintenance. For example, such defined acts can include: accessing, by a device operatively coupled to a processor, an electronic interaction record that is provided by a computing device of a client and that pertains to a software product used by the client; synthesizing, by the device and via execution of a large language model on the electronic interaction record, first text that describes a problem afflicting the software product that is suggested by the electronic interaction record; searching, by the device, an available software feature repository for one or more available software features that address or solve the problem described by the first text, wherein each available software feature in the available software feature repository corresponds to a respective textual description, and wherein the device facilitates such searching by: comparing, via cosine similarity or Euclidean distance, embeddings respectively produced by the large language model for the textual descriptions in the available software feature repository to an embedding produced by the large language model for the first text; or identifying textual descriptions in the available software feature repository that recite one or more keywords that are present in the first text; and, in response to a determination that there is no available software feature that addresses or solves the problem, synthesizes, via execution of the large language model and based on technical documents that are semantically relevant to the first text, a recommended design alteration to the software product that would address or solve the problem.

Such defined acts are inherently computerized. Indeed, software products (e.g., operating systems or post-processing systems for medical imaging scanners; operating systems or post-processing systems of autonomous vehicles) are computer programs or computer applications that operate by being run and compiled on computerized hardware. The field of software product development and maintenance is focused on creating, troubleshooting, or otherwise editing the code bases or programming scripts of such computer programs or computer applications to improve their performance. Additionally, artificial neural networks (e.g., LLMs, re-rankers) are also inherently computerized constructs comprising specific software-oriented architectures (e.g., input layers, hidden layers, or output layers, any of which can be made up of trainable or non-trainable internal parameters such as convolutional layers or LSTM layers). Artificial neural networks cannot be trained or executed by the human mind, or by humans with mere pen and paper, in any reasonable or practicable way without computers.

Moreover, various embodiments described herein can integrate into a practical application various teachings relating to automatic product support systems and methods via generative artificial intelligence and customer interactions. As described above, a software product can encounter or exhibit various problems or limitations during deployment (e.g., its users can identify bugs or glitches that were not encountered during research and development; its users can desire additional functionalities that it does not currently support). Various embodiments described herein can ameliorate such problems or limitations by leveraging LLMs. In particular, any suitable data (e.g., text, audio, video) that captures an interaction between a user and a deployed software product can be obtained. In various aspects, an LLM can be executed on such interaction data, to produce first synthesized text that describes, explains, or otherwise identifies a specific shortcoming of the deployed software product. In various instances, a repository of ready-made software features can be searched (e.g., via embeddings, keywords, re-ranking scores, or LLM-produced helpfulness inferences) to identify an available software feature that, if implemented in conjunction with the deployed software product, would address or solve the shortcoming specified in the first synthesized text. If an available software feature that would actually solve or address the shortcoming is found, the user can be made aware of it. In some cases, the LLM can be executed to synthesize a tutorial that teaches how to activate or utilize that available software feature. However, if no available software feature that would solve or address the shortcoming is found, the LLM can be executed on the first synthesized text (as well as on service handbook sections, code base snippets, or standard operating procedures that are semantically relevant to the first synthesized text), which can generate second synthesized text that explains how to edit, or that is an edit to, the code base of the software product to solve or address the shortcoming. Accordingly, various embodiments described herein can be considered as a clever or inventive LLM prompt engineering strategy that facilitates automated detection and resolution of software product problems (e.g., glitches, malfunctions, absent functionalities) that computing clients encounter during deployment. Such automated detection and resolution of software product problems can be considered as significantly reducing the time or effort that is expended by technicians who are tasked with developing, maintaining, or improving the software product. Thus, various embodiments described herein certainly constitute a tangible and concrete technical improvement, technical effect, or technical advantage in the field of software product development and maintenance. Accordingly, such embodiments clearly qualify as useful and practical applications of computers.

Furthermore, various embodiments described herein can control real-world tangible devices based on the disclosed teachings. For example, various embodiments described herein can synthesize a real-world coding edit via execution of an LLM and can electronically insert that real-world coding edit into the code base or programming script of a real-world software product (e.g., real-world operating system).

It should be appreciated that the herein figures and description provide non-limiting examples of various embodiments and are not necessarily drawn to scale.

FIG. 1 illustrates a block diagram of an example, non-limiting system 100 that can facilitate automatic product support systems and methods via generative artificial intelligence and customer interactions in accordance with one or more embodiments described herein. As shown, a product assistance system 102 can be electronically integrated, via any suitable wired or wireless electronic connections, with a software product 104, with a client computing device 106, or with a large language model 108 (hereafter "LLM 108").

In various embodiments, the software product 104 can be any suitable computer application or computer program that can be configured to fulfill any suitable computing purpose. In various aspects, the software product 104 can be defined or encapsulated by a respective code base or programming script, which can be written in any suitable syntax or coding language (e.g., C, C++, Python, Hypertext Markup Language (HTML)), and which can be compiled, run, or executed on any suitable computing device. In various instances, the software product 104 can be considered as a collective combination or culmination of whatever computing functionalities or computations are defined or written in its code base or programming script. Non-limiting examples of such computing functionalities or computations can include: text formatting functionalities or computations; data filtering, searching, or sorting functionalities or computations; data transformation, conversion, or analysis functionalities or computations; data visualization functionalities or computations; hardware control functionalities or computations; notification functionalities or computations; or security, privacy, or credential authentication functionalities or computations.

As a non-limiting example, the software product 104 can be configured to operate on or otherwise in conjunction with a medical imaging scanner (e.g., CT scanner, X-ray scanner, MRI scanner, ultrasound scanner, PET scanner, NM scanner). In such case, the software product 104 can: authenticate or otherwise confirm credentials of users who attempt to utilize or activate the medical imaging scanner; control, govern, or otherwise adjust scanning parameters (e.g., radiation level, voltage level, current level, gantry speed, table height) of the medical imaging scanner; or reconstruct, transform, analyze, display, or otherwise process (e.g., via filtered back-projection, via denoising, via image resolution enhancement, via image quality enhancement) whatever pixel arrays, voxel arrays, or sinograms are captured or generated by the medical imaging scanner.

As another non-limiting example, the software product 104 can be configured to operate on or otherwise in conjunction with an autonomous vehicle (e.g., semi-self-driving car, fully-self-driving car, self-piloting drone). In such case, the software product 104 can: authenticate or otherwise confirm credentials of users who attempt to utilize or activate the autonomous vehicle; control, govern, adjust, or otherwise take note of driving parameters (e.g., steering input or output, accelerator input or output, braking input or output, headlight input or output, turn signal input or output, horn input or output, radio volume input or output, windshield wiper input or output) of the autonomous vehicle; or transform, analyze, display, or otherwise process whatever data is captured or generated by sensors (e.g., cameras, microphones, accelerometers, thermometers, pressure plates, hygrometers) of the autonomous vehicle.

As yet another non-limiting example, the software product 104 can be configured to operate on or otherwise in conjunction with a smart appliance (e.g., a smart oven, a smart dishwasher, a smart laundry machine). In such case, the software product 104 can: authenticate or otherwise confirm credentials of users who attempt to utilize or activate the smart appliance; control, govern, adjust, or otherwise take note of operating parameters (e.g., cooking, cleaning, or drying temperature; cooking, cleaning, or drying time; fan speed; or drum speed) of the smart appliance; or transform, analyze, display, or otherwise process whatever data is captured or generated by sensors (e.g., cameras, microphones, accelerometers, thermometers, pressure plates, hygrometers, smoke detectors) of the smart appliance. As another non-limiting example, the software product 104 may be a cloud-based service for helping determine a disease diagnosis, prognosis, or treatment for a medical patient.

In any case, the software product 104 can be deployed in the field to be used by the client computing device 106. In various aspects, the client computing device 106 can be any suitable computing device with which, via which, or through which a user or operator can interact with the software product 104. In some cases, the software product 104 can be run, compiled, or executed on or by the client computing device 106 (e.g., the client computing device 106 can be a computer that is built into the medical imaging scanner, into the autonomous vehicle, or into the smart appliance that hosts the software product 104). However, in other cases, the software product 104 can be run, compiled, or executed on or by any suitable computing device that is separate or remote from the client computing device 106 (e.g., the client computing device 106 can be a desktop computer, a laptop computer, a smart phone, a smart watch, or a smart tablet that can wirelessly communicate with the medical imaging scanner, with the autonomous vehicle, or with the smart appliance that hosts the software product 104; the client computing device 106 can be a desktop computer, a laptop computer, a smart phone, a smart watch, or a smart tablet that can wirelessly communicate with a cloud server that hosts the software product 104). In any case, the client computing device 106 can comprise any suitable human-computer interface device that can allow the user or operator to interact with a graphical user-interface (GUI) of the software product 104. Non-limiting examples of such human-computer interface device can include: a keyboard; a keypad; a computer mouse; a touchscreen; or a voice-control system.

In various embodiments, the LLM 108 can comprise an encoder portion 110 and a synthesizer portion 112. In various cases, the encoder portion 110 can be considered as being upstream from the synthesizer portion 112. Equivalently, the synthesizer portion 112 can be considered as being downstream of the encoder portion 110.

In various aspects, the encoder portion 110 can exhibit any suitable deep learning internal architecture. Indeed, in various cases, the encoder portion 110 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Likewise, in various instances, the synthesizer portion 112 can exhibit any suitable deep learning internal architecture. Indeed, in various cases, the synthesizer portion 112 can have an input layer, one or more hidden layers, and an output layer. In various instances, any of such layers can be coupled together by any suitable interneuron connections or interlayer connections (e.g., forward connections, skip connections, recurrent connections). Furthermore, in various cases, any of such layers can be any suitable types of neural network layers having any suitable learnable or trainable internal parameters (e.g., any of such input layer, one or more hidden layers, or output layer can be convolutional layers, dense layers, batch normalization layers, LSTM layers, or transformer layers). Further still, in various cases, any of such layers can be any suitable types of neural network layers having any suitable fixed or non-trainable internal parameters (e.g., any of such input layer, one or more hidden layers, or output layer can be non-linearity layers, padding layers, pooling layers, or concatenation layers).

Regardless of the specific internal architecture (e.g., the specific numbers, types, or organizations of layers) that is implemented within the encoder portion 110, the encoder portion 110 can be configured to receive textual data (which can be accompanied by any suitable numerical or graphical data) and to produce embeddings based on such inputted textual data. In contrast, regardless of the specific internal architecture that is implemented within the synthesizer portion 112, the synthesizer portion 112 can be configured to receive embeddings produced by the encoder portion 110 and to produce synthesized textual content based on such embeddings. As some non-limiting examples, the LLM 108 can be any of the following: ChatGPT; Gene.AI®; Ollama®; Bard®; Claude®; Seamless®; GitHub CoPilot®; Amazon CodeWhisperer®; Titan®; ViT®; YOLOv8 ®; MobileNetV2 ®; EfficientNet-B5 ®; OWL-ViT®; BLIP-2 ®; Amazon Rekognition®; PaLM 2 ®; BLOOM®; T-5 ®; or Cohere Command®.

As described herein, the product assistance system 102 can leverage the LLM 108 to detect or remedy problems with the software product 104 that the client computing device 106 might encounter.

In various embodiments, the product assistance system 102 can comprise a processor 114 (e.g., computer processing unit, microprocessor) and a non-transitory computer-readable memory 116 that is operably or operatively or communicatively connected or coupled to the processor 114. The non-transitory computer-readable memory 116 can store computer-executable instructions which, upon execution by the processor 114, can cause the processor 114 or other components of the product assistance system 102 (e.g., access component 118, problem component 120, gap component 122, solution component 124) to perform one or more acts. In various embodiments, the non-transitory computer-readable memory 116 can store computer-executable components (e.g., access component 118, problem component 120, gap component 122, solution component 124), and the processor 114 can execute the computer-executable components.

In various embodiments, the product assistance system 102 can comprise an access component 118. In various aspects, the access component 118 can electronically access or otherwise electronically communicate in any suitable fashion with the software product 104, with the client computing device 106, or with the LLM 108. Accordingly, the access component 118 can electronically transmit any suitable electronic data to, or receive any suitable electronic data from, the software product 104, the client computing device 106, or the LLM 108. In some instances, the access component 118 can be considered as a proxy or conduit by which other components of the product assistance system 102 can electronically interact with the software product 104, with the client computing device 106, or with the LLM 108.

In various instances, the access component 118 can, as described herein, electronically access a client interaction record, which can convey or capture an interaction between the user or operator and the software product 104.

In various embodiments, the product assistance system 102 can comprise a problem component 120. In various aspects, the problem component 120 can, as described herein, electronically generate a problem description, based on the LLM 108 and the client interaction record. In various cases, the problem description can indicate a shortcoming or limitation of the software product 104.

In various embodiments, the product assistance system 102 can comprise a gap component 122. In various instances, the gap component 122 can, as described herein, electronically determine whether or not an available software feature can solve or address the shortcoming or limitation indicated by the problem description.

In various embodiments, the product assistance system 102 can comprise a solution component 124. In various aspects, if the gap component 122 determines that an available software feature would solve or address the shortcoming or limitation indicated by the problem description, the solution component 124 can inform (e.g., via visual output, voice output, text, email) the client computing device 106 of that available software feature. In various instances, if the gap component 122 determines that no available software feature would solve or address the shortcoming or limitation indicated by the problem description, the solution component 124 can generate, via the LLM 108, a recommended design alteration to the software product 104 that would solve or address the shortcoming or limitation indicated by the problem description.

Note that, in various instances, the access component 118, the problem component 120, the gap component 122, and the solution component 124 can collectively be considered as being one or more software components 117 of the product assistance system 102. In various aspects, it should be appreciated that the one or more software components 117 are described primarily herein as comprising four components (e.g., the access component 118, the problem component 120, the gap component 122, and the solution component 124) for ease of explanation and illustration. However, the one or more software components 117 are not limited to being implemented as exactly such four components in every embodiment. Indeed, in some embodiments, the functionalities described herein of such four components can be combined in any suitable fashions, to be implemented in or by fewer than four components (e.g., in some cases, a single component can perform all of the functionalities that are described herein with respect to the access component 118, the problem component 120, the gap component 122, and the solution component 124). In other embodiments, the functionalities described herein of such four components can instead be distributed, separated, split, or fragmented in any suitable fashions, to be implemented in or by more than four components (e.g., two or more components can facilitate the functionalities that are performable by the access component 118; two or more components can facilitate the functionalities that are performable by the problem component 120; two or more components can facilitate the functionalities that are performable by the gap component 122; two or more components can facilitate the functionalities that are performable by the solution component 124).

Figure 2:
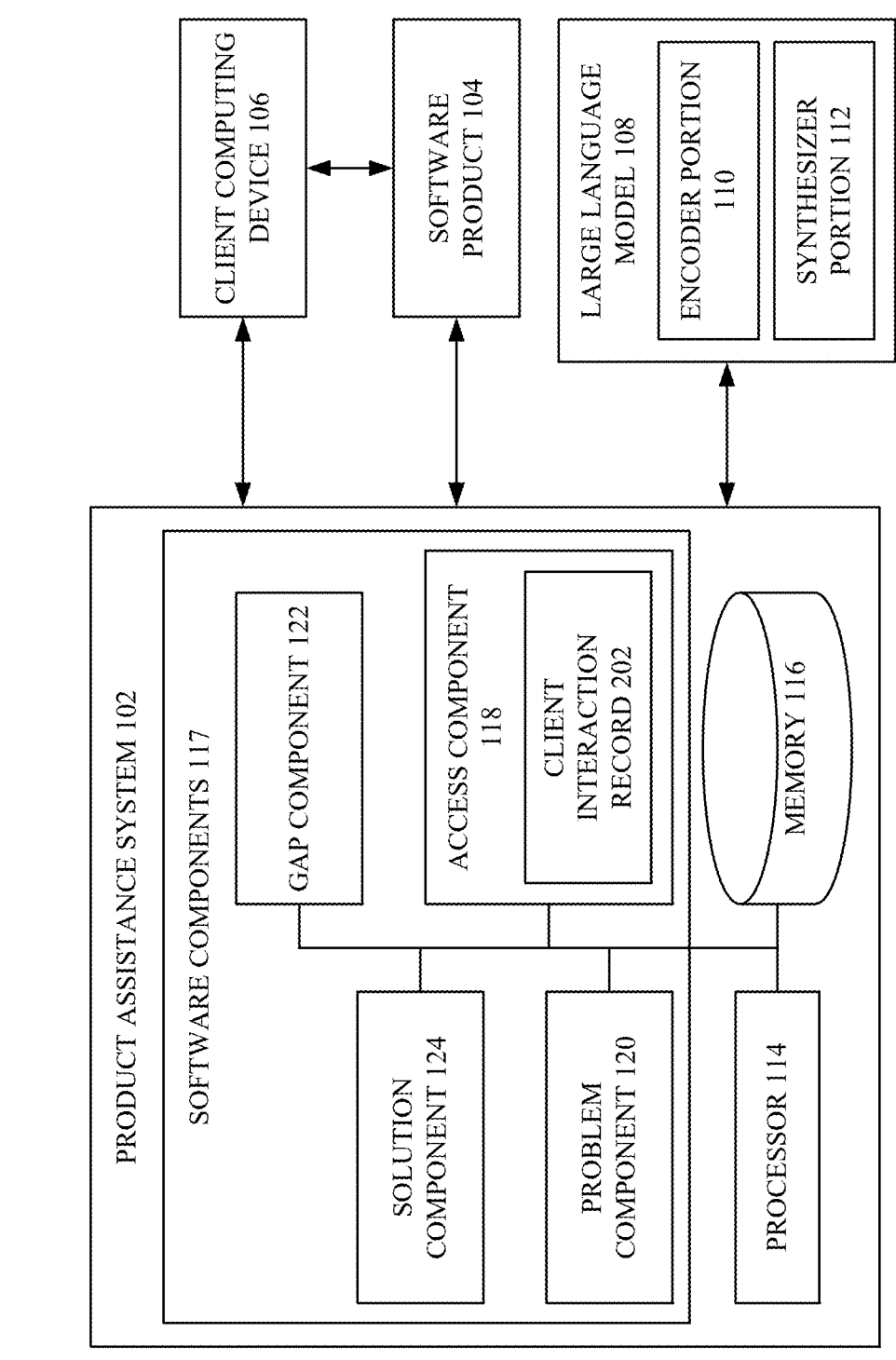
FIG. 2 illustrates a block diagram of an example, non-limiting system including a client interaction record that facilitates automatic product support systems and methods via generative artificial intelligence and customer interactions in accordance with one or more embodiments described herein.

FIG. 2 illustrates a block diagram of an example, non-limiting system 200 including a client interaction record that can facilitate automatic product support systems and methods via generative artificial intelligence and customer interactions in accordance with one or more embodiments described herein.

In various embodiments, the access component 118 can electronically receive, electronically retrieve, electronically obtain, or otherwise electronically access a client interaction record 202. In various instances, the client interaction record 202 can be any suitable electronic data exhibiting any suitable format or dimensionality (e.g., can be one or more scalars, one or more vectors, one or more matrices, one or more tensors, one or more character strings, or any suitable combination thereof) that conveys, captures, or otherwise represents at least some aspect or detail of an interaction that has occurred between the user or operator of the client computing device 106 and the software product 104. Indeed, many software programs and products these days can track the usage of a user on the program or product. This may include each button click or finger press, which ways the user moves through a workflow or user interface, or the number of instances each feature of the software program or product is used. Further, some software allows for further input types that may be tracked, such as voice, gestures, and gaze detection. In some cloud or web-based software products, every interaction, page, and click can be tracked, including where the user is looking through eye gaze tracking technologies. In some cases, the client interaction record 202 can be electronically recorded or captured by the client computing device 106, and thus the access component 118 can retrieve or receive the client interaction record 202 from the client computing device 106. In other cases, the client interaction record 202 can be electronically recorded or captured by the software product 104, and thus the access component 118 can retrieve or receive the client interaction record 202 from the software product 104. Non-limiting aspects are described with respect to FIG. 3.

FIG. 3 illustrates an example, non-limiting block diagram 300 of the client interaction record 202 in accordance with one or more embodiments described herein.

In various embodiments, the client interaction record 202 can comprise a client chatbot conversation 302. More specifically, the software product 104 can have or otherwise be associated with a chatbot functionality that can textually converse with the user or operator of the client computing device 106. Accordingly, the user or operator can type (e.g., via a keyboard or voice-to-text transcriber of the client computing device 106) natural language questions or comments into a text field of the software product 104, and the chatbot functionality can generate and present to the user or operator (e.g., via a computer screen of the client computing device 106) natural language responses to those questions or comments. In some cases, the user or operator can type follow-up questions or comments, and the chatbot functionality can generate and present follow-up responses. Such back-and-forth questions/comments and responses can collectively be considered as forming a textual conversation between the user or operator and the chatbot functionality. Such textual conversation can be referred to as the client chatbot conversation 302. In other words, the client chatbot conversation 302 can be a sequence or timeseries made up of: textual questions typed by the user or operator; and textual responses produced by the chatbot functionality associated with the software product 104.

In various embodiments, the client interaction record 202 can comprise a client audio recording 304. As mentioned above, the client computing device 106 can allow or enable the user or operator to interact with a GUI of the software product 104. In various aspects, the client computing device 106 can comprise a microphone (e.g., can have a built-in or otherwise electronically-integrated microphone). In various instances, the microphone of the client computing device 106 can capture or record words, verbalizations, exclamations, grunts, groans, or other sounds that the user or operator makes or emits while interacting with the GUI of the software product 104. In various cases, the client audio recording 304 can be whatever electronic data is captured or recorded by the microphone of the client computing device 106. Thus, whatever words, verbalizations, or sounds that the user or operator produces or emits while interacting with the software product 104 can be present in or otherwise conveyed by the client audio recording 304. In other words, the client audio recording 304 can be a sequence or timeseries made up of audio measurements recorded by the microphone of the client computing device 106. In various aspects, if other users are in range of the microphone of the client computing device 106, the client audio recording 304 can include complaints or comments from those other users. For example, the following verbal statement might be spoken by a colleague of the user of the software product 104, and such verbal statement can be included or captured in the client audio recording 304: "You are looking for the zoom again? I couldn't find it last time. If you find it, let me know where it is.".

In various embodiments, the client interaction record 202 can comprise a client video recording 306. As mentioned above, the client computing device 106 can allow or enable the user or operator to interact with a GUI of the software product 104. In various aspects, the client computing device 106 can comprise a camera (e.g., can have a built-in or otherwise electronically-integrated camera). In various instances, the camera of the client computing device 106 can capture or record body language or other physical actions that the user or operator makes or performs while interacting with the GUI of the software product 104. In various cases, the client video recording 306 can be whatever electronic data is captured or recorded by the camera of the client computing device 106. Thus, whatever body language or physical actions that the user or operator makes or performs while interacting with the software product 104 can be depicted in or otherwise conveyed by the client video recording 306. In other words, the client video recording 306 can be a sequence or timeseries made up of video frames recorded by the camera of the client computing device 106.

In various embodiments, the client interaction record 202 can comprise a client user-interface tracking log 308. As mentioned above, the client computing device 106 can allow or enable the user or operator to interact with a GUI of the software product 104. In various aspects, the client computing device 106 or the software product 104 itself can comprise any suitable user-interface tracking functionalities. As a non-limiting example, the client computing device 106 or the software product 104 can comprise a click-tracking functionality that can monitor, track, or otherwise record what electronic locations within the GUI of the software product 104 that the user or operator clicked on or otherwise selected during interaction with the software product 104, and when (e.g., at which times) such clicks or selections occurred. As another non-limiting example, the client computing device 106 or the software product 104 can comprise a scroll-tracking functionality that can monitor, track, or otherwise record what electronic locations within the GUI of the software product 104 that the user or operator scrolled to during interaction with the software product 104, and when such scrolling occurred. As yet another non-limiting example, the client computing device 106 or the software product 104 can comprise a gaze-tracking functionality that can (e.g., when used in conjunction with a camera of the client computing device 106) monitor, track, or otherwise record what electronic locations within the GUI of the software product 104 that the user or operator looked or gazed at during interaction with the software product 104, and when such looking or gazing occurred. More generally, the client computing device 106 or the software product 104 can track or record how the user or operator electronically navigates within the GUI of the software product 104 (e.g., which GUI locations the user or operator spends more time on; which GUI locations the user or operator spends less time on; which GUI locations the user or operator repeatedly clicks on, selects, or views; the chronological order in which the user or operator navigates through the GUI), and such tracked or recorded data can be collectively considered as the client user-interface tracking log 308. In other words, the client user-interface tracking log 308 can be a sequence or timeseries made up of clicks, scrolls, gazes, or other electronic navigation actions recorded by the client computing device 106 or by the software product 104.

In various embodiments, the client interaction record 202 can comprise a client-originated textual document 310. In various aspects, the client-originated textual document 310 can be any suitable unstructured or plain text document of any suitable length (e.g., ranging from less than page in length to multiple pages in length) that the user or operator has typed on or via the client computing device 106 and that semantically or substantively pertains in any way to the software product 104. As a non-limiting example, the client-originated textual document 310 can be an email message that the user or operator has typed via the client computing device 106 and has sent to a manufacturer or seller of the software product 104, and that describes some question or comment that the user or operator has regarding the software product 104. As another non-limiting example, the client-originated textual document 310 can be a commercial review of the software product 104 that the user or operator has typed via the client computing device 106 and has posted on any suitable webpage or website. As still another non-limiting example, the client-originated textual document 310 can be a report concerning operability or efficacy of the software product 104 that the user or operator has typed via the client computing device 106. As even another non-limiting example, the client-originated textual document 310 can be one or more meeting-minute entries that summarize a collaboration meeting regarding the software product 104 that the user or operator has typed via the client computing device 106.

In various cases, the client interaction record 202 can comprise any suitable combination of the client chatbot conversation 302, the client audio recording 304, the client video recording 306, the client user-interface tracking log 308, or the client-originated textual document 310. In any case, the client interaction record 202 can be considered as any suitable electronic data that indicates, conveys, or otherwise represents an interaction between the software product 104 and the user or operator of the client computing device 106.

It is to be appreciated that any suitable number of client computing devices can interact with the software product 104, and that the access component 118 can thus electronically access any suitable number of client interaction records respectively corresponding to such client computing devices.

Figure 4:
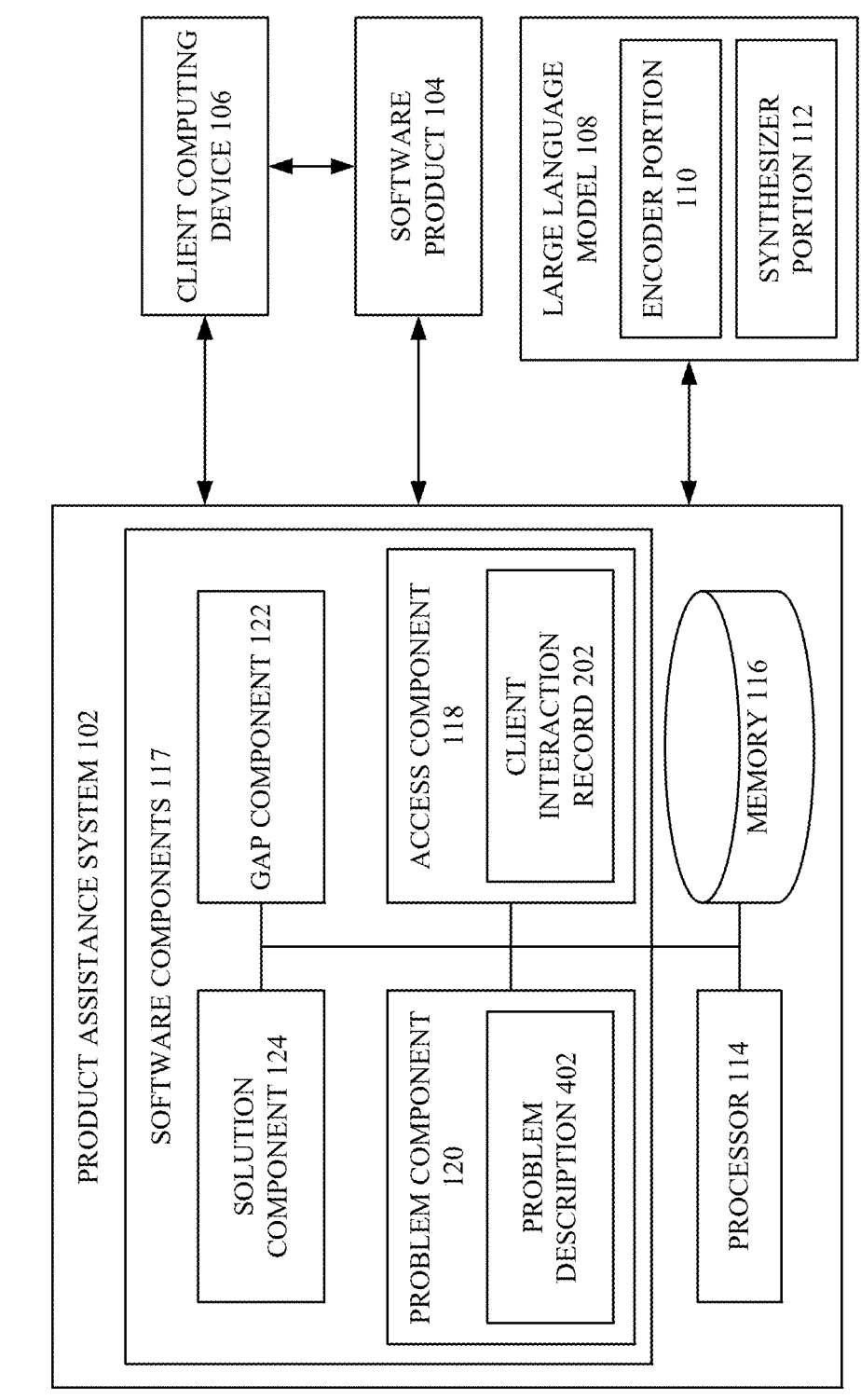
FIG. 4 illustrates a block diagram of an example, non-limiting system including a problem description that facilitates automatic product support systems and methods via generative artificial intelligence and customer interactions in accordance with one or more embodiments described herein.

FIG. 4 illustrates a block diagram of an example, non-limiting system 400 including a problem description that can facilitate automatic product support systems and methods via generative artificial intelligence and customer interactions in accordance with one or more embodiments described herein.

In various embodiments, the problem component 120 can electronically generate a problem description 402, based on the client interaction record 202 and based on the LLM 108. Non-limiting aspects are described with respect to FIG. 5.

Figure 5:
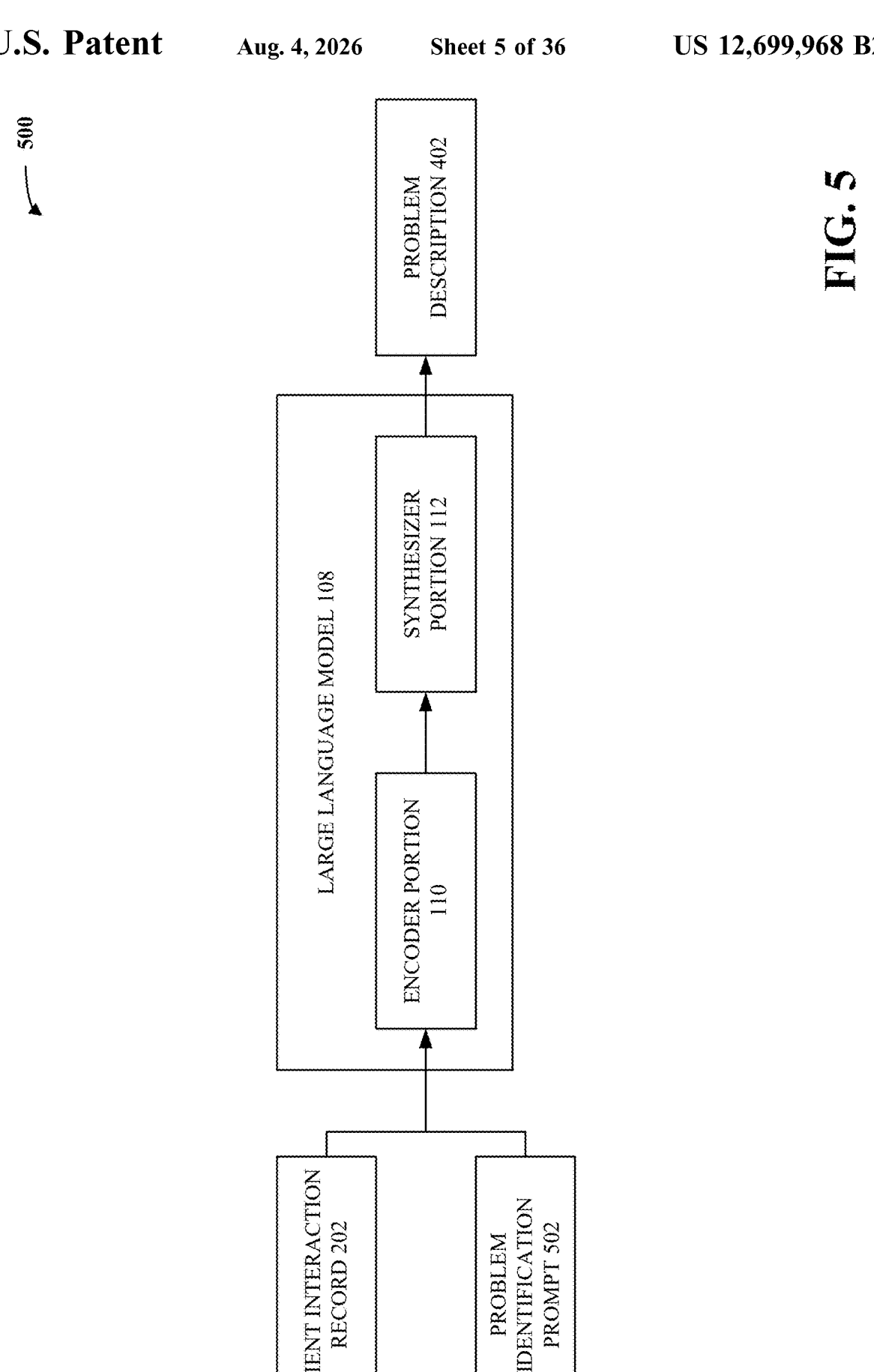
FIG. 5 illustrates an example, non-limiting block diagram showing how a large language model can be leveraged to generate a problem description in accordance with one or more embodiments described herein.

FIG. 5 illustrates an example, non-limiting block diagram 500 showing how the LLM 108 can be leveraged to generate the problem description 402 in accordance with one or more embodiments described herein.

In various embodiments, there can be a problem identification prompt 502 that is feedable to the LLM 108. In various aspects, the problem identification prompt 502 can be one or more unstructured or plain text sentences or sentence fragments that request or command identification of a problem, shortcoming, or other limitation of the software product 104 that is conveyed or suggested by the client interaction record 202. As a non-limiting example, the problem identification prompt 502 can be the following sentence: "What problem, if any, of the software product 104 is indicated by the client interaction record 202?" As another non-limiting example, the problem identification prompt 502 can be the following sentences: "Does the client interaction record 202 suggest that the software product 104 suffers from a disadvantage? If so, what is that disadvantage?" As even another non-limiting example, the problem identification prompt 502 can be the following sentence: "Describe what software deficiency the client interaction record 202 conveys."

Now, in various instances, the problem component 120 can electronically execute the LLM 108 on the client interaction record 202 and on the problem identification prompt 502. In various cases, such execution can cause the LLM 108 to produce the problem description 402. More specifically, the problem component 120 can concatenate the client interaction record 202 and on the problem identification prompt 502 together. In various aspects, the problem component 120 can feed that concatenation to the input layer of the encoder portion 110. In various aspects, that concatenation can complete a forward pass through the one or more hidden layers of the encoder portion 110. In various instances, the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112. In various aspects, those one or more embeddings can complete a forward pass through the one or more hidden layers of the synthesizer portion 112, and the output layer of the synthesizer portion 112 can compute or otherwise calculate the problem description 402 based on activation maps or feature maps provided by the one or more hidden layers of the synthesizer portion 112.

In various aspects, the problem description 402 can be one or more unstructured or plain text declarative sentences or sentence fragments that semantically answer or respond to the problem identification prompt 502. That is, the problem description 402 can be synthesized text that describes, explains, or otherwise states a problem, shortcoming, or limitation of the software product 104 that is indicated, suggested, or otherwise conveyed by the client interaction record 202. In other words, the LLM 108 can infer or predict that the client interaction record 202 is indicative of a particular software disadvantage or deficiency, and the problem description 402 can be a textual distillation or summary of that inference. As a non-limiting example, the LLM 108 can infer or conclude that the client interaction record 202 indicates, suggests, or conveys that the software product 104 suffers from a specific type of glitch, error, bug, or malfunction having specific symptoms (e.g., causing captured images to be blurry or artifact-riddled; causing excessive input-output latency; causing underlying computing hardware to freeze; causing calculation or computation outputs to be incorrect) or triggers (e.g., the error, bug, or malfunction occurs when the associated medical imaging scanner uses a scan voltage above 50 kilo-volts; the error, bug, or malfunction occurs when the associated autonomous vehicle is facing oncoming traffic at night; the error, bug, or malfunction occurs when the associated smart appliance is placed into high-temperature mode), and the problem description 402 can be synthetic plain text that identifies, describes, or explains that inferred type of glitch, error, bug, or malfunction, its inferred symptoms, or its inferred triggers. As another non-limiting example, the LLM 108 can infer or conclude that the client interaction record 202 indicates, suggests, or conveys that the software product 104 lacks or omits a desired computing functionality that would perform some specific operation (e.g., specific type of filtration or sorting; specific type of visualization or plotting; specific type of transformation) on some specific input data (e.g., on specific captured images; on specific accelerometer measurements; on specific temperature measurements), and the problem description 402 can be synthetic plain text that identifies, describes, or explains that inferred computing functionality, the inferred operation that it would perform, or the inferred input data that it would operate on. As yet another non-limiting example, the LLM 108 can infer or conclude that the client interaction record 202 indicates, suggests, or conveys that the software product 104 is difficult to use for some particular reason (e.g., the GUI is cluttered or disorganized, such that the user or operator cannot easily or readily find an included computing functionality; the GUI's color scheme provides too little contrast between displayed text and backgrounds, such that the displayed text is difficult to read), and the problem description 402 can be synthetic plain text that identifies, describes, or explains that inferred reason that the software product 104 is difficult to use.

Accordingly, the client interaction record 202 can be considered as representing behavior (e.g., textual behavior, vocal behavior, body language behavior) that the user or operator has exhibited when interacting with the software product 104, the LLM 108 can infer a particular problem afflicting the software product 104 that such behavior suggests, and the problem description 402 can be synthesized text that explains or identifies whatever inferences that the LLM 108 makes regarding that particular problem. In other words, the LLM 108 can be considered as inferring from the behavior of the user or operator that there is a gap between the actual or true performance of the software product 104 and the ideal or desired performance that the user or operator wants, and the problem description 402 can textually describe that gap.

In some cases, the client interaction record 202 can contain explicit evidence of the performance gap that is inferred by the LLM 108. As a non-limiting example, a particular problem, or any of its attributes, can be explicitly recited in the client chatbot conversation 302 or in the client-originated textual document 310. In such cases, the user or operator can be considered as having explicitly complained about the particular problem (or as having explicitly discussed or named at least some attributes of the particular problem) via text.

In other cases, the client interaction record 202 can contain implicit evidence of the performance that is inferred by the LLM 108. As a non-limiting example, the client audio recording 304, the client video recording 306, and the client user-interface tracking log 308 can collectively show that the user or operator swore, cursed, spoke otherwise negative words or interjections in a raised or displeased tone (e.g., "Why is this image streaked?!"; "Not another delay!"; "I can't even read this."; "Why don't they just automate this?!"), or used negative or displeased body language (e.g., shook head, grimaced, sighed, rolled eyes, banged hand on desk, rubbed forehead or temples, cupped face in hands) simultaneously as, concurrently as, or otherwise within any suitable temporal proximity as the user or operator navigated to, paused at, gazed at, or selected some specific portion of the GUI of the software product 104. In such cases, the LLM 108 can be infer that the user or operator exhibited displeased behavior, and can also infer that such displeased behavior was caused by whatever elements or portions of the software product 104 that the user was navigating, invoking, or selecting when they exhibited that displeased behavior.

It should be appreciated that there may be more than one problem, shortcoming, or limitation that the client or user is dealing with. In such situations, more than one problem, shortcoming, or limitation can be explicitly or implicitly conveyed in the client interaction record 202 and can therefore be recognized or detected by the LLM 108. In some cases, the problem description 402 can itemize and explain all of such multiple problems, shortcomings, or limitations. In other cases, the LLM 108 can generate a respective problem description for each of those multiple problems, shortcomings, or limitations. In various instances, the LLM 108 can infer a priority or severity level for each of those multiple problems, shortcomings, or limitations, and any suitable follow-on processing or analysis that can be performed by the product assistance system 102 as described herein can be performed in order of those priority or severity levels. For example, a cybersecurity breach problem across multiple clients can be considered as more severe or higher priority than a user-interface frustration of one specific client.

In any case, the problem component 120 can synthesize the problem description 402, by executing the LLM 108 on the client interaction record 202.

Figure 6:
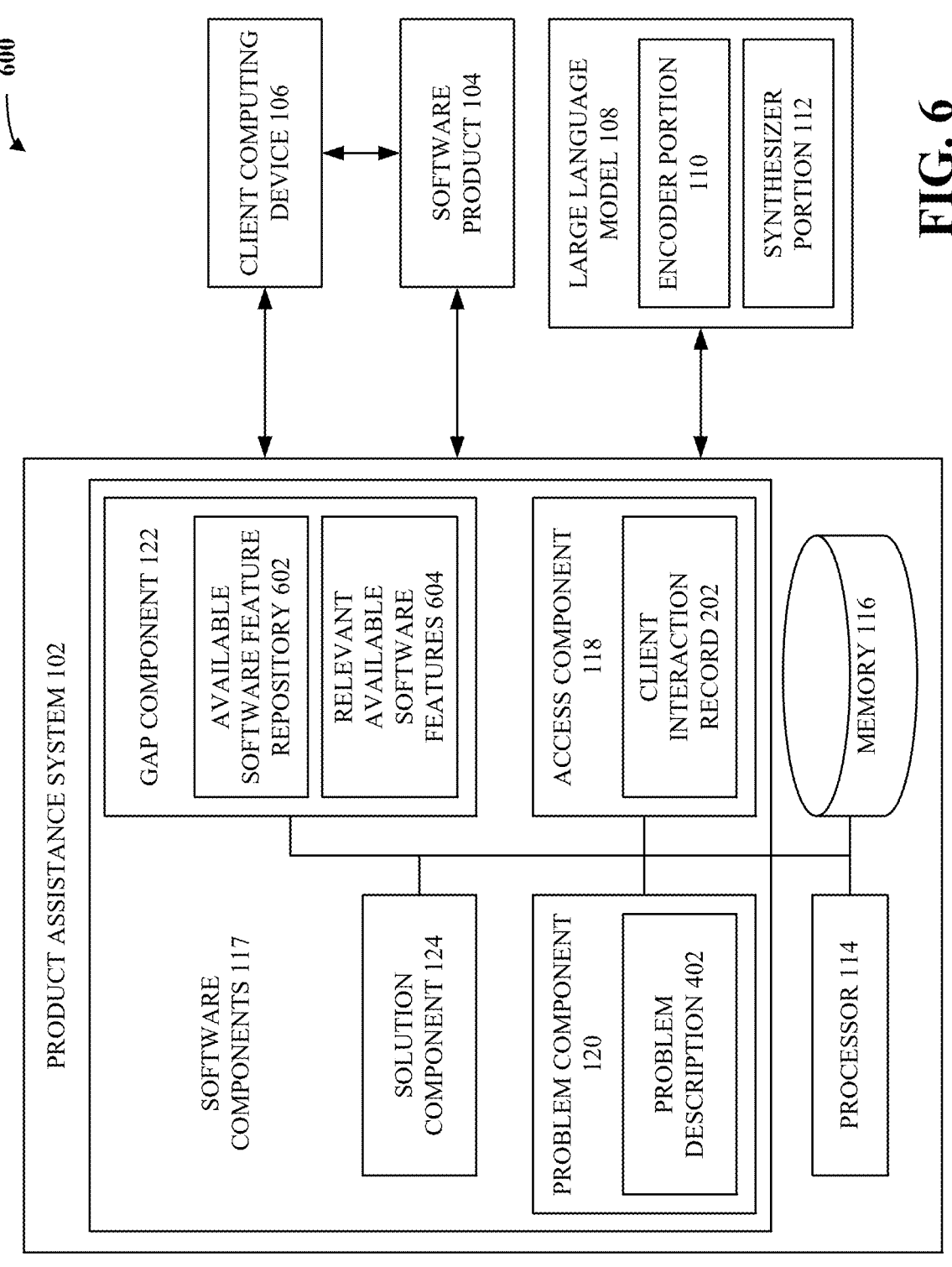
FIG. 6 illustrates a block diagram of an example, non-limiting system including an available software feature repository and one or more relevant available software features that facilitates automatic product support systems and methods via generative artificial intelligence and customer interactions in accordance with one or more embodiments described herein.

FIG. 6 illustrates a block diagram of an example, non-limiting system 600 including an available software feature repository and one or more relevant available software features that can facilitate automatic product support systems and methods via generative artificial intelligence and customer interactions in accordance with one or more embodiments described herein.

In various embodiments, the gap component 122 can electronically store, electronically maintain, electronically control, or otherwise electronically access an available software feature repository 602. In various aspects, the gap component 122 can electronically search through the available software feature repository 602 based on the problem description 402, to identify a set of relevant available software features 604 that solve or address the performance gap indicated in the problem description 402. Non-limiting aspects are described with respect to FIGS. 7-11.

FIGS. 7-11 illustrate example, non-limiting block diagrams 700, 800, 900, 1000, and 1100 showing how the available software feature repository 602 can be searched in accordance with one or more embodiments described herein.

Figure 7:
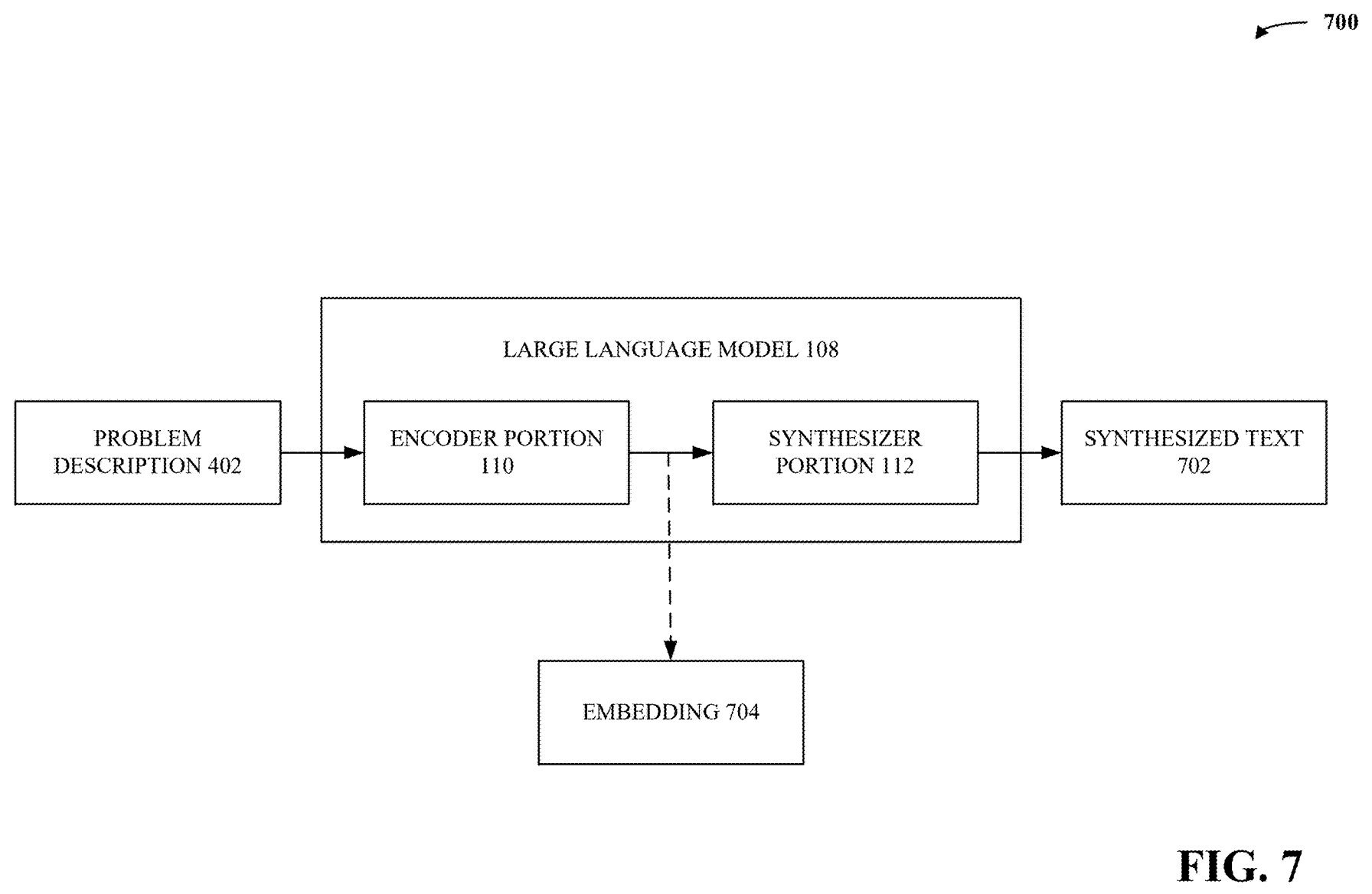

First, consider FIG. 7. In various aspects, the gap component 122 can electronically execute the LLM 108 on the problem description 402. In various instances, such execution can cause the LLM 108 to produce some synthesized text 702.

More specifically, the gap component 122 can feed or route the problem description 402 to the input layer of the encoder portion 110, the problem description 402 can complete a forward pass through the one or more hidden layers of the encoder portion 110, and an output layer of the encoder portion 110 can compute or otherwise calculate an embedding 704, based on activation maps or feature maps provided by the one or more hidden layers of the encoder portion 110.

In various instances, the embedding 704 can be considered as a latent vector representation that the encoder portion 110 believes or infers corresponds to the problem description 402. More specifically, the embedding 704 can be one or more scalars, one or more vectors, one or more matrices, one or more tensors, or any suitable combination thereof. In various aspects, the dimensionality of the embedding 704 (e.g., the total number or cardinality of numerical elements within the embedding 704) can be smaller (e.g., many orders of magnitude smaller, in some cases) than the dimensionality of the problem description 402. In various instances, despite its smaller dimensionality, the embedding 704 can nevertheless be considered as representing, albeit in hidden or non-apparent fashion, at least some substantive or semantic content of the problem description 402. In other words, the embedding 704 can be considered as a compact or compressed numerical representation of the problem description 402. Note that the embedding 704 can be considered as representing the problem description 402 in a latent, obscure, or otherwise hidden fashion, since a third-party that has no connection or relationship to the encoder portion 110 would be unable to recreate or guess the problem description 402 from the embedding 704 alone.

Now, in various aspects, the embedding 704 can be fed or routed to the input layer of the synthesizer portion 112, the embedding 704 can complete a forward pass the through one or more hidden layers of the synthesizer portion 112, and the output layer of the synthesizer portion 112 can compute or otherwise calculate the synthesized text 702, based on activation maps or feature maps provided by the one or more hidden layers of the synthesizer portion 112.

In various aspects, the synthesized text 702 can be one or more declarative sentences or sentence fragments that the synthesizer portion 112 has generated based on the embedding 704. Note that the synthesized text 702 can be not an estimated or approximated reconstruction of the problem description 402. Instead, the synthesized text 702 can be any suitable number of synthetic sentences that somehow semantically or substantively relate to the embedding 704 and thus to the problem description 402. In some cases, the synthesized text 702 can be considered as containing hallucinations that are semantically or substantively related to the problem description 402.

In various aspects, the gap component 122 can ignore, discard, or delete the synthesized text 702. However, the gap component 122 can record, preserve, store, or otherwise maintain the embedding 704. In other words, the gap component 122 can extract the embedding 704 from the encoder portion 110 (e.g., from hidden layers of the LLM 108).

Figure 8:
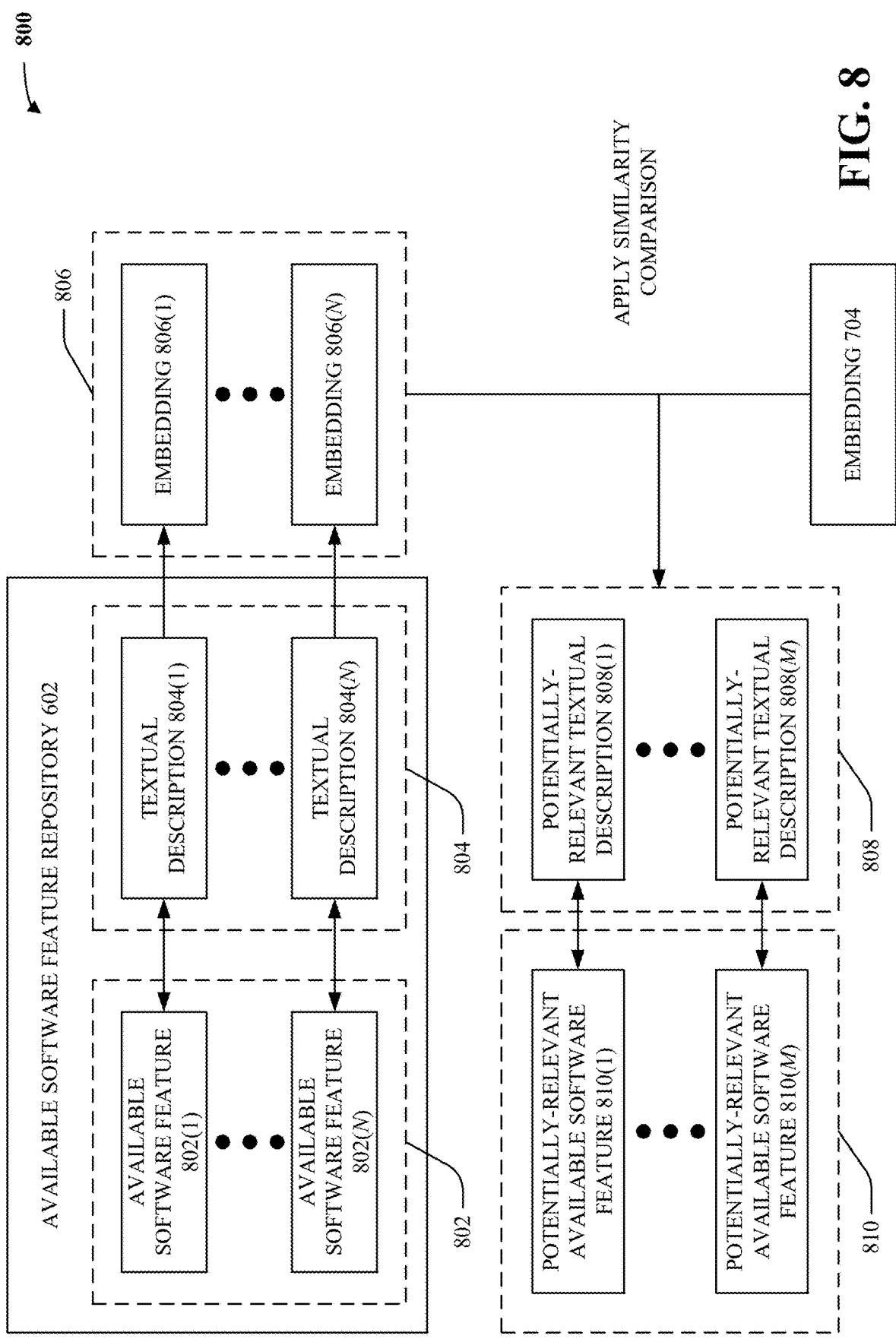

Now, consider FIG. 8. In various embodiments, as shown, the available software feature repository 602 can comprise a plurality of available software features 802. In various aspects, the plurality of available software features 802 can comprise n features, for any suitable positive integer n>1: an available software feature 802(1) to an available software feature 802(n). In various instances, each of the plurality of available software features 802 can be a distinct or unique software plug-in or software add-on that can serve a respective computing purpose and that is able to be implemented or deployed in conjunction with the software product 104. So, the available software feature 802(1) can be a first plug-in or add-on that is already coded or developed (hence the term "available") and that serves some first computing purpose (e.g., that solves some first computing bug, or that facilitates some first computing functionality). Likewise, the available software feature 802(n) can be an n-th plug-in or add-on that is already coded or developed and that serves some n-th computing purpose (e.g., that solves some n-th computing bug, or that facilitates some n-th computing functionality). In some cases, any of the plurality of available software features 802 can be created by or otherwise associated with a manufacturer of the software product 104. In other cases, however, any of the plurality of available software features 802 can be created by or otherwise associated with any third-party that is unrelated to or unaffiliated with the software product 104.

In various aspects, the available software feature repository 602 can comprise a plurality of textual descriptions 804 that can respectively correspond to the plurality of available software features 802. Since the plurality of available software features 802 can comprise n features, the plurality of textual descriptions 804 can likewise comprise n descriptions: a textual description 804(1) to a textual description 804(n). In various instances, each of the plurality of textual descriptions 804 can be considered as a brief paragraph that is known or deemed to textually explain any suitable details, characteristics, attributes, purposes, or specifications about a respective one of the plurality of available software features 802. As a non-limiting example, the textual description 804(1) can correspond to the available software feature 802(1). Thus, the textual description 804(1) can be one or more first declarative plain text sentences or sentence fragments that collectively explain or elaborate about the available software feature 802(1) (e.g., that summarize what the available software feature 802(1) accomplishes; that describe the computing purpose of the available software feature 802(1); that describe how to activate or implement the available software feature 802(1)). As another non-limiting example, the textual description 804(n) can correspond to the available software feature 802(n). So, the textual description 804(n) can be one or more n-th declarative plain text sentences or sentence fragments that collectively explain or elaborate about the available software feature 802(n).

It is to be appreciated that the available software feature repository 602 need not be centralized. In other words, the available software feature repository 602 can be made up of any suitable number of decentralized shards or sub-repositories.

In various aspects, the gap component 122 can electronically generate a plurality of embeddings 806, by executing the LLM 108 as described above on each of the plurality of textual descriptions 804.

As a non-limiting example, the gap component 122 can execute the LLM 108 on the textual description 804(1), and the gap component 122 can extract, during that execution, an embedding 806(1) from the LLM 108. More specifically, the gap component 122 can feed or route the textual description 804(1) to the input layer of the encoder portion 110, the textual description 804(1) can complete a forward pass through the one or more hidden layers of the encoder portion 110, and the output layer of the encoder portion 110 can compute or otherwise calculate the embedding 806(1), based on activation maps or feature maps provided by the one or more hidden layers of the encoder portion 110. Note that the embedding 806(1) can have the same format, size, or dimensionality as the embedding 704 (e.g., an embedding can be a uniform-dimensional or uniform-size vector representing a sentence; the sentence-wise embeddings of a paragraph of sentences can be aggregated or averaged together to yield an embedding for the paragraph; the paragraph-wise embeddings of an entire document or chapter can be aggregated or averaged together to yield an embedding for the document or chapter), and thus the embedding 806(1) can be considered as a latent vector representation of the textual description 804(1). In various cases, the embedding 806(1) can then complete a forward pass through the synthesizer portion 112, but the gap component 122 can ignore, disregard, or delete whatever synthesized textual content the synthesizer portion 112 creates based on the embedding 806(1).

As another non-limiting example, the gap component 122 can execute the LLM 108 on the textual description 804(n), and the gap component 122 can extract, during that execution, an embedding 806(n) from the LLM 108. Indeed, just as described above, the gap component 122 can feed or route the textual description 804(n) to the input layer of the encoder portion 110, the textual description 804(n) can complete a forward pass through the one or more hidden layers of the encoder portion 110, and the output layer of the encoder portion 110 can compute or otherwise calculate the embedding 806(n), based on activation maps or feature maps provided by the one or more hidden layers of the encoder portion 110. So, the embedding 806(n) can be considered as a latent vector representation of the textual description 804(n). As above, the embedding 806(n) can then complete a forward pass through the synthesizer portion 112, but the gap component 122 can ignore, disregard, or delete whatever synthesized textual content the synthesizer portion 112 creates based on the embedding 806(n).

In various cases, the embedding 806(1) to the embedding 806(n) can collectively be considered as the plurality of embeddings 806.

Note that the plurality of embeddings 806 can be considered as respectively corresponding to the plurality of available software features 802. As a non-limiting example, because the embedding 806(1) can be derived from or otherwise based on the textual description 804(1), and because the textual description 804(1) explains the available software feature 802(1), the embedding 806(1) can be considered as corresponding to the available software feature 802(1). As another non-limiting example, because the embedding 806(n) can be derived from or otherwise based on the textual description 804(n), and because the textual description 804(n) explains the available software feature 802(n), the embedding 806(n) can be considered as corresponding to the available software feature 802(n).

In various aspects, the gap component 122 can electronically identify a set of potentially-relevant textual descriptions 808, and thus a set of potentially-relevant available software features 810, by comparing the embedding 704 to the plurality of embeddings 806. In particular, for each given embedding of the plurality of embeddings 806, the gap component 122 can compute any suitable error or similarity value between that given embedding and the embedding 704. As some non-limiting examples, such error or similarity value can involve: MAE computation; MSE computation; cosine similarity computation; Euclidean distance computation; or cross-entropy computation. In any case, the gap component 122 can identify as the set of potentially-relevant textual descriptions 808 whichever of the plurality of textual descriptions 804 whose embeddings are most similar to, closest to, or otherwise within any suitable threshold margin of the embedding 704. For instance, the set of potentially-relevant textual descriptions 808 can comprise m descriptions, for any suitable positive integer m<n: a potentially-relevant textual description 808(1) to a potentially-relevant textual description 808(m). In some cases, the gap component 122 can be considered as identifying the top m ones of the plurality of textual descriptions 804 whose embeddings are most similar or closest to the embedding 704. In other cases, the plurality of textual descriptions 804 can be considered as containing m descriptions that are within a threshold margin of the embedding 704. In various aspects, the set of potentially-relevant available software features 810 can be whichever of the plurality of available software features 810 that correspond to the set of potentially-relevant textual descriptions 808. For instance, whichever of the plurality of available software features 802 corresponds to the potentially-relevant textual description 808(1) can be referred to as a potentially-relevant available software feature 810(1); whichever of the plurality of available software features 802 corresponds to the potentially-relevant textual description 808(m) can be referred to as a potentially-relevant available software feature 810(m); and the potentially-relevant available software feature 810(1) to the potentially-relevant available software feature 810(m) can collectively be considered as the set of potentially-relevant available software features 810.

Figure 9:
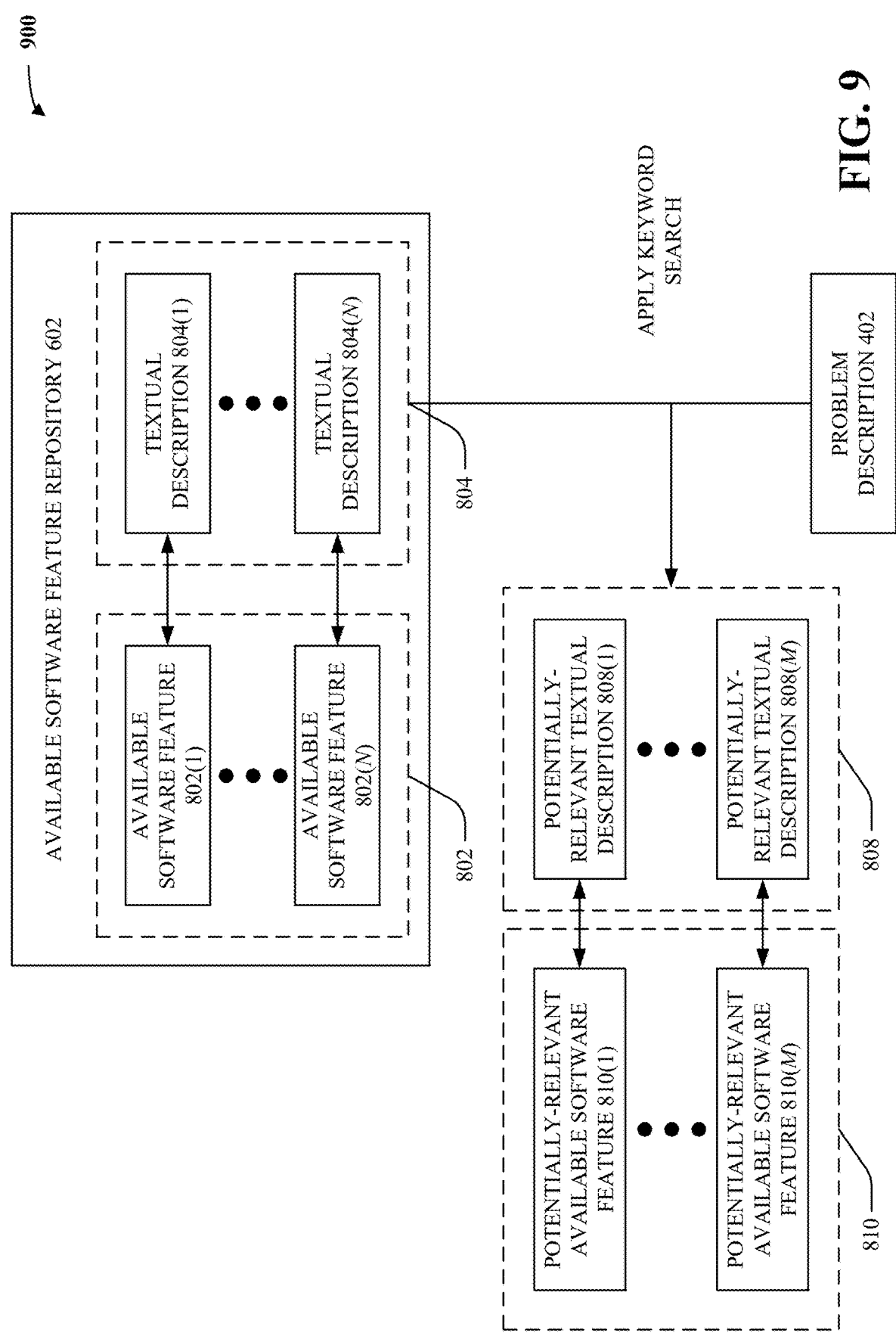

Now, consider FIG. 9. Thus far, the herein disclosure has mainly described how embedding-based searching can be applied to identify the set of potentially-relevant available software features 810. However, this is a mere non-limiting example. In some cases, keyword-based searching can be applied to identify the set of potentially-relevant available software features 810.

Indeed, in various embodiments, the gap component 122 can electronically identify one or more keywords (not shown) that are recited in the problem description 402. In various aspects, the gap component 122 can facilitate such keyword identification by applying any suitable named-entity recognition technique or named-entity extraction technique to the problem description 402. Non-limiting examples of such named-entity recognition or extraction techniques can include: rule-based techniques that leverage defined grammatical patterns or dictionaries to identify named-entities; statistical techniques such as Hidden Markov Models (HMM) or Conditional Random Fields (CRF); or machine learning techniques such as decision trees or recurrent neural networks that are trained to extract named-entities. In any case, the gap component 122 can search through the plurality of textual descriptions 804 for whatever keywords are extracted from the problem description 402. Thus, the set of potentially-relevant textual descriptions 808 can be whichever of the plurality of textual descriptions 804 that recite the same keywords as the problem description 402 (e.g., that each recite at least one of the keywords that are recited in the problem description 402; or that each recite all of the keywords that are recited in the problem description 402).

In some aspects, the gap component 122 can utilize both embedding-based searching and keyword-based searching to identify the set of potentially-relevant textual descriptions 808 and thus the set of potentially-relevant available software features 810. In any case, the set of potentially-relevant available software features 810 can be considered as being a subset of the plurality of available software features 802 whose textual descriptions are somehow semantically related to the problem description 402 and thus that might (e.g., if they were implemented) solve or address the performance gap is indicated in the problem description 402.

Now, in various embodiments, the gap component 122 can identify the set of relevant available software features 604, by filtering the set of potentially-relevant available software features 810. In some cases, the gap component 122 can facilitate such filtering with a trained re-ranking model, such as described with respect to FIG. 10. In other cases, the gap component 122 can facilitate such filtering via leveraging the LLM 108, as described with respect to FIG. 11.

Figure 10:
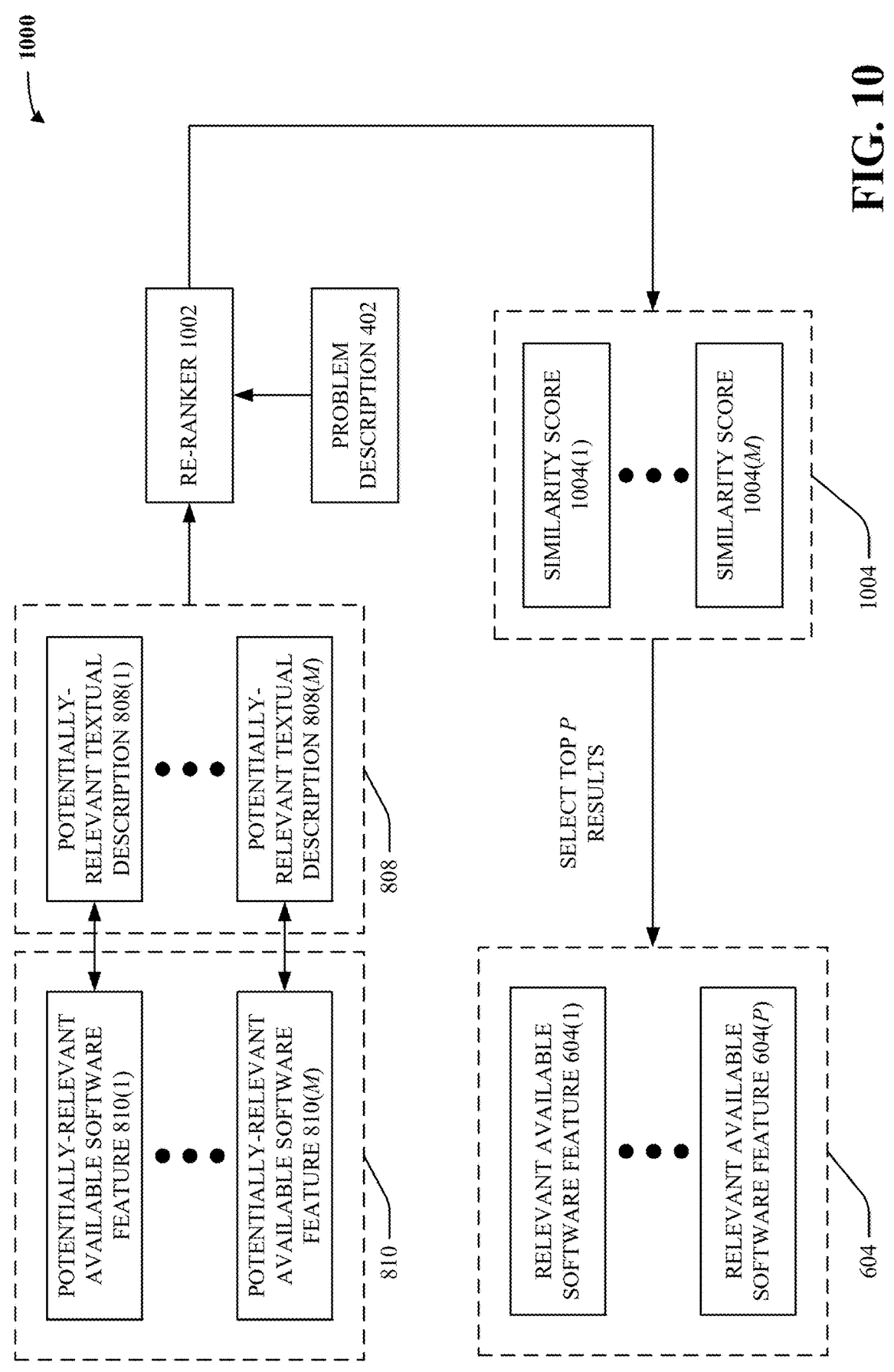

First, consider FIG. 10. In various embodiments, the gap component 122 can electronically store, electronically maintain, electronically control, or otherwise electronically access a re-ranker 1002. In various aspects, the re-ranker 1002 can exhibit any suitable deep learning internal architecture. Indeed, in various cases, the re-ranker 1002 can have an input layer, one or more hidden layers, and an output layer. In various instances, any of such layers can be coupled together by any suitable interneuron connections or inter-layer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers. As a non-limiting example, the re-ranker 1002 can be a cross-encoder based on bi-directional encoder representations from transformers (BERT).

Regardless of the specific internal architecture that is implemented within the re-ranker 1002, the re-ranker 1002 can be configured to receive two collections of inputted text and to produce as output a score that indicates how relevant or irrelevant those two collections of inputted text are with respect to each other. So, in various aspects, the gap component 122 can execute the re-ranker 1002 on the problem description 402 and on each of the set of potentially-relevant textual descriptions 808, and such execution can cause the re-ranker 1002 to produce a set of similarity scores 1004.

As a non-limiting example, the gap component 122 can execute the re-ranker 1002 on both the problem description 402 and the potentially-relevant textual description 808(1), and such execution can yield a similarity score 1004(1). More specifically, the gap component 122 can concatenate the problem description 402 with the potentially-relevant textual description 808(1), the gap component 122 can feed or route that concatenation to the input layer of the re-ranker 1002, that concatenation can complete a forward pass through the one or more hidden layers of the re-ranker 1002, and the output layer of the re-ranker 1002 can compute or otherwise calculate the similarity score 1004(1) based on activation maps or feature maps provided by the one or more hidden layers of the re-ranker 1002. In any case, the similarity score 1004(1) can be a real-valued scalar whose magnitude indicates how much semantic relevance the potentially-relevant textual description 808(1) has with respect to the problem description 402 (e.g., a magnitude closer to 0 can indicate less relevance, whereas a magnitude closer to 1 can indicate more relevance). Note that, in various instances, the similarity score 1004(1) can be considered as a proxy representing how likely or unlikely it is that the potentially-relevant available software feature 810(1) would, if it were implemented, actually solve, address, or otherwise fill the performance gap that is indicated by the problem description 402.

As another non-limiting example, the gap component 122 can execute the re-ranker 1002 on both the problem description 402 and the potentially-relevant textual description 808(m), and such execution can yield a similarity score 1004(m). In particular, the gap component 122 can concatenate the problem description 402 with the potentially-relevant textual description 808(m), the gap component 122 can feed or route that concatenation to the input layer of the re-ranker 1002, that concatenation can complete a forward pass through the one or more hidden layers of the re-ranker 1002, and the output layer of the re-ranker 1002 can compute or otherwise calculate the similarity score 1004(m) based on activation maps or feature maps provided by the one or more hidden layers of the re-ranker 1002. In any case, the similarity score 1004(m) can be a real-valued scalar whose magnitude indicates how much semantic relevance the potentially-relevant textual description 808(m) has with respect to the problem description 402. As above, the similarity score 1004(m) can be considered as a proxy representing how likely or unlikely it is that the potentially-relevant available software feature 810(m) would, if it were implemented, actually solve, address, or otherwise fill the performance gap that is indicated by the problem description 402.

Note that the similarity score 1004(1) to the similarity score 1004(m) can collectively be considered as forming the set of similarity scores 1004.

In various aspects, the set of relevant available software features 604 can be a highest similarity-scoring or top similarity-scoring subset of the set of potentially-relevant available software features 810. For instance, the set of relevant available software features 604 can have a cardinality of p, for any suitable positive integer p<m: a relevant available software feature 604(1) to a relevant available software feature 604(p). In various cases, the relevant available software feature 604(1) can be whichever of the set of potentially-relevant available software features 810 has a highest similarity score, whereas the relevant available software feature 604(p) can be whichever of the set of potentially-relevant available software features 810 has a p-th highest similarity score. In other cases, the set of relevant available software features 604 can be whichever p ones of the set of potentially-relevant available software features 810 have similarity scores that satisfy any suitable threshold value.

Figure 11:
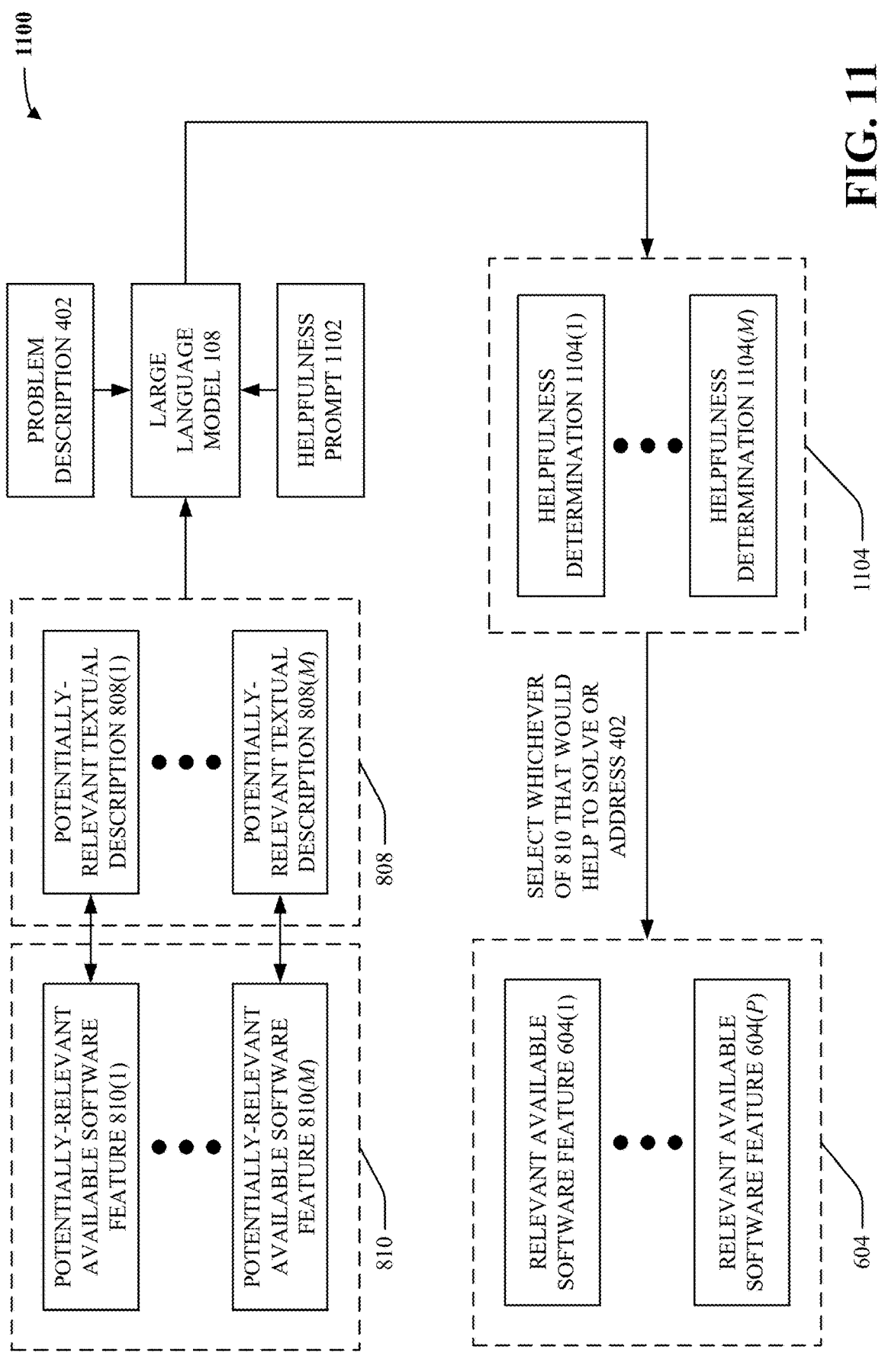

Now, consider FIG. 11. Rather than utilizing the re-ranker 1002 to identify the set of relevant available software features 604, the gap component 122 can instead utilize the semantic inferencing abilities of the LLM 108 to facilitate such identification.

Indeed, in various embodiments, there can be a helpfulness prompt 1102 that is feedable to the LLM 108. In various aspects, the helpfulness prompt 1102 can be one or more unstructured or plain text sentences or sentence fragments that request or command identification of whether or not a respective one of the set of potentially-relevant textual descriptions 808 would solve, address, or otherwise fill (wholly or partially) whatever performance gap is indicated in the problem description 402. As a non-limiting example, for any suitable positive integer j m, the helpfulness prompt 1102 can be the following sentences: "Software feature defined by the potentially-relevant textual description 808 (*j*). Problem defined by the problem description 402. Would implementation of the software feature solve the problem?". As another non-limiting example, the helpfulness prompt 1102 can be the following sentence: "Would implementation of the software feature described in the potentially-relevant textual description 808(*j*) remedy any portion of the deficiency described in the problem description 402?".

Now, in various instances, the gap component 122 can electronically execute the LLM 108 on the problem description 402 and on the helpfulness prompt 1102 with respect to each of the set of potentially-relevant textual descriptions 808. In various cases, such execution can cause the LLM 108 to produce a set of helpfulness determinations 1104.

As a non-limiting example, the gap component 122 can execute the LLM 108 on the problem description 402, on the helpfulness prompt 1102, and on the potentially-relevant textual description 808(1), and such execution can yield a helpfulness determination 1104(1). More specifically, the gap component 122 can concatenate the problem description 402, the helpfulness prompt 1102, and the potentially-relevant textual description 808(1) together. In various aspects, the gap component 122 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the helpfulness determination 1104(1) based on activation maps or feature maps provided by the one or more hidden layers of the synthesizer portion 112. In any case, the helpfulness determination 1104(1) can be one or more unstructured or plain text declarative sentences or sentence fragments that semantically answer or respond to the helpfulness prompt 1102 with respect to the potentially-relevant available software feature 810(1). That is, the helpfulness determination 1104(1) can be synthesized text that describes, explains, or otherwise states whether or not implementation of the potentially-relevant available software feature 810(1) would (in the opinion of the LLM 108) solve, address, fill, or remedy the performance gap indicated in the problem description 402. In other words, the helpfulness determination 1104(1) can be considered as a sort of make-shift helpfulness classification label that the LLM 108 can generate for the potentially-relevant available software feature 810(1).

As another non-limiting example, the gap component 122 can execute the LLM 108 on the problem description 402, on the helpfulness prompt 1102, and on the potentially-relevant textual description 808(*m*), and such execution can yield a helpfulness determination 1104(*m*). More specifically, the gap component 122 can concatenate the problem description 402, the helpfulness prompt 1102, and the potentially-relevant textual description 808(*m*) together, that concatenation can complete a forward pass through the hidden layers of the LLM 108 (e.g., through the encoder portion 110 and the synthesizer portion 112), and the output layer of the LLM 108 can compute or otherwise calculate the helpfulness determination 1104(*m*) based on activation maps or feature maps provided by the one or more hidden layers of the LLM 108. Thus, as above, the helpfulness determination 1104(*m*) can be one or more unstructured or plain text declarative sentences or sentence fragments that semantically answer or respond to the helpfulness prompt 1102 with respect to the potentially-relevant available software feature 810(*m*). That is, the helpfulness determination 1104(*m*) can be synthesized text that describes, explains, or otherwise states whether or not implementation of the potentially-relevant available software feature 810(*m*) would (in the opinion of the LLM 108) solve, address, fill, or remedy the performance gap indicated in the problem description 402. So, the helpfulness determination 1104(*m*) can be considered as a sort of make-shift helpfulness classification label that the LLM 108 can generate for the potentially-relevant available software feature 810(*m*).

Note that the helpfulness determination 1104(1) to the helpfulness determination 1104(*m*) can collectively be considered as the set of helpfulness determinations 1104.

In various aspects, the gap component 122 can identify the set of relevant available software features 604 based on the set of helpfulness determinations 1104. Indeed, the gap component 122 can identify as the set of relevant available software features 604 whichever of the set of potentially-relevant available software features 810 that have been inferred by the LLM 108 to be at least partially helpful in solving, addressing, remedying, rectifying, or otherwise overcoming the performance gap indicated by the problem description 402.

The set of relevant available software features 604 can be considered as being whichever of the plurality of available software features 802 that, if implemented with respect to, plugged into, or added onto the software product 104, would be expected to actually solve or address whatever problem, shortcoming, or limitation is indicated in the problem description 402. In other words, the gap component 122 can determine (e.g., via embedding-based search, via keyword-based search, via the re-ranker 1002, or via helpfulness analysis by the LLM 108) that the set of relevant available software features 604 would fill whatever performance gap is identified by the problem component 120.

Note that any of the set of relevant available software features 604 can, in some embodiments, be considered as the results obtained by searching or crawling the Internet or world-wide web. Indeed, any portion of the available software feature repository 602, and thus of the plurality of available software features 802, can be stored or hosted on the Internet or world-wide web (e.g., third-party software products hosted on internet accessible cloud servers). Accordingly, in such cases, the gap component 122 can be considered as identifying (e.g., via an embedding-based search, via a keyword-based search, or via any other suitable searching technique) any of the set of relevant available software features 604 by searching, scanning, or otherwise crawling the Internet or world-wide web.

Figure 12:
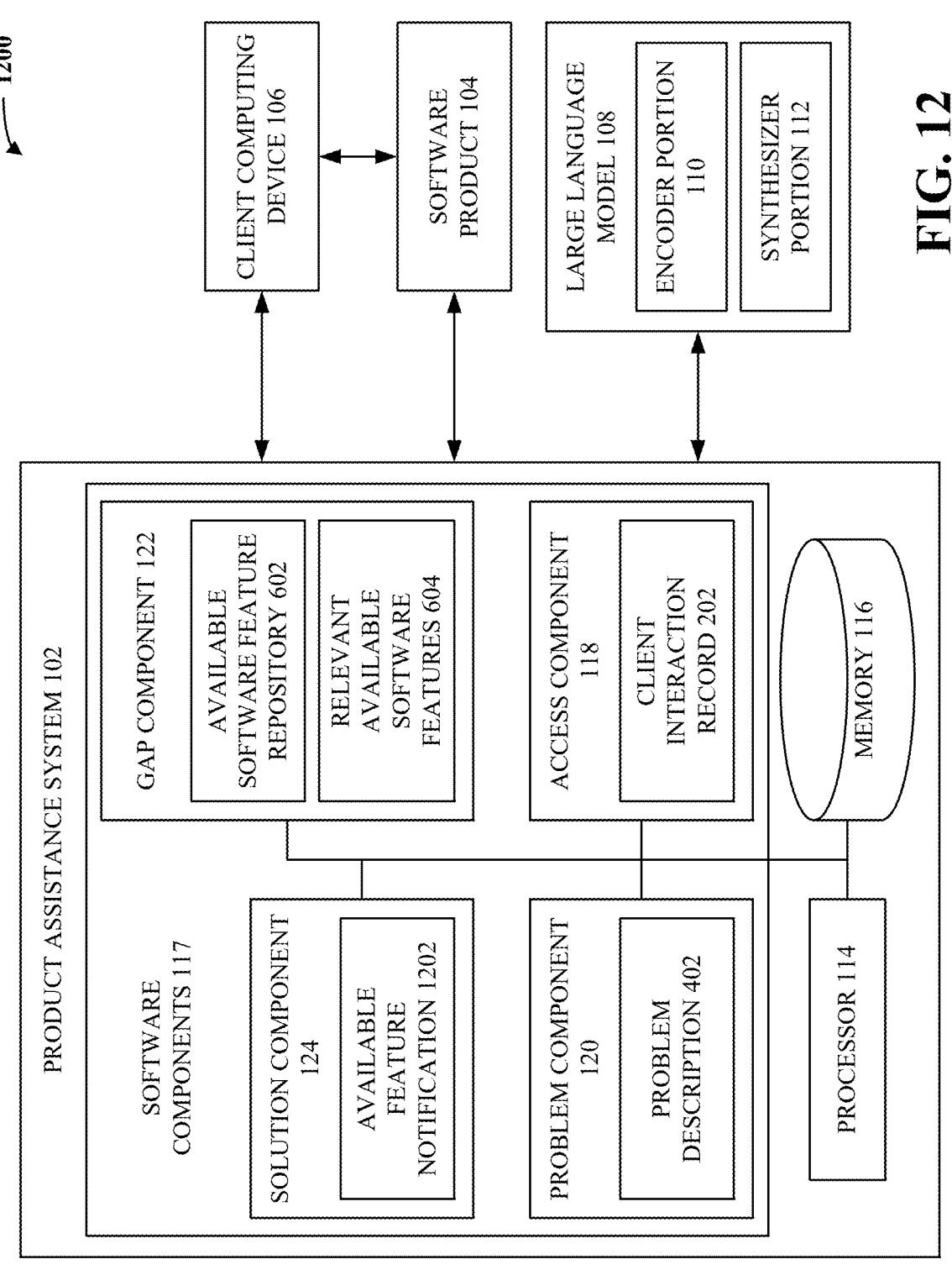
FIG. 12 illustrates a block diagram of an example, non-limiting system including an available feature notification that facilitates automatic product support systems and methods via generative artificial intelligence and customer interactions in accordance with one or more embodiments described herein.

FIG. 12 illustrates a block diagram of an example, non-limiting system 1200 including an available feature notification that can facilitate automatic product support systems and methods via generative artificial intelligence and customer interactions in accordance with one or more embodiments described herein.

In various embodiments, the solution component 124 can, in response to the gap component 122 identifying the set of relevant available software features 604, electronically transmit an available feature notification 1202 to the client computing device 106. Non-limiting aspects are described with respect to FIG. 13.

Figure 13:
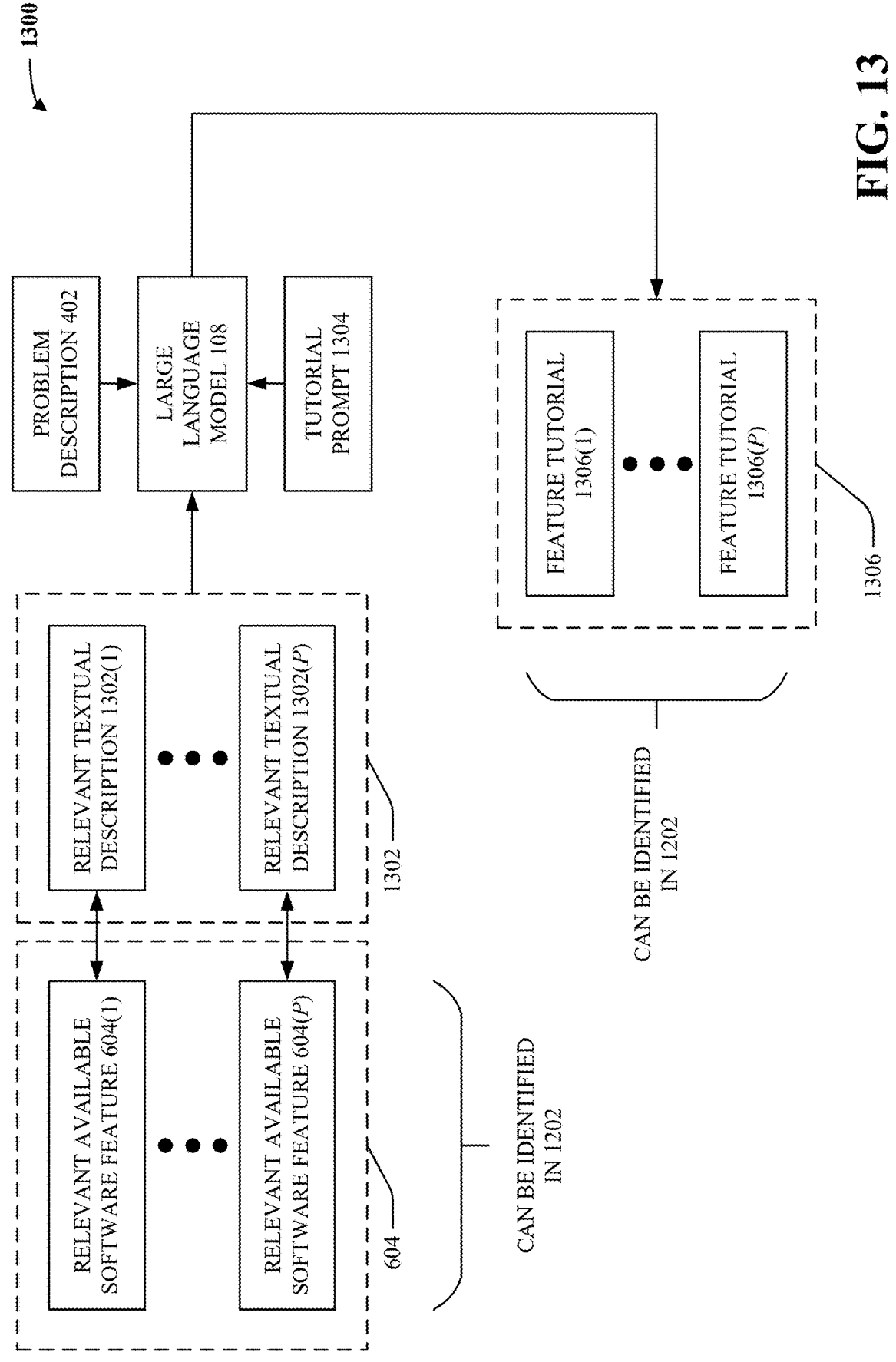
FIG. 13 illustrates an example, non-limiting block diagram regarding an available feature notification in accordance with one or more embodiments described herein.

FIG. 13 illustrates an example, non-limiting block diagram 1300 regarding the available feature notification 1202 in accordance with one or more embodiments described herein.

In various embodiments, the available feature notification 1202 can be any suitable electronic message having any suitable format, size, or dimensionality. In various aspects, the set of relevant available software features 604 can be named, contained, included, or otherwise identified in the available feature notification 1202. Thus, the available feature notification 1202 can be considered as informing or alerting the user or operator that the whatever performance gap (e.g., glitch, absent functionality) that they were inferred to have experienced with the software product 104 can be remedied by implementing, activating, or otherwise utilizing the set of relevant available software features 604. Automated identification and provision of such information can thus be considered as improving a computing experience of the user or operator.

Now, in various aspects, the solution component 124 can further improve the computing experience of the user or operator, by including a set of feature tutorials 1306 within the available feature notification 1202, as described herein.

In various instances, the set of relevant available software features 604 can respectively correspond to a set of relevant textual descriptions 1302. In particular, a relevant textual description 1302(1) can be whichever of the plurality of textual descriptions 804 that corresponds to the relevant available software feature 604(1); a relevant textual description 1302($p$) can be whichever of the plurality of textual descriptions 804 that corresponds to the relevant available software feature 604($p$); and the relevant textual description 1302(1) to the relevant textual description 1302($p$) can collectively be considered as the set of relevant textual descriptions 1302.

In various cases, there can be a tutorial prompt 1304 that is feedable to the LLM 108. In various aspects, the tutorial prompt 1304 can be one or more unstructured or plain text sentences or sentence fragments that request or command identification of how whatever software feature that is described by a respective one of the set of relevant textual descriptions 1302 can or should be implemented to solve the performance gap that is indicated in the problem description 402. As a non-limiting example, for any suitable positive integer $i \leq p$, the tutorial prompt 1304 can be the following sentences: "Software feature defined by the relevant textual description 1302($i$). Problem defined by the problem description 402. What are the instructions for solving the problem with the software feature?". As another non-limiting example, the tutorial prompt 1304 can be the following sentence: "Identify the steps needed to activate or deploy the software feature described in the relevant textual description 1302($j$) to remedy the performance gap described in the problem description 402.".

Now, in various instances, the gap component 122 can electronically execute the LLM 108 on the problem description 402 and on the tutorial prompt 1304 with respect to each of the set of relevant textual descriptions 1302. In various cases, such execution can cause the LLM 108 to produce the set of feature tutorials 1306.

As a non-limiting example, the gap component 122 can execute the LLM 108 on the problem description 402, on the tutorial prompt 1304, and on the relevant textual description 1302(1), and such execution can yield a feature tutorial 1306(1). More specifically, the gap component 122 can concatenate the problem description 402, the tutorial prompt 1304, and the relevant textual description 1302(1) together. In various aspects, the gap component 122 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the feature tutorial 1306(1) based on activation maps or feature maps provided by the one or more hidden layers of the synthesizer portion 112. In any case, the feature tutorial 1306(1) can be one or more unstructured or plain text declarative sentences or sentence fragments that semantically answer or respond to the tutorial prompt 1304 with respect to the relevant available software feature 604(1). That is, the feature tutorial 1306(1) can be synthesized text that describes, explains, shows, or otherwise teaches what specific sequence of steps should (in the opinion of the LLM 108) be taken to implement, invoke, or activate the relevant available software feature 604(1) and thereby solve at least a portion of the performance gap indicated in the problem description 402. In some cases, the feature tutorial 1306(1) can comprise synthesized diagrams or images that help to elaborate or elucidate whatever steps are needed to implement the relevant available software feature 604(1). In other words, the feature tutorial 1306(1) can, in some aspects, be newly generated text, images, or videos that help to explain or clarify how to utilize the relevant available software feature 604(1) to solve or address the performance gap. However, it should be appreciated that this is a mere non-limiting example. In other aspects, the feature tutorial 1306(1) can instead be any portion of a document, video, or other operator/user training material regarding the relevant available software feature 604(1) that the gap component 122 or the LLM 108 has gathered or referred to.

As another non-limiting example, the gap component 122 can execute the LLM 108 on the problem description 402, on the tutorial prompt 1304, and on the relevant textual description 1302($p$), and such execution can yield a feature tutorial 1306($p$). More specifically, the gap component 122 can concatenate the problem description 402, the tutorial prompt 1304, and the relevant textual description 1302($p$) together, that concatenation can complete a forward pass through the hidden layers of the LLM 108 (e.g., through the encoder portion 110 and the synthesizer portion 112), and the output layer of the LLM 108 can compute or otherwise calculate the feature tutorial 1306($p$) based on activation maps or feature maps provided by the one or more hidden layers of the LLM 108. Thus, as above, the feature tutorial 1306($p$) can be one or more unstructured or plain text declarative sentences or sentence fragments that semantically answer or respond to the tutorial prompt 1304 with respect to the relevant available software feature 604($p$). That is, the feature tutorial 1306($p$) can be synthesized text (or images or diagrams) that describes, explains, shows, or otherwise teaches what specific sequence of steps should (in the opinion of the LLM 108) be taken to implement, invoke, or activate the relevant available software feature 604($p$) and thereby solve at least a portion of the performance gap indicated in the problem description 402. That is, the feature tutorial 1306(p) can, in some aspects, be newly generated text, images, or videos that help to explain or clarify how to utilize the relevant available software feature 604(p) to solve or address the performance gap. However, it should again be appreciated that this is a mere non-limiting example. In other aspects, the feature tutorial 1306(p) can instead be any portion of a document, video, or other operator/user training material regarding the relevant available software feature 604(p) that the gap component 122 or the LLM 108 has gathered or referred to.

In various aspects, the feature tutorial 1306(1) to the feature tutorial 1306(p) can collectively be considered as the set of feature tutorials 1306. In various instances, the set of feature tutorials 1306 can be contained, included, or otherwise identified in the available feature notification 1202. Thus, not only can the solution component 124 notify the user or operator of the set of relevant available software features 604, but the solution component 124 can also teach the user or operator how to implement respective ones of the set of relevant available software features 604.

In some cases, any given relevant available software feature of the set of relevant available software features 604 can be automatically invocable or implementable (e.g., can require no manual steps for activation or download). In such cases, the solution component 124 can automatically invoke or implement that given relevant available software feature (e.g., can automatically perform the sequence of steps indicated in whatever feature tutorial that the LLM 108 synthesized for that given relevant available software feature). In some aspects, if the software product 104 has an adaptable user-interface, the solution component 124 can electronically adapt or otherwise actuate the user-interface directly such that the given relevant available software feature is viewable or invocable on the current user-interface of the software product 104.

Thus far, the herein disclosure has mainly described various embodiments in which the gap component 122 successfully identifies the set of relevant available software features 604. However, in some cases, the set of relevant available software features 604 might not exist. That is, it is possible that the gap component 122 might identify nothing in the available software feature repository 602 that is semantically related or relevant to the problem description 402. Non-limiting aspects of such embodiments are described with respect to FIGS. 14-22.

Figure 14:
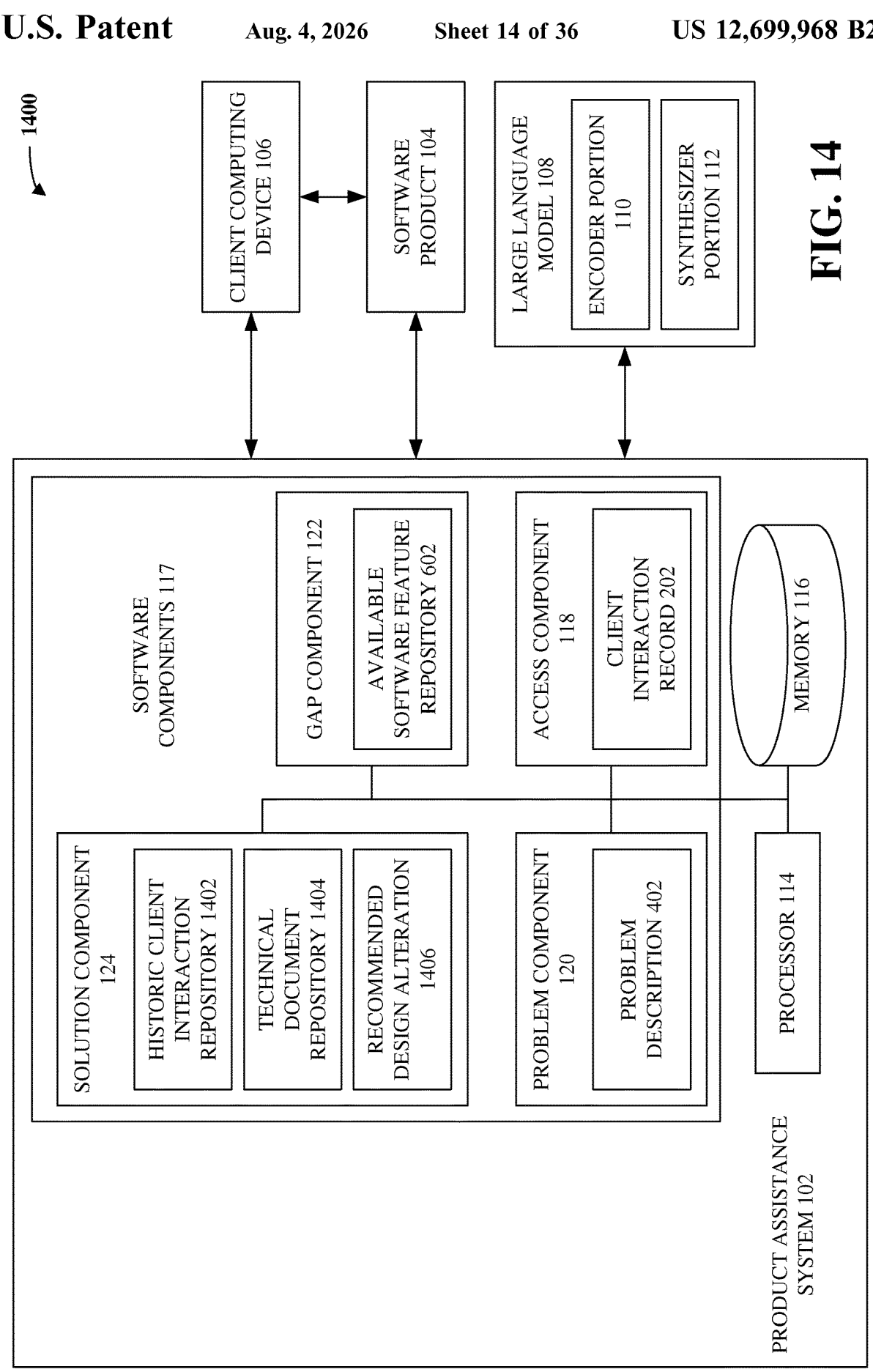
FIG. 14 illustrates a block diagram of an example, non-limiting system including an historic client interaction repository, a technical document repository, and a recommended design alteration that facilitates automatic product support systems and methods via generative artificial intelligence and customer interactions in accordance with one or more embodiments described herein.

FIG. 14 illustrates a block diagram of an example, non-limiting system 1400 including an historic client interaction repository, a technical document repository, and a recommended design alteration that can facilitate automatic product support systems and methods via generative artificial intelligence and customer interactions in accordance with one or more embodiments described herein.

In various embodiments, as mentioned above, it is possible that the gap component 122 cannot or does not identify the set of relevant available software features 604. This can be interpreted to mean that there is no known or already-made computerized add-on or plug-in that can solve or address whatever performance gap is indicated by the problem description 402. In response to the gap component 122 not identifying the set of relevant available software features 604, the solution component 124 can electronically generate a recommended design alteration 1406, by leveraging the LLM 108, by leveraging an historic client interaction repository 1402, or by leveraging a technical document repository 1404. Non-limiting details are described with respect to FIGS. 15-19.

First, consider FIG. 15. FIG. 15 illustrates an example, non-limiting block diagram 1500 of the historic client interaction repository 1402 and the technical document repository 1404 in accordance with one or more embodiments described herein.

In various embodiments, as shown, the historic client interaction repository 1402 can comprise a plurality of past client interaction records 1502. In various aspects, the plurality of past client interaction records 1502 can comprise r records, for any suitable positive integer r>1: a past client interaction record 1502(1) to a past client interaction record 1502(r). In various instances, each of the plurality of past client interaction records 1502 can have the same format, size, or dimensionality as the client interaction record 202. In particular, each of the plurality of past client interaction records 1502 can be any suitable electronic data (e.g., chatbot conversation, audio recording, video recording, user-interface recording, other textual document) that represents or conveys an interaction that some respective user or operator had in the past with the software product 104. In other words, the plurality of past client interaction records 1502 can be from or otherwise correspond to multiple, distributed, or separate computing clients that use or have used the software product 104 (or that use or have used multiple, distributed, or separate copies or instantiations of the software product 104). As a non-limiting example, the past client interaction record 1502(1) can comprise a first chatbot conversation, audio recording, video recording, user-interface recording, or textual document that conveys an interaction that a first user or operator had with the software product 104 (or with a first copy or instantiation of the software product 104). As another non-limiting example, the past client interaction record 1502(r) can comprise an r-th chatbot conversation, audio recording, video recording, user-interface recording, or textual document that conveys an interaction that an r-th user or operator had with the software product 104 (or with an r-th copy or instantiation of the software product 104).

It is to be appreciated that the historic client interaction repository 1402 need not be centralized. In other words, the historic client interaction repository 1402 can be made up of any suitable number of decentralized shards or sub-repositories. Moreover, there may be a plurality of client interaction repositories or histories across various customers of the software product 104.

In various embodiments, as shown, the technical document repository 1404 can comprise a plurality of technical documents 1504. In various aspects, the plurality of technical documents 1504 can comprise s documents, for any suitable positive integer s>1: a technical document 1504(1) to a technical document 1504(s). In various instances, each of the plurality of technical documents 1504 can be any suitable electronic file (e.g., word-doc file, PDF file, webpage file) that textually (or, in some cases, graphically or numerically) describes, teaches, shows, indicates, or otherwise conveys one or more technical details, teachings, characteristics, or other aspects of any suitable software products (which may or may not include the software product 104).

As a non-limiting example, any of the plurality of technical documents 1504 can be a user manual, service manual, operating manual, technical handbook, or any sentence, paragraph, page, section, or chapter thereof, which can textually describe or explain (or possibly visually show via diagrams) any suitable technical details or operating details regarding any suitable software product. Any such technical document can thus explain, list, or show: an architecture, construction, or design of a given software product; different functionalities provided by the given software product; how to operate or use the given software product; or how to troubleshoot, maintain, or care for the given software product.

As another non-limiting example, any of the plurality of technical documents 1504 can be a service log, or any entry thereof, which can textually describe or explain (or possibly visually show via diagrams) any suitable past maintenance activities that were performed on or with respect to any suitable software product. Any such technical document can thus explain, list, or show: the date on which a particular service or maintenance task was performed on a given software product; a description of what steps or actions (e.g., what specific coding edits) that particular service or maintenance task included; a description of what particular limitation, problem, or symptom that particular service or maintenance task was intended or expected to solve or address; a description of whether or not the particular service or maintenance task successfully addressed that particular limitation, problem, or symptom; or a description of any other observations or comments made by whichever technician or engineer performed the particular service or maintenance task on the given software product.

As still another non-limiting example, any of the plurality of technical documents 1504 can be a code base or programming script, or any line, page, loop, or section thereof, which can define any suitable software product using any suitable coding language or coding syntax. Any such technical document can thus be: a source code file that contains executable instructions or non-executable comments of any given software product; a software library or package that is called or otherwise depended upon by the given software product; a configuration file that defines settings, parameters, or options used by the given software product; or a version control history that tracks or shows what specific changes were made at which specific times to the code base or programming script of the given software product.

As yet another non-limiting example, any of the plurality of technical documents 1504 can be a standard operating procedure, or any sentence, paragraph, page, or other portion thereof, which can textually describe or explain (or possibly visually show via diagrams) how to perform some specific task associated with any suitable software product. For instance, a standard operating procedure promulgated by a manufacturer or developer of a given software product can explain, list, or show what specific steps are needed to: properly or safely edit, change, supplement, or otherwise alter a code base or programming script of a given software product (e.g., where or how to insert respective loops or types of code; where or how to add comments); or debug or troubleshoot an edit, change, supplementation, or alteration made to the code base or programming script of the given software product.

As even another non-limiting example, any of the plurality of technical documents 1504 can be any other miscellaneous type of technical document pertaining to any suitable software product. For instance, any such technical document can be: a published patent or published patent application that regards any given software product specifically or that regards computer science more generally; a published research paper that regards any given software product specifically or that regards computer science more generally; a published commercial advertisement that regards any given software product specifically or that regards computer science more generally; a published video demonstration that regards any given software product specifically or that regards computer science more generally; or a published article or blog that regards any given software product specifically or that regards computer science more generally.

It is to be appreciated that the technical document repository 1404 need not be centralized. In other words, the technical document repository 1404 can be made up of any suitable number of decentralized shards or sub-repositories. Indeed, any portion of the technical document repository 1404 (e.g., any of the plurality of technical documents 1504) can be considered as being stored or hosted on the Internet or open web.

FIGS. 16-19 illustrate example, non-limiting block diagrams 1600, 1700, 1800, and 1900 showing how the historic client interaction repository 1402 and the technical document repository 1404 can be leveraged to generate the recommended design alteration 1406 in accordance with one or more embodiments described herein.

Figure 16:
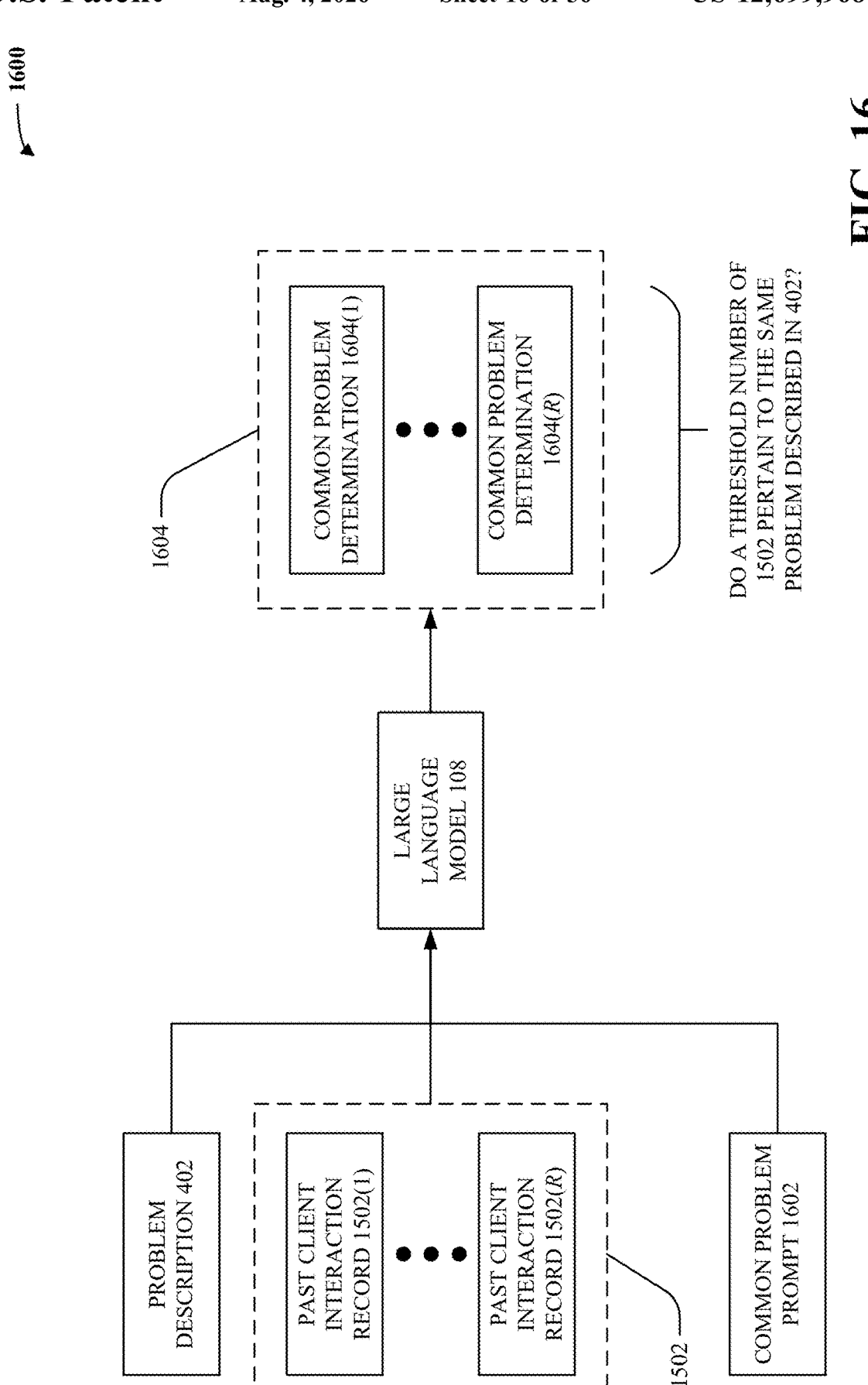
FIGS. 16-19 illustrate example, non-limiting block diagrams showing how an historic client interaction repository and a technical document repository can be leveraged by a large language model to generate a recommended design alteration for a software product in accordance with one or more embodiments described herein.

First, consider FIG. 16. In various embodiments, the solution component 124 can, in response to the gap component 122 not identifying the set of relevant available software features 604, electronically search the historic client interaction repository 1402 to determine whether or not the performance gap indicated in the problem description 402 is widespread-enough to merit or warrant creation of a solution.

In particular, there can be a common problem prompt 1602 that is feedable to the LLM 108. In various aspects, the common problem prompt 1602 can be one or more unstructured or plain text sentences or sentence fragments that request or command identification of whether or not a respective one of the plurality of past client interaction records 1502 conveys or suggests the same performance gap that is indicated in the problem description 402. As a non-limiting example, for any suitable positive integer k; r, the common problem prompt 1602 can be the following sentences: "Problem defined by the problem description 402. Does the past client interaction record 1502(k) indicate the problem?". As another non-limiting example, the common problem prompt 1602 can be the following sentence: "Determine whether or not the past client interaction record 1502(k) suggests the same software deficiency indicated by the problem description 402.".

Now, in various instances, the solution component 124 can electronically execute the LLM 108 on the problem description 402 and on the common problem prompt 1602 with respect to each of the plurality of past client interaction records 1502. In various cases, such execution can cause the LLM 108 to produce a plurality of common problem determinations 1604.

As a non-limiting example, the solution component 124 can execute the LLM 108 on the problem description 402, on the common problem prompt 1602, and on the past client interaction record 1502(1), and such execution can yield a common problem determination 1604(1). More specifically, the solution component 124 can concatenate the problem description 402, the common problem prompt 1602, and the past client interaction record 1502(1) together. In various aspects, the solution component 124 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the common problem determination 1604(1) based on activation maps or feature maps provided by the one or more hidden layers of the synthesizer portion 112. In any case, the common problem determination 1604(1) can be one or more unstructured or plain text declarative sentences or sentence fragments that semantically answer or respond to the common problem prompt 1602 with respect to the past client interaction record 1502(1). That is, the common problem determination 1604(1) can be synthesized text that describes, explains, or otherwise states whether or not the past client interaction record 1502(1) indicates or suggests (in the opinion of the LLM 108) the same (or similar, as measured via any suitable threshold margin of similarity) performance gap that is described in the problem description 402 (e.g., whether or not the past client interaction record 1502(1) and the problem description 402 pertain to the same or common software problem as each other). In other words, the common problem determination 1604(1) can be considered as a sort of make-shift commonality classification label that the LLM 108 can generate for the past client interaction record 1502(1).

As another non-limiting example, the solution component 124 can execute the LLM 108 on the problem description 402, on the common problem prompt 1602, and on the past client interaction record 1502($r$), and such execution can yield a common problem determination 1604($r$). More specifically, the solution component 124 can concatenate the problem description 402, the common problem prompt 1602, and the past client interaction record 1502($r$) together, that concatenation can complete a forward pass through the hidden layers of the LLM 108 (e.g., through the encoder portion 110 and the synthesizer portion 112), and the output layer of the LLM 108 can compute or otherwise calculate the common problem determination 1604($r$) based on activation maps or feature maps provided by the one or more hidden layers of the LLM 108. Thus, as above, the common problem determination 1604($r$) can be one or more unstructured or plain text declarative sentences or sentence fragments that semantically answer or respond to the common problem prompt 1602 with respect to the past client interaction record 1502($r$). That is, the common problem determination 1604($r$) can be synthesized text that describes, explains, or otherwise states whether or not the past client interaction record 1502($r$) indicates or suggests (in the opinion of the LLM 108) the same (or similar) performance gap that is described in the problem description 402. So, the common problem determination 1604($r$) can be considered as a sort of make-shift commonality classification label that the LLM 108 can generate for the past client interaction record 1502($r$).

Note that the common problem determination 1604(1) to the common problem determination 1604($r$) can collectively be considered as the plurality of common problem determinations 1604.

In various aspects, the solution component 124 can count how many of the plurality of past client interaction records 1502 are determined or inferred by the LLM 108 to pertain to or suggest the same (or similar) performance gap that is indicated in the problem description 402. If fewer than any suitable threshold number of the plurality of past client interaction records 1502 are determined or inferred by the LLM 108 to pertain to or suggest the same (or similar) performance gap that is indicated in the problem description 402, the solution component 124 can conclude that such performance gap is too rare (e.g., is not common enough) to warrant or merit a solution. Accordingly, the solution component 124 can electronically transmit to the client computing device 106 any suitable notification (not shown) indicating such conclusion. However, if at least a threshold number of the plurality of past client interaction records 1502 are determined or inferred by the LLM 108 to pertain to or suggest the same (or similar) performance gap that is indicated in the problem description 402, the solution component 124 can conclude that such performance gap is widespread or common enough to warrant or merit a solution. Accordingly, the solution component 124 can electronically generate the recommended design alteration 1406, as described with respect to FIGS. 17-19.

Figure 17:
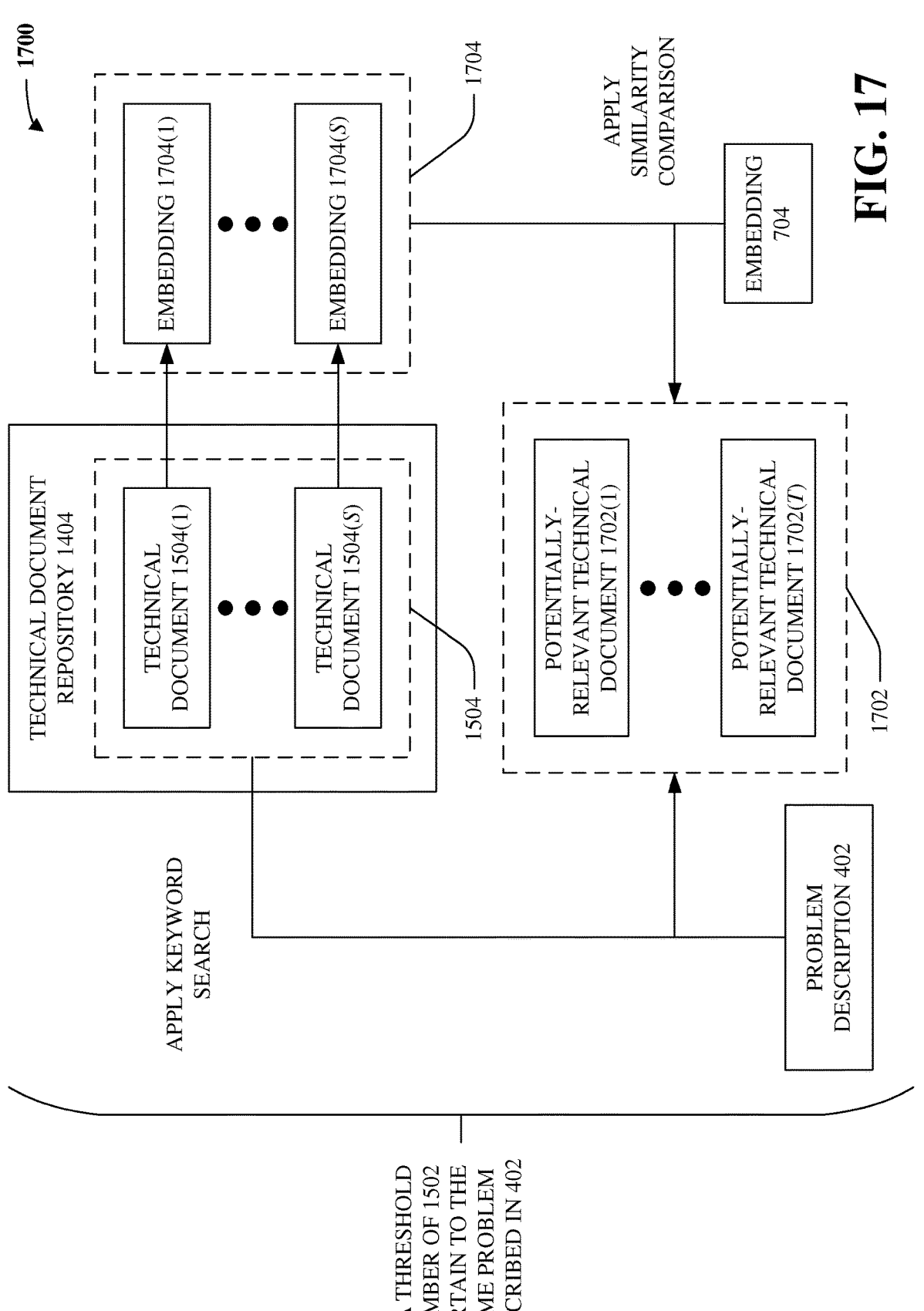

Consider FIG. 17. In various embodiments, the solution component 124 can, in response to there being at least a threshold number of the plurality of past client interaction records 1502 that pertain to the same performance gap that is indicated in the problem description 402, electronically identify a set of potentially-relevant technical documents 1702 within the technical document repository 1404.

In some cases, the solution component 124 can facilitate identification of the set of potentially-relevant technical documents 1702 via embedding-based searching. In particular, the solution component 124 can generate a plurality of embeddings 1704, by executing the LLM 108 on each of the plurality of technical documents 1504 and extracting from the encoder portion 110 a respective embedding.

As a non-limiting example, the solution component 124 can execute the LLM 108 on the technical document 1504(1), and the solution component 124 can extract, during that execution, an embedding 1704(1). Indeed, the solution component 124 can feed or route the technical document 1504(1) to the input layer of the encoder portion 110, the technical document 1504(1) can complete a forward pass through the one or more hidden layers of the encoder portion 110, and the output layer of the encoder portion 110 can compute or otherwise calculate the embedding 1704(1), based on activation maps or feature maps provided by the one or more hidden layers of the encoder portion 110. So, the embedding 1704(1) can be considered as a latent vector representation of the technical document 1504(1). In some cases, the embedding 1704(1) can then complete a forward pass through the synthesizer portion 112, but the solution component 124 can ignore, disregard, or delete whatever synthesized textual content the synthesizer portion 112 creates based on the embedding 1704(1).

As another non-limiting example, the solution component 124 can execute the LLM 108 on the technical document 1504($s$), and the solution component 124 can extract, during that execution, an embedding 1704($s$). In particular, the solution component 124 can feed or route the technical document 1504($s$) to the input layer of the encoder portion 110, the technical document 1504($s$) can complete a forward pass through the one or more hidden layers of the encoder portion 110, and the output layer of the encoder portion 110 can compute or otherwise calculate the embedding 1704($s$), based on activation maps or feature maps provided by the one or more hidden layers of the encoder portion 110. Thus, the embedding 1704($s$) can be considered as a latent vector representation of the technical document 1504($s$). As above, the embedding 1704($s$) can then complete a forward pass through the synthesizer portion 112, but the solution component 124 can ignore, disregard, or delete whatever synthesized textual content the synthesizer portion 112 creates based on the embedding 1704($s$).

Note that the embedding 1704(1) to the embedding 1704($s$) can collectively be considered as the plurality of embeddings 1704. In various aspects, the solution component 124 can electronically identify the set of potentially-relevant technical documents 1702 by comparing the embedding 704 (corresponding to the problem description 402) with the plurality of embeddings 1704. As above, for each given embedding of the plurality of embeddings 1704, the solution component 124 can compute any suitable error or similarity value (e.g., MAE, MSE, cosine similarity, Euclidean distance, cross-entropy) between that given embedding and the embedding 704. Accordingly, the solution component 124 can identify as the set of potentially-relevant technical documents 1702 whichever of the plurality of technical documents 1504 whose embeddings are most similar to, closest to, or otherwise within any suitable threshold margin of the embedding 704. In the non-limiting example of FIG. 17, the set of potentially-relevant technical documents 1702 can comprise t documents, for any suitable positive integer t<s: a potentially-relevant technical document 1702(1) to a potentially-relevant technical document 1702($t$).

In other cases, the solution component 124 can facilitate identification of the set of potentially-relevant technical documents 1702 via keyword-based searching. Indeed, in various embodiments, the solution component 124 can electronically identify (e.g., via any suitable named-entity recognition or extraction technique) one or more keywords (not shown) that are recited in the problem description 402, and the solution component 124 can search through the plurality of technical documents 1504 for whatever keywords are extracted from the problem description 402. Thus, the set of potentially-relevant technical documents 1702 can be whichever of the plurality of technical documents 1504 that recite the same keywords as the problem description 402 (e.g., that each recite at least one of the keywords that are recited in the problem description 402; or that each recite all of the keywords that are recited in the problem description 402).

In some aspects, the solution component 124 can utilize both embedding-based searching and keyword-based searching to identify the set of potentially-relevant technical documents 1702. In any case, the set of potentially-relevant technical documents 1702 can be considered as being a subset of the plurality of technical documents 1504 that are semantically related to the problem description 402 and thus that might contain information that could help to solve or address whatever performance gap is indicated in the problem description 402.

Figure 18:
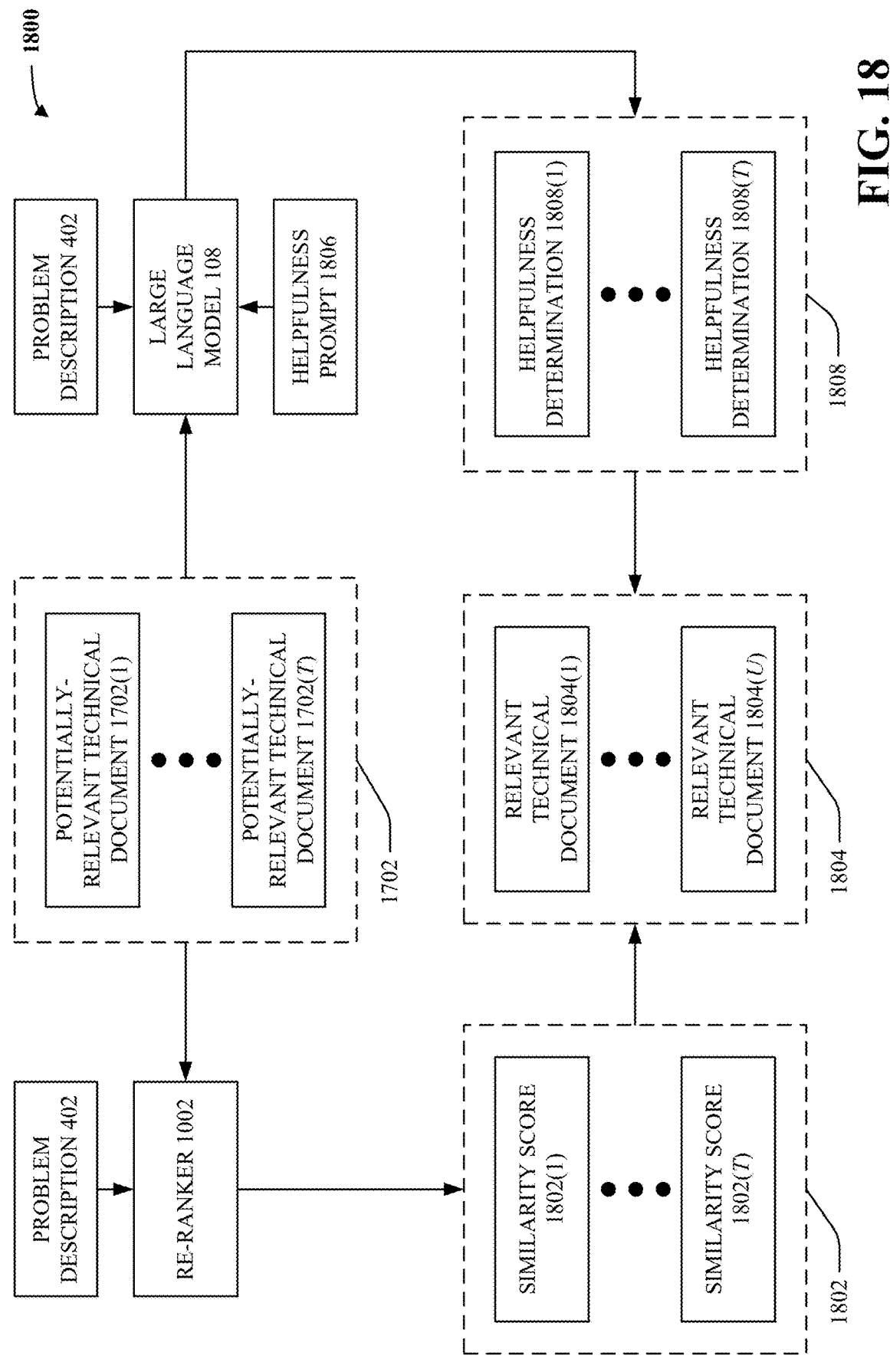

Now, consider FIG. 18. In various embodiments, the solution component 124 can identify a set of relevant technical documents 1804, by filtering the set of potentially-relevant technical documents 1702.

In some cases, the solution component 124 can facilitate such filtering via the re-ranker 1002. Indeed, in various aspects, the solution component 124 can execute the re-ranker 1002 on the problem description 402 and on each of the set of potentially-relevant technical documents 1702, and such execution can cause the re-ranker 1002 to produce a set of similarity scores 1802.

As a non-limiting example, the solution component 124 can execute the re-ranker 1002 on both the problem description 402 and the potentially-relevant technical document 1702(1), and such execution can yield a similarity score 1802(1). More specifically, the solution component 124 can concatenate the problem description 402 with the potentially-relevant technical document 1702(1), the solution component 124 can feed or route that concatenation to the input layer of the re-ranker 1002, that concatenation can complete a forward pass through the one or more hidden layers of the re-ranker 1002, and the output layer of the re-ranker 1002 can compute or otherwise calculate the similarity score 1802(1) based on activation maps or feature maps provided by the one or more hidden layers of the re-ranker 1002. So, the similarity score 1802(1) can be a real-valued scalar whose magnitude indicates how much semantic relevance the potentially-relevant technical document 1702(1) has with respect to the problem description 402 Note that, in various instances, the similarity score 1802(1) can be considered as a proxy representing how likely or unlikely it is that the potentially-relevant technical document 1702(1) contains information that would be helpful in solving or addressing the performance gap that is indicated by the problem description 402.

As another non-limiting example, the solution component 124 can execute the re-ranker 1002 on both the problem description 402 and the potentially-relevant technical document 1702($t$), and such execution can yield a similarity score 1802($t$). That is, the solution component 124 can concatenate the problem description 402 with the potentially-relevant technical document 1702($t$), the solution component 124 can feed or route that concatenation to the input layer of the re-ranker 1002, that concatenation can complete a forward pass through the one or more hidden layers of the re-ranker 1002, and the output layer of the re-ranker 1002 can compute or otherwise calculate the similarity score 1802($t$) based on activation maps or feature maps provided by the one or more hidden layers of the re-ranker 1002. Thus, the similarity score 1802($t$) can be a real-valued scalar whose magnitude indicates how much semantic relevance the potentially-relevant technical document 1702($t$) has with respect to the problem description 402. So, the similarity score 1802($t$) can be considered as a proxy representing how likely or unlikely it is that the potentially-relevant technical document 1702($t$) contains information that would be helpful in solving or addressing the performance gap that is indicated by the problem description 402.

Note that the similarity score 1802(1) to the similarity score 1802($t$) can collectively be considered as forming the set of similarity scores 1802.

Therefore, in various aspects, the set of relevant technical documents 1804 can be a highest similarity-scoring or top similarity-scoring subset of the set of potentially-relevant technical documents 1702. For instance, the set of relevant technical documents 1804 can have a cardinality of u, for any suitable positive integer u<t: a relevant technical document 1804(1) to a relevant technical document 1804($u$). In various cases, the relevant technical document 1804(1) can be whichever of the set of potentially-relevant technical documents 1702 has a highest similarity score, whereas the relevant technical document 1804($u$) can be whichever of the set of potentially-relevant technical documents 1702 has a u-th highest similarity score. In other cases, the set of relevant technical documents 1804 can be whichever u ones of the set of potentially-relevant technical documents 1702 have similarity scores that satisfy any suitable threshold value.

In other cases, the solution component 124 can facilitate such filtering via leveraging the LLM 108. Indeed, in various embodiments, there can be a helpfulness prompt 1806 that is feedable to the LLM 108. In various aspects, the helpfulness prompt 1806 can be one or more unstructured or plain text sentences or sentence fragments that request or command identification of whether or not a respective one of the set of potentially-relevant technical documents 1702 contains information that would be helpful to solve, address, or otherwise rectify (wholly or partially) whatever performance gap is indicated in the problem description 402. As a non-limiting example, for any suitable positive integer $l \leq t$, the helpfulness prompt 1806 can be the following sentences: "Problem defined by the problem description 402. Does the potentially-relevant technical document 1702($l$) teach how to fix the problem?". As another non-limiting example, the helpfulness prompt 1806 can be the following sentence: "Determine whether or not the potentially-relevant technical document 1702($l$) explains how to remedy any portion of the software deficiency described in the problem description 402.".

Now, in various instances, the solution component 124 can electronically execute the LLM 108 on the problem description 402 and on the helpfulness prompt 1806 with respect to each of the set of potentially-relevant technical documents 1702. In various cases, such execution can cause the LLM 108 to produce a set of helpfulness determinations 1808.

As a non-limiting example, the solution component 124 can execute the LLM 108 on the problem description 402, on the helpfulness prompt 1806, and on the potentially-relevant technical document 1702(1), and such execution can yield a helpfulness determination 1808(1). More specifically, the solution component 124 can concatenate the problem description 402, the helpfulness prompt 1806, and the potentially-relevant technical document 1702(1) together. In various aspects, the solution component 124 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the helpfulness determination 1808(1) based on activation maps or feature maps provided by the one or more hidden layers of the synthesizer portion 112. In any case, the helpfulness determination 1808(1) can be one or more unstructured or plain text declarative sentences or sentence fragments that semantically answer or respond to the helpfulness prompt 1806 with respect to the potentially-relevant technical document 1702(1). That is, the helpfulness determination 1808 (1) can be synthesized text that describes, explains, or otherwise states whether or not the potentially-relevant technical document 1702(1) contains (in the opinion of the LLM 108) information that explains how to fix or rectify the performance gap (or any symptom or aspect thereof) indicated in the problem description 402. In other words, the helpfulness determination 1808(1) can be considered as a sort of make-shift helpfulness classification label that the LLM 108 can generate for the potentially-relevant technical document 1702(1).

As another non-limiting example, the solution component 124 can execute the LLM 108 on the problem description 402, on the helpfulness prompt 1806, and on the potentially-relevant technical document 1702($t$), and such execution can yield a helpfulness determination 1808($t$). In particular, the solution component 124 can concatenate the problem description 402, the helpfulness prompt 1806, and the potentially-relevant technical document 1702($t$) together, that concatenation can complete a forward pass through the hidden layers of the LLM 108 (e.g., through the encoder portion 110 and the synthesizer portion 112), and the output layer of the LLM 108 can compute or otherwise calculate the helpfulness determination 1808($t$) based on activation maps or feature maps provided by the one or more hidden layers of the LLM 108. Thus, as above, the helpfulness determination 1808($t$) can be one or more unstructured or plain text declarative sentences or sentence fragments that semantically answer or respond to the helpfulness prompt 1102 with respect to the potentially-relevant technical document 1702($t$). That is, the helpfulness determination 1808($t$) can be synthesized text that describes, explains, or otherwise states whether or not the potentially-relevant technical document 1702($t$) contains (in the opinion of the LLM 108) information that explains how to fix or rectify the performance gap (or any symptom or aspect thereof) indicated in the problem description 402. In other words, the helpfulness determination 1808($t$) can be considered as a sort of make-shift helpfulness classification label that the LLM 108 can generate for the potentially-relevant technical document 1702($t$).

Note that the helpfulness determination 1808(1) to the helpfulness determination 1808($t$) can collectively be considered as the set of helpfulness determinations 1808.

In various aspects, the solution component 124 can identify the set of relevant technical documents 1804 based on the set of helpfulness determinations 1808. Indeed, the solution component 124 can identify as the set of relevant technical documents 1804 whichever of the set of potentially-relevant technical documents 1702 that have been inferred by the LLM 108 to teach or explain how to at least partially solve, address, remedy, rectify, or otherwise overcome the performance gap indicated by the problem description 402.

Note that, in some embodiments, the LLM 108 can be fine-tuned on client feedback to assist in making the herein-described helpfulness determinations. As an example, suppose that the software product 104 is used to find bronchi in lungs depicted in medical images. Furthermore, suppose that there are multiple technical documents in the technical document repository 1404 that describe how to use the software product 104 to find such bronchi. Further still, suppose that historic client feedback indicates that only a few of those multiple technical documents describe the bronchi-finding process in a clear or satisfactory manner. Such feedback can be used to fine-tune the LLM 108, so that the LLM 108 can infer that those few technical documents are helpful but that the remaining technical documents pertaining to bronchi-finding are unhelpful. In this way, helpfulness analysis of the LLM 108 can take into account past client feedback.

In any case, the set of relevant technical documents 1804 can be considered as being whichever of the plurality of technical documents 1504 that actually contain information that describes how to solve or address whatever problem, shortcoming, or limitation is indicated in the problem description 402. In other words, the solution component 124 can identify (e.g., via embedding-based search, via keyword-based search, via the re-ranker 1002, or via helpfulness analysis by the LLM 108) which specific operating handbook pages or chapters, which specific code base pages or libraries, which specific service log entries, which specific standard operating procedures, or whichever other technical documents that describe how to solve or address whatever performance gap is identified by the problem component 120.

Note that any of the set of relevant technical documents 1804 can, in some embodiments, be considered as the results obtained by searching or crawling the Internet or world-wide web. Indeed, as mentioned above, any portion of the technical document repository 1404, and thus of the plurality of technical documents 1504, can be stored or hosted on the Internet or world-wide web (e.g., service manuals or commercial documentation of third-party software products can be available on the Internet; open-source code packages or scripts can be available on the Internet, such as on GitHub). Accordingly, in such cases, the solution component 124 can be considered as identifying (e.g., via an embedding-based search, via a keyword-based search, or via any other suitable searching technique) any of the set of relevant technical documents 1804 by searching, scanning, or otherwise crawling the Internet or world-wide web.

Figure 19:
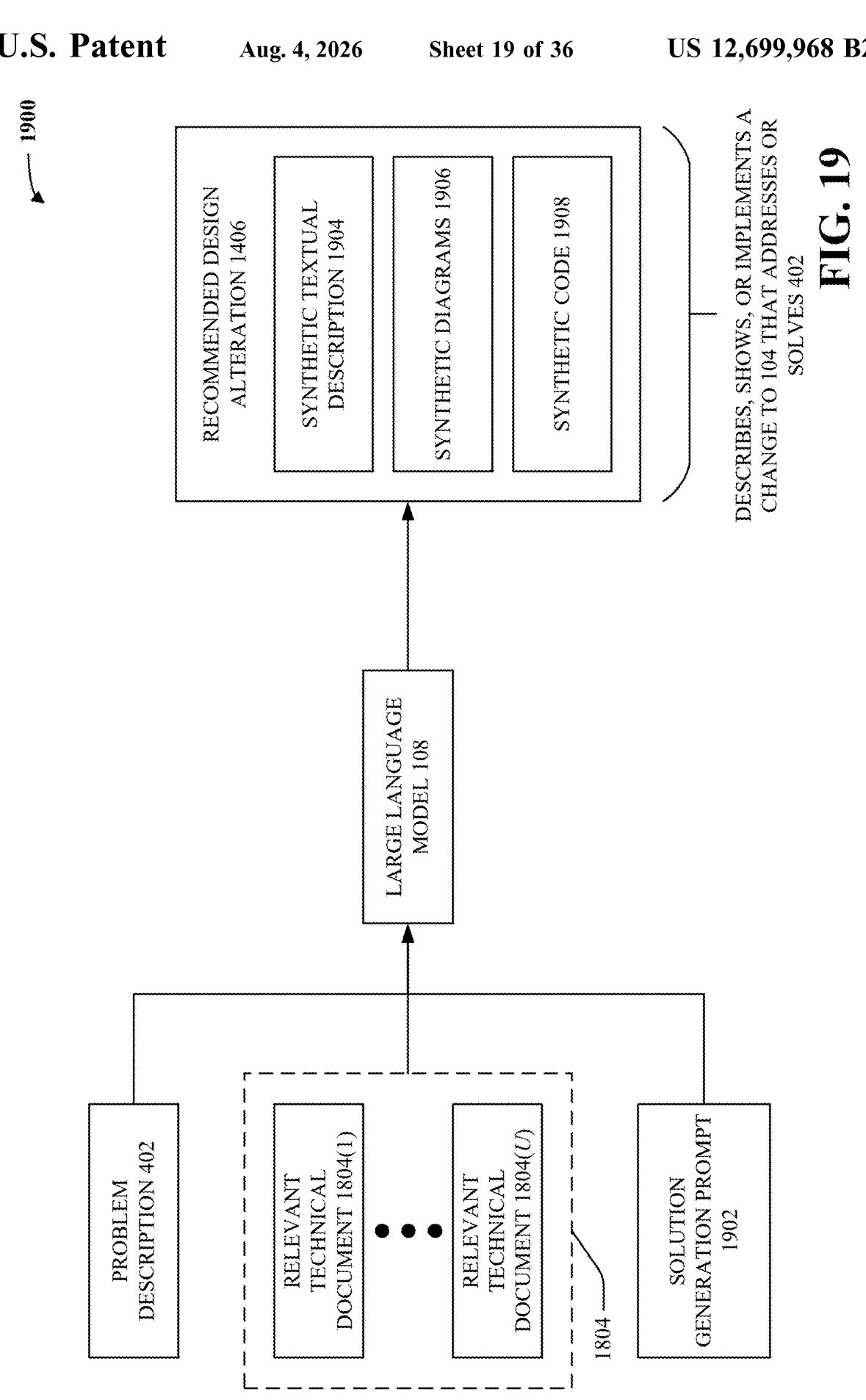

Now, consider FIG. 19. In various embodiments, there can be a solution generation prompt 1902 that is feedable to the LLM 108. In various aspects, the solution generation prompt 1902 can be one or more unstructured or plain text sentences or sentence fragments that request or command identification of a design edit, change, or alteration to the software product 104 that would solve, address, or otherwise rectify (wholly or partially) whatever performance gap is indicated in the problem description 402. As a non-limiting example, the solution generation prompt 1902 can be the following sentences: "Problem defined by the problem description 402. Use the set of relevant technical documents 1804 to determine how to fix the problem.". As another non-limiting example, the solution generation prompt 1902 can be the following sentence: "Explain how to solve the software deficiency described in the problem description 402, by referring to the set of relevant technical documents 1804.".

So, in various instances, the solution component 124 can electronically execute the LLM 108 on the problem description 402, on the set of relevant technical documents 1804, and on the solution generation prompt 1902, and such execution can cause the LLM 108 to produce the recommended design alteration 1406. More specifically, the solution component 124 can concatenate the problem description 402, the set of relevant technical documents 1804, and the solution generation prompt 1902 together. In various aspects, the solution component 124 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the recommended design alteration 1406 based on activation maps or feature maps provided by the one or more hidden layers of the synthesizer portion 112.

In various aspects, the recommended design alteration 1406 can comprise a synthetic textual description 1904, one or more synthetic diagrams 1906, or synthetic code 1908.

In various instances, the synthetic textual description 1904 can be one or more unstructured or plain text declarative sentences or sentence fragments that semantically answer or respond to the solution generation prompt 1902. That is, the synthetic textual description 1904 can be synthesized text that describes, explains, or otherwise states how to solve, address, fix, rectify, or otherwise ameliorate the performance gap (or any symptom or aspect thereof) indicated in the problem description 402. Indeed, in some cases, the synthetic textual description 1904 can be a list of granular or specific actions or steps which are sourced or derived from the set of relevant technical documents 1804 and which, if performed in sequence on or with respect to the software product 104, would repair or eliminate the deficiency indicated by the problem description 402. As a non-limiting example, the LLM 108 can infer, based on the substantive content of the set of relevant technical documents 1804, that the software deficiency indicated in the problem description 402 would be solved or addressed by performing one or more particular edits, changes, insertions, or deletions at one or more respective locations within the code base or programming script (e.g., at one or more specific script lines, script loops, or script modules) of the software product 104, and the synthetic textual description 1904 can be considered as a synthesized textual distillation or summary of that inference (e.g., such inference can be based on the operating handbook sections, service log entries, or code base snippets contained in the set of relevant technical documents 1804).

For instance, suppose that the problem description 402 indicates that the software product 104 experiences a specific type of glitch, and suppose that the LLM 108 infers that such specific glitch can be repaired by commenting-out line A in the code base or programming script of the software product 104 and by changing a for-loop in line B to a while-loop in the code base or programming script of the software product 104. In such case, the synthetic textual description 1904 can describe or explain that line A should be commented-out and that line B should be edited to recite a while-loop instead of a for-loop.

As another instance, suppose that the problem description 402 indicates that the software product 104 lacks a specific functionality, and suppose that the LLM 108 infers that such specific functionality can be gained by inserting at line C in the code base or programming script of the software product 104 an if-loop that contains a particular computational formula. In such case, the synthetic textual description 1904 can identify that particular computational formula and can describe or explain that it should be inserted in an if-loop at line C.

As even another instance, suppose that the problem description 402 indicates that the software product 104 has a difficult-to-view GUI, and suppose that the LLM 108 infers that the GUI can be made easier to view by increasing by D % the font-size argument of a print-command located at line E of the code base or programming script of the software product 104. In such case, the synthetic textual description 1904 can describe or explain that the font-size argument of the print-command at line E should be increased by D %.

In various aspects, the one or more synthetic diagrams 1906 can be any suitable pixel arrays or voxel arrays that serve as supplemental visualizations for the synthetic textual description 1904. In other words, the one or more synthetic diagrams 1906 can be considered as fake images that the LLM 108 has created to help further elaborate or clarify the synthetic textual description 1904. As a non-limiting example, suppose that the synthetic textual description 1904 states that the software deficiency indicated in the problem description 402 would be fixed by performing one or more particular edits, changes, insertions, or deletions at one or more respective locations within the code base or programming script of the software product 104. In some cases, the one or more synthetic diagrams 1906 can be hierarchical trees or block diagrams whose discrete visual elements conceptually represent respective discrete portions or modules of the code base or programming script of the software product 104, and that illustrate: a current structure or organization of the code base or programming script of the software product 104; where within the code base or programming script whatever edits are described by the synthetic textual description 1904 should be made; or what the structure or organization of the code base or programming script would be after implementation of whatever edits are described by the synthetic textual description 1904. In other cases, the one or more synthetic diagrams 1906 can be flow charts whose discrete visual elements conceptually represent respective discrete functionalities facilitated by the software product 104, and that illustrate: a current functionality flow of the software product 104; or what the functionality flow of the software product 104 would be after implementation of whatever edits are described by the synthetic textual description 1904. In some cases, the one or more synthetic diagrams 1906 can be a time-series of synthetic video frames, such that the one or more synthetic diagrams 1906 can be collectively considered as a synthetic video that substantively elaborates or clarifies the synthetic textual description 1904.

Regarding the one or more synthetic diagrams 1906, it should be appreciated that the LLM 108 can include or comprise any suitable internal structure or architecture that is amenable for text-to-image or text-to-video generation. A non-limiting example of such structure or architecture is a transformer-based model, such as a variant of BERT (Bidirectional Encoder Representations from Transformers), which can learn patterns in inputted text and generate corresponding images or video frames. Furthermore, it should be appreciated that the one or more synthetic diagrams 1906 can, after generation or synthesis, be refined or customized using any suitable computer vision techniques, such as image editing software or 3D modeling tools.

In various aspects, the synthetic code 1908 can be one or more lines of formatted computer code that implement or otherwise embody whatever edits are described by the synthetic textual description 1904. In various instances, the synthetic code 1908 can be written in any suitable coding syntax or language that the LLM 108 infers is compatible with or otherwise appropriate for the software product 104 and can be marked or flagged for insertion at whichever locations within the code base or programming script of the software product 104 that the LLM 108 infers is appropriate (e.g., such inferences can be based on the code base snippets or standard operating procedures contained in the set of relevant technical documents 1804). In other words, the synthetic textual description 1904 can be unstructured text that describes one or more specific edits (e.g., describes one or more specific for-loop insertions or deletions, computational formula insertions or deletions, or function argument insertions or deletions) that the LLM 108 has inferred would solve the performance gap indicated by the problem description 402, whereas the synthetic code 1908 can be structured code that implements or facilitates those one or more specific edits (e.g., can be those one or more specific for-loop insertions or deletions, computational formula insertions or deletions, or function argument insertions or deletions).

For instance, consider the above example where the problem description 402 indicates that the software product 104 experiences a specific type of glitch, and where the LLM 108 infers that such specific glitch can be repaired by commenting-out line A in the code base or programming script of the software product 104 and by changing a for-loop in line B to a while-loop in the code base or programming script of the software product 104. In such case, the synthetic textual description 1904 can describe or explain that line A should be commented-out and that line B should be edited to recite a while-loop instead of a for-loop. In contrast, the synthetic code 1908 can be a recommended or proposed coding script that contains line A and line B, in which line A is actually commented-out, and in which the for-loop in line B is actually replaced with a while-loop.

As another instance, consider again the above example where the problem description 402 indicates that the software product 104 lacks a specific functionality, and where the LLM 108 infers that such specific functionality can be gained by inserting at line C in the code base or programming script of the software product 104 an if-loop that contains a particular computational formula. In such case, the synthetic textual description 1904 can identify that particular computational formula and can describe or explain that it should be inserted in an if-loop at line C. In contrast, the synthetic code 1908 can be a recommended or proposed coding script that contains line C and in which line C actually recites the if-loop with the particular computational formula.

As even another instance, consider again the above example where the problem description 402 indicates that the software product 104 has a difficult-to-view GUI, and where the LLM 108 infers that the GUI can be made easier to view by increasing by D % the font-size argument of a print-command located at line E of the code base or programming script of the software product 104. In such case, the synthetic textual description 1904 can describe or explain that the font-size argument of the print-command at line E should be increased by D %. In contrast, the synthetic code 1908 can be a recommended or proposed coding script that contains line E and in which the font-size argument of the print-command in line E is actually increased by D %.

Therefore, the recommended design alteration 1406 can be considered as explaining (e.g., via 1904), showing (e.g., via 1906), or implementing (e.g., via 1908) whatever solution that the LLM 108 has devised for the software deficiency that is indicated by the problem description 402. In other words, the LLM 108 can be considered as automatically conceiving, building, or constructing a fix to whatever performance gap of the software product 104 is identified by the problem component 120.

In some embodiments, the synthetic textual description 1904 can state, explain, or otherwise indicate one or more specific personnel roles of the manufacturer of the software product 104 to whom the recommended design alteration 1406 should be sent, transmitted, or otherwise directed. Indeed, in various aspects, any of the plurality of technical documents 1504 can convey or describe organizational structures of any suitable software product manufacturers. More specifically, any of the plurality of technical documents 1504 can convey or describe which specific personnel roles (e.g., product manager, architect, project manager, technical engineer, quality assurance engineer) within any given software product manufacturing organization are responsible for which portions of a software product development flow (e.g., product definition portion, conceptual design portion, substantive code development portion, user-interface code development portion, troubleshooting portion). Accordingly, in some instances, one or more of the set of relevant technical documents 1804 can describe, explain, or otherwise teach which personnel roles within the manufacturer of the software product 104 are responsible for which portions or aspects of the software product 104. Thus, in various cases, the LLM 108 can infer or predict, based on such organizational information, one or more specific personnel roles that correspond to the performance gap indicated in the problem description 402 and to whose attention the recommended design alteration 1406 should thus be brought, and the synthetic textual description 1904 can accordingly explain or summarize such inference. In some aspects, the solution generation prompt 1902 can include a sentence that causes or forces the LLM 108 to infer or predict such one or more specific personnel roles. For example, the solution generation prompt 1902 can be the following sentences: "Problem defined by the problem description 402. Use the set of relevant technical documents 1804 to develop a fix for the problem, and to determine which manufacturing personnel should review the fix.".

Although not explicitly shown in FIG. 19, the recommended design alteration 1406 may include an indication of any of the plurality of available software features 802. For example, although none of the plurality of available software features 802 can have been deemed relevant enough to solve the performance gap indicated by the problem description 402, whichever available software features are most relevant or helpful (in the opinion of the LLM 108) with respect to the performance gap can nevertheless be returned to the user or operator as supplemental or alternative options or suggestions in the recommended design alteration 1406.

Accordingly, in some cases, the recommended design alteration 1406 may be a specific recommended alteration or a list of potential choices for the technician or engineering team of the software product 104 to consider. In some instances, such list of potential choices may include an estimation of how much each choice may cost in terms of time, money, employee work, user rollout issues, or any other suitable factors. As a non-limiting example, the manufacturer or developer of the software product 104 may be able to pay for an existing sold solution to the performance gap, write their own version in two months (which would have been four months if the LLM 108 had not generated the synthetic code 1908), or make a quick change now that may frustrate users or issue a quick update now that only solves a portion of the performance gap.

In some embodiments, the substantive content of the recommended design alteration 1406 can be tailored to or otherwise based on whichever specific personnel roles that the LLM 108 has inferred that the recommended design alteration 1406 should be directed to. As a non-limiting example, if LLM 108 infers that the recommended design alteration 1406 should be directed to a product manager, then the recommended design alteration 1406 may include more (e.g., a greater proportion or number of) user-interface mockups and synthetic text explaining the proposed design change, and can have relatively little synthetic code. In contrast, if the LLM 108 infers that the recommended design alteration 1406 should instead be directed to a software engineer, then the recommended design alteration 1406 may include more synthetic code and fewer user-interface mock-ups. In other words, the proportions of the recommended design alteration 1406 that are synthetic text versus synthetic diagrams versus synthetic code can be adjusted based on the specific personnel role to whose attention the recommended design alteration should (in the opinion of the LLM 108) be brought. Such role-tailoring can be facilitated or otherwise caused by appropriate wording in the solution generation prompt 1902. For instance, the solution generation prompt 1902 can be the following sentences: "Problem defined by the problem description 402. Use the set of relevant technical documents 1804 to develop a fix for the problem, and to determine which manufacturing personnel should review the fix. The fix should include more synthetic code than explanatory text or images, if the manufacturing personnel is an engineer. The fix should instead include more explanatory text or images than synthetic code, if the manufacturing personnel is a supervisor or manager".

Because the LLM 108 can be trained (as described herein) on the internal documentation or code of the manufacturer or developer of the software product 104, the recommended design alteration 1406 can provide synthesized text and images in the typical format of the manufacturer's or developer's documentation and code in the specific coding language used by the software product 104 (e.g., LLMs can take in input prompts such as "Write a C++ code to allow for a user to zoom into the image", and write the related code outputs).

In various embodiments, the recommended design alteration 1406 can comprise any suitable reference indicators, reference pointers, referential footnotes, or the like, that can indicate which of the set of relevant technical documents 1804 that the LLM 108 relied upon to synthesize or generate each specific or discrete portion of the recommended design alteration 1406. As a non-limiting example, the synthetic textual description 1904 can comprise multiple sentences or paragraphs, and the recommended design alteration 1406 can include a respective reference pointer or footnote for each given sentence or paragraph, where that respective reference pointer or footnote can indicate or specify which one or more of the set of relevant technical documents 1804 from which the LLM 108 derived that given sentence or paragraph. As another non-limiting example, the recommended design alteration 1406 can include a respective reference pointer or footnote for each given one of the one or more synthetic diagrams 1906, where that respective reference pointer or footnote can indicate or specify which one or more of the set of relevant technical documents 1804 from which the LLM 108 derived that given synthetic diagram. As yet another non-limiting example, the synthetic code 1908 can comprise multiple lines, loops, or modules of code, and the recommended design alteration 1406 can include a respective reference pointer or footnote for each given line, loop, or module, where that respective reference pointer or footnote can indicate or specify which one or more of the set of relevant technical documents 1804 from which the LLM 108 derived that given line, loop, or module. In this way, the LLM 108 can be considered as showing its work by providing such reference indicators. In various aspects, reference indicator/footnote provision can be facilitated or otherwise caused by appropriate wording in the solution generation prompt 1902. For instance, the solution generation prompt 1902 can be the following sentences: "Problem defined by the problem description 402. Use the set of relevant technical documents 1804 to develop text, diagrams, or code that fix the problem. Tag each developed sentence, diagram, or code segment with an appropriate footnote to the set of relevant technical documents 1804.". Alternatively, identifiers or links to all of the set of relevant technical documents 1804 can be appended to the recommended design alteration 1406 (e.g., need not specify which portions of the recommended design alteration 1406 were derived from each relevant technical document).

In various embodiments, the solution component 124 can electronically transmit the recommended design alteration 1406 to the client computing device 106. Accordingly, the user or operator can become aware of, notified of, or otherwise taught how to solve or address the performance gap of the software product 104. In some cases, the solution component 124 can instead transmit the recommended design alteration 1406 to the computing device of any technician or engineer that is responsible for developing or maintaining the software product 104 (e.g., can transmit the recommended design alteration 1406 to computing devices associated with the one or more personnel roles indicated in the synthetic textual description 1904). Indeed, this can be considered as an instruction or command for the technician or engineer to insert or otherwise apply whatever edit is described by the synthetic textual description 1904 or illustrated by the one or more synthetic diagrams 1906 to the code base or programming script of the software product 104. In some situations, the solution component 124 can automatically facilitate such editing, by actually inserting or copying-and-pasting the synthetic code 1908 into the code base or programming script of the software product 104 (e.g., at whichever specific lines or locations are indicated by the synthetic textual description 1904).

Figure 20:
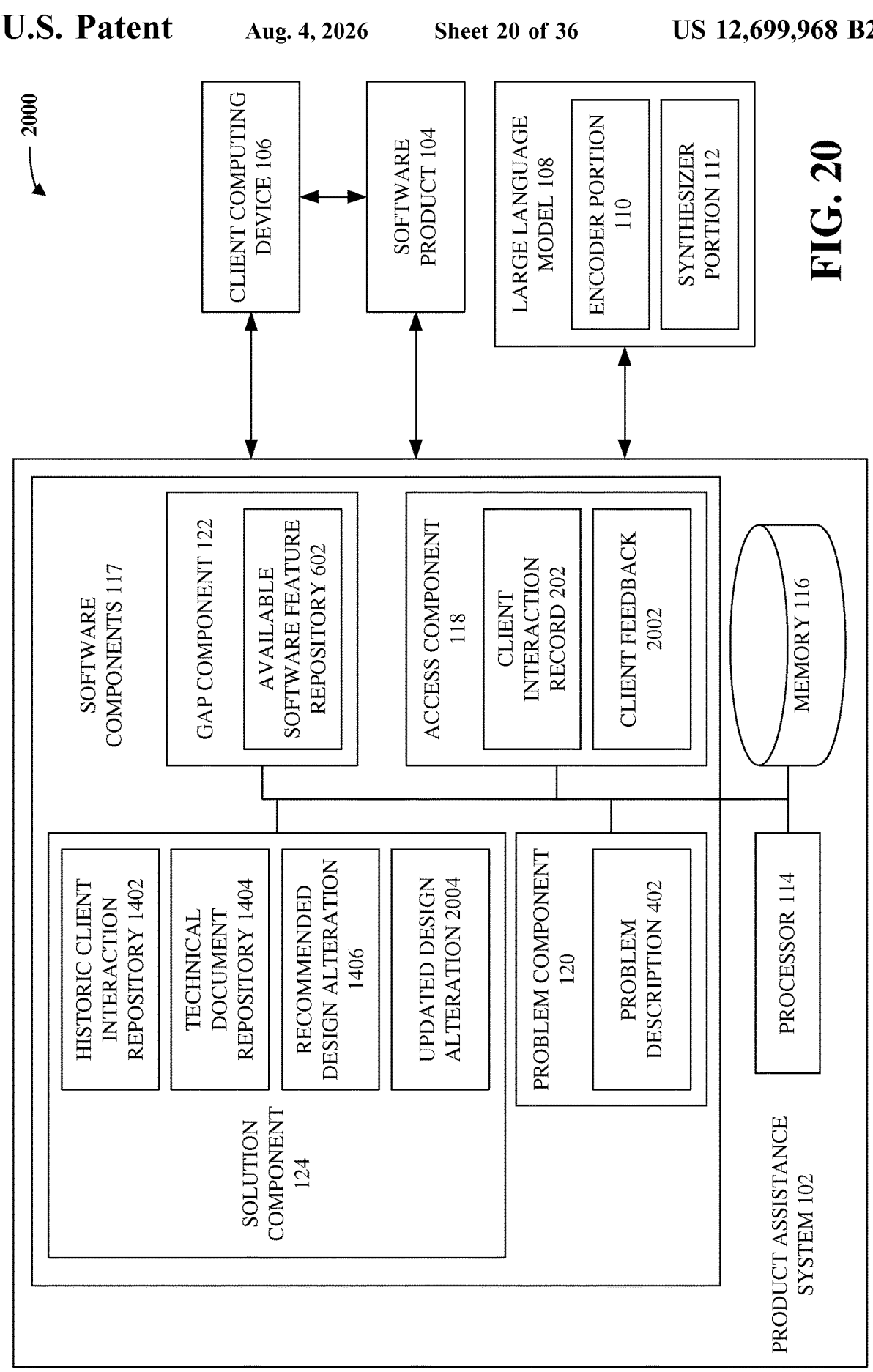
FIG. 20 illustrates a block diagram of an example, non-limiting system including client feedback and an updated design alteration that facilitates automatic product support systems and methods via generative artificial intelligence and customer interactions in accordance with one or more embodiments described herein.

FIG. 20 illustrates a block diagram of an example, non-limiting system 2000 including client feedback and an updated design alteration that can facilitate automatic product support systems and methods via generative artificial intelligence and customer interactions in accordance with one or more embodiments described herein.

In various embodiments, the access component 118 can electronically receive, retrieve, or otherwise access, from any suitable electronic source, client feedback 2002. As a non-limiting example, the access component 118 can obtain the client feedback 2002 from the client computing device 106. As another non-limiting example, the client feedback 2002 may be provided through any suitable online portals that allow for ideas, suggestions, or improvements to come from customers, users, or other industry vendors. For open projects such as open source software products or software products with a large online community such as video games, there may be other tools to directly submit feedback, issues, or suggestions to the developer or manufacturer of the software product 104, such as through an online forum. Further, such client feedback portals may include LLMs that act like a chat bot, not only taking the client feedback, but asking refining questions to really get at the heart of the issue for the client.

In various aspects, the client feedback 2002 can be any suitable electronic data exhibiting any suitable format, size, or dimensionality (e.g., can be one or more scalars, one or more vectors, one or more matrices, one or more tensors, one or more character strings, or any suitable combination thereof) that can convey, indicate, or otherwise represent a reaction of the user or operator to the recommended design alteration 1406. In various instances, the client feedback 2002 can be natural language text typed by the user or operator, that explicitly explains their thoughts about the recommended design alteration 1406 (e.g., "I approve the recommended design alteration 1406."; "The recommended design alteration 1406 added the functionality I was looking for, but it isn't regulation compliant."). In other instances, the client feedback 2002 can be captured audio or video of the user or operator, conveying their verbal or body language response to the recommended design alteration 1406 (e.g., audio containing "Thank goodness, they've solved my problem!"; video showing smile or sigh of relief). In some cases, the solution component 124 can transmit one or more follow-up or clarification questions (e.g., "Has the problem been fixed?"; "What laws or regulations must the absent or desired software functionality comply with?") to the client computing device 106 after sharing the recommended design alteration 1406, and the client feedback 2002 can be considered as the user's or operator's response to such follow-up or clarification questions. However, in other cases, the client feedback 2002 can be initiated solely by the user or operator (e.g., there can be no follow-up or clarification questions after sharing or transmission of the recommended design alteration 1406). In any case, the solution component 124 can electronically analyze the client feedback 2002 to determine whether or not the user or operator deems the recommended design alteration 1406 acceptable. If the user or operator does not deem it acceptable, the solution component 124 can electronically generate an updated design alteration 2004. Non-limiting aspects are described with respect to FIGS. 21-22.

Figure 21:
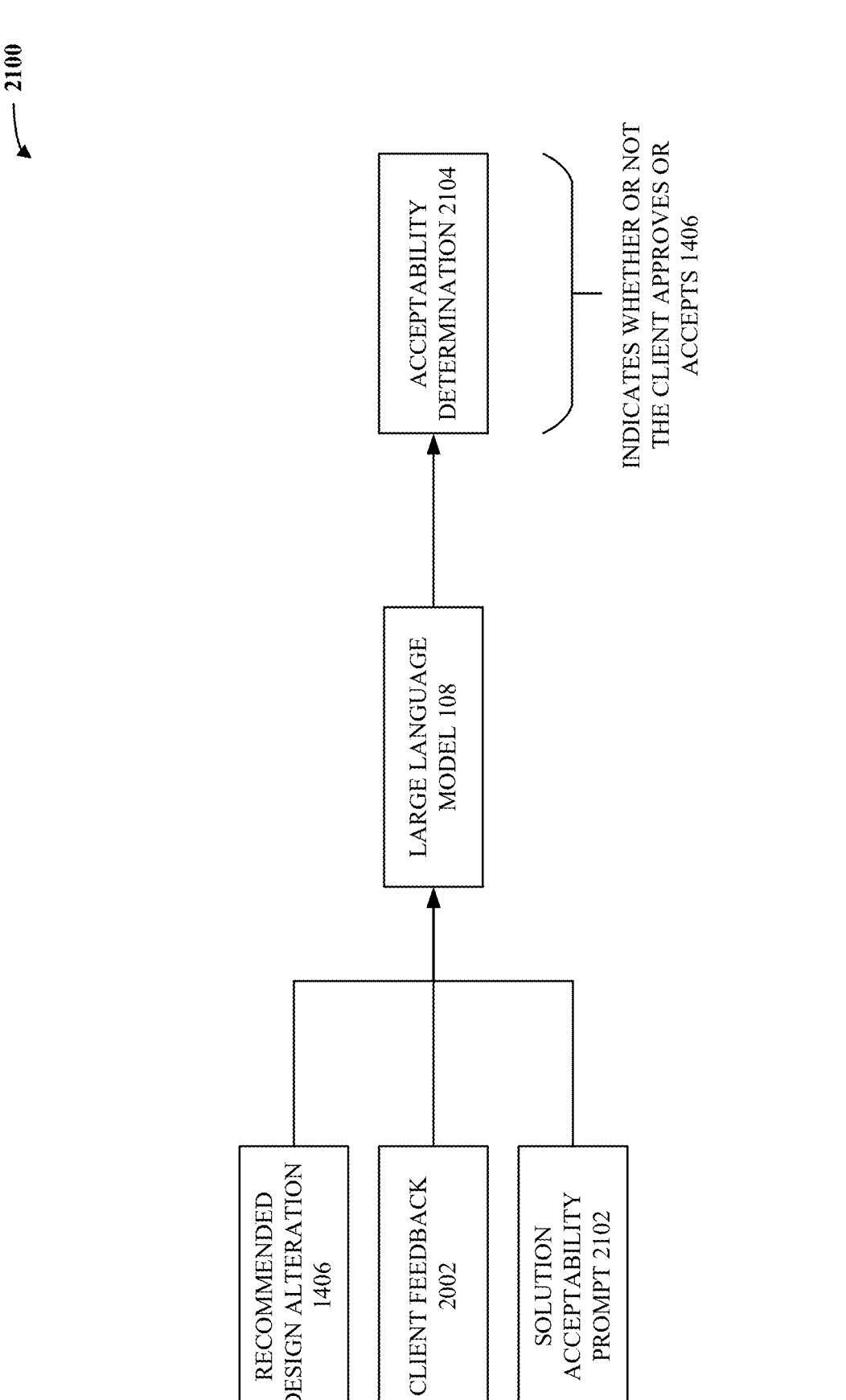
FIGS. 21-22 illustrate example, non-limiting block diagrams showing how an updated design alteration can be obtained in accordance with one or more embodiments described herein.
Figure 22:
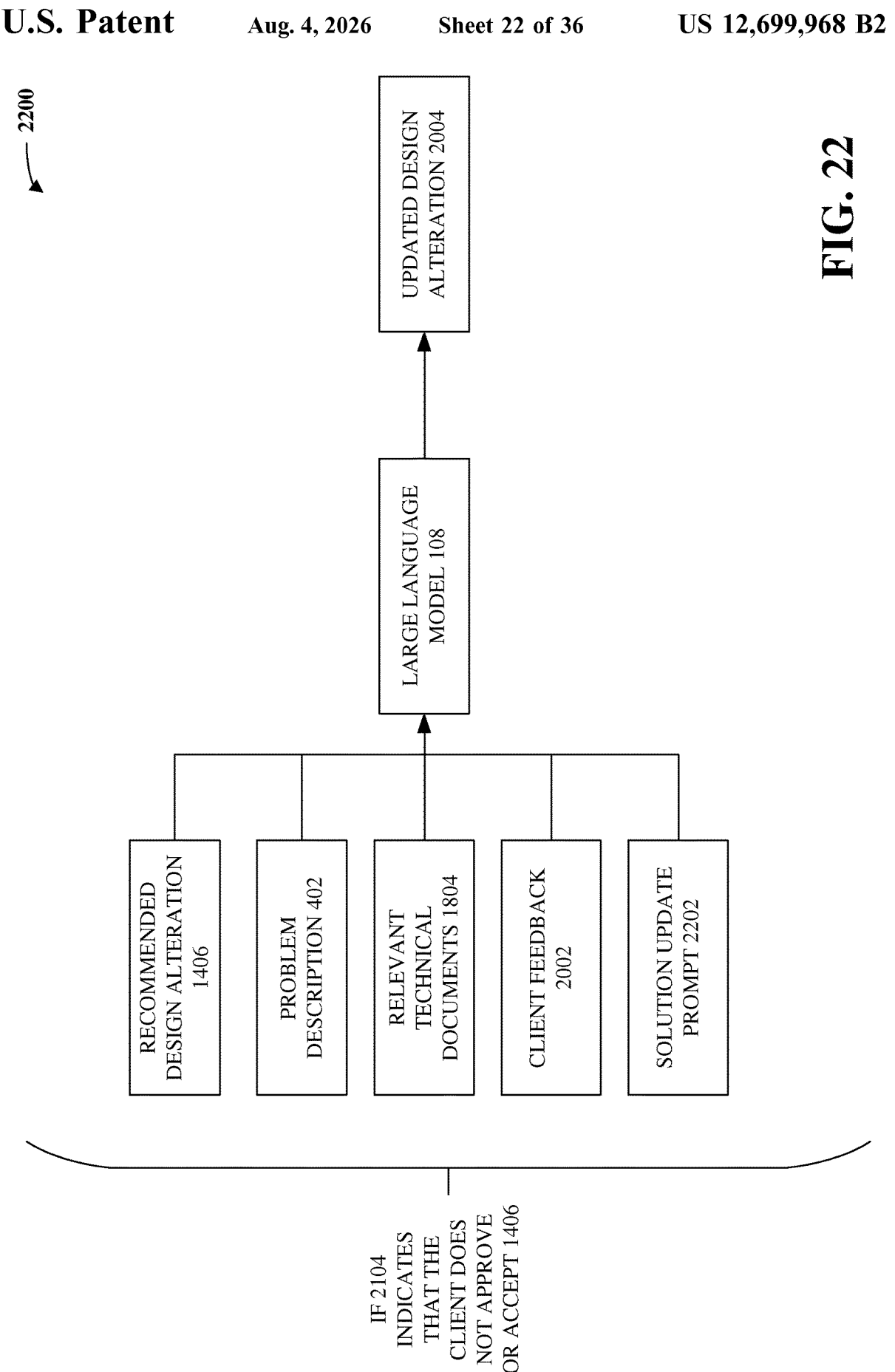

FIGS. 21-22 illustrate non-limiting block diagrams 2100 and 2200 showing how the updated design alteration 2004 can be obtained in accordance with one or more embodiments described herein.

First, consider FIG. 21. Indeed, in various embodiments, there can be a solution acceptability prompt 2102 that is feedable to the LLM 108. In various aspects, the solution acceptability prompt 2102 can be one or more unstructured or plain text sentences or sentence fragments that request or command identification of whether or not the client feedback 2002 suggests that the user or operator finds the recommended design alteration 1406 acceptable. As a non-limiting example, the solution acceptability prompt 2102 can be the following sentence: "Does the client feedback 2002 indicate satisfaction with the recommended design alteration 1406?". As another non-limiting example, the solution acceptability prompt 2102 can be the following sentence: "Determine whether the client feedback 2002 suggests approval or disapproval of the recommended design alteration 1406.".

Now, in various instances, the solution component 124 can electronically execute the LLM 108 on the recommended design alteration 1406, on the client feedback 2002, and on the solution acceptability prompt 2102 (or on any sub-combination thereof). In various cases, such execution can cause the LLM 108 to produce an acceptability determination 2104. More specifically, the solution component 124 can concatenate the recommended design alteration 1406, the client feedback 2002, and the solution acceptability prompt 2102 together. In various aspects, the solution component 124 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the acceptability determination 2104 based on activation maps or feature maps provided by the one or more hidden layers of the synthesizer portion 112.

In any case, the acceptability determination 2104 can be one or more unstructured or plain text declarative sentences or sentence fragments that semantically answer or respond to the solution acceptability prompt 2102. That is, the acceptability determination 2104 can be synthesized text that describes, explains, or otherwise states whether or not the client feedback 2002 indicates, suggests, or conveys that the user or operator is satisfied or pleased with the recommended design alteration 1406. In other words, the acceptability determination 2104 can be considered as a sort of make-shift satisfaction classification label that the LLM 108 can generate for the client feedback 2002.

Now, consider FIG. 22. In various embodiments, in response to the acceptability determination 2104 indicating that the user or operator does not accept or approve of the recommended design alteration 1406, the solution component 124 can electronically generate the updated design alteration 2004.

In particular, there can be a solution update prompt 2202 that is feedable to the LLM 108. In various aspects, the solution update prompt 2202 can be one or more unstructured or plain text sentences or sentence fragments that request or command that the recommended design alteration 1406 be updated in compliance with, in accordance with, or otherwise to address any remaining or new concerns conveyed in the client feedback 2002. As a non-limiting example, the solution update prompt 2202 can be the following sentence: "Improve the recommended design alteration 1406 based on the client feedback 2002.". As another non-limiting example, the solution update prompt 2202 can be the following sentences: "Remaining concerns defined by the client feedback 2002. Modify the recommended design alteration 1406 to resolve the remaining concerns.".

Now, in various instances, the solution component 124 can electronically execute the LLM 108 on the recommended design alteration 1406, on the client feedback 2002, and on the solution update prompt 2202. In various cases, such execution can cause the LLM 108 to produce the updated design alteration 2004. More specifically, the solution component 124 can concatenate the recommended design alteration 1406, the client feedback 2002, and the solution update prompt 2202 together. In some cases, such concatenation can further include the problem description 402 or the set of relevant technical documents 1804. In various aspects, the solution component 124 can feed that concatenation to the input layer of the encoder portion 110, that concatenation can complete a forward pass through the one or more hidden layers of the encoder portion 110, and the output layer of the encoder portion 110 can compute or otherwise calculate one or more embeddings (not shown), based on activation maps or feature maps provided by the one or more hidden layers of the encoder portion 110. In various cases, those one or more embeddings can be routed to the input layer of the synthesizer portion 112, those one or more embeddings can complete a forward pass through the one or more hidden layers of the synthesizer portion 112, and the output layer of the synthesizer portion 112 can compute or otherwise calculate the updated design alteration 2004 based on activation maps or feature maps provided by the one or more hidden layers of the synthesizer portion 112.

In any case, the updated design alteration 2004 can be considered as an incrementally modified or otherwise adjusted version of the recommended design alteration 1406 that (in the opinion of the LLM 108) solves or addresses whatever new or remaining concerns are conveyed or suggested in the client feedback 2002. Accordingly, the updated design alteration 2004 can be considered as comprising respectively updated versions of the synthetic textual description 1904, of the one or more synthetic diagrams 1906, or of the synthetic code 1908. Accordingly, the solution component 124 can electronically transmit the updated design alteration 2004 to the client computing device 106 (or to any suitable computing device of a technician or engineer associated with the software product 104). In some aspects, the solution component 124 can iteratively or repeatedly update the recommended design alteration 1406 in this fashion based on future client feedback received from the client computing device 106.

Figure 23:
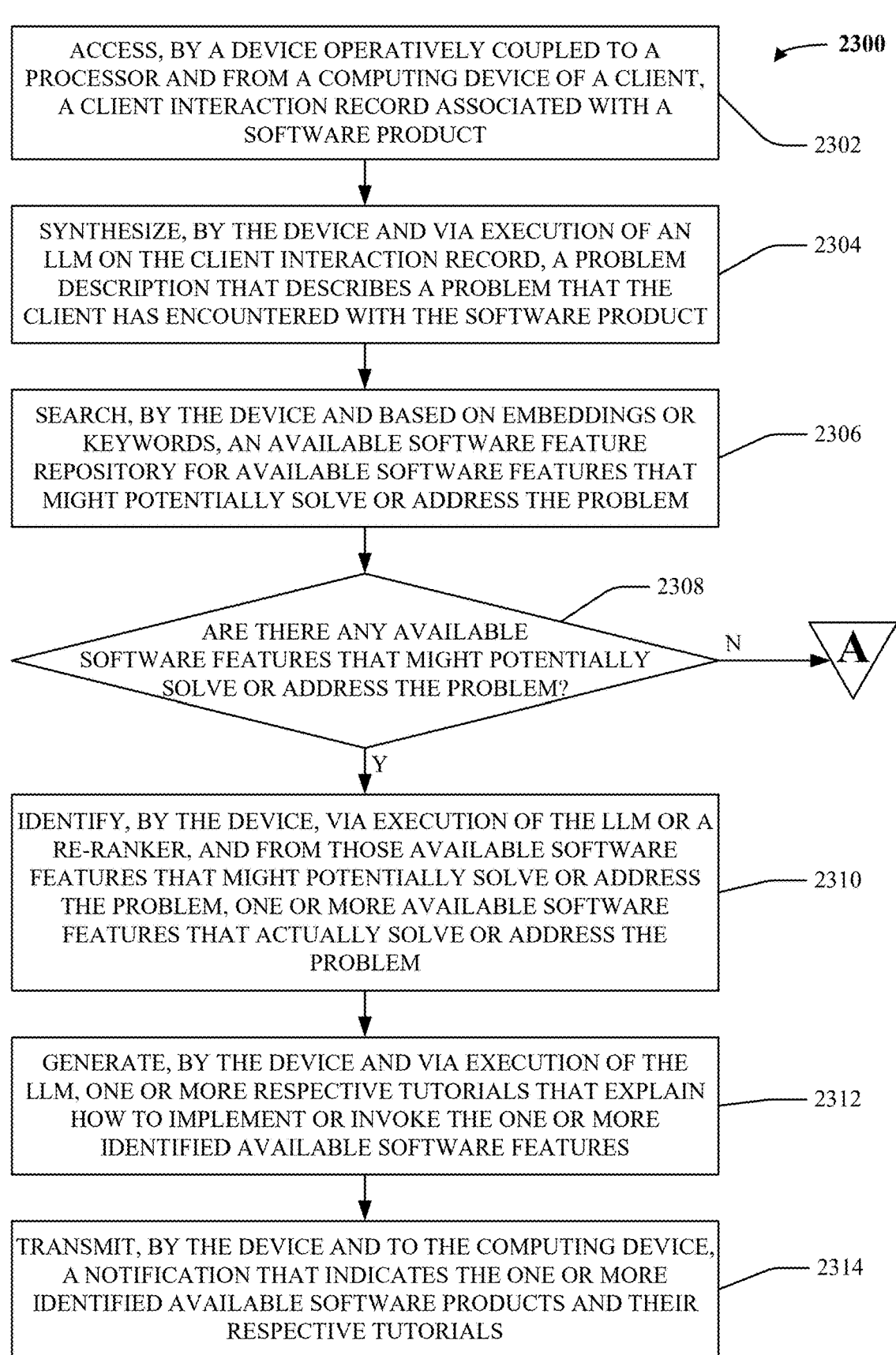

FIGS. 23-25 illustrate flow diagrams of example, non-limiting computer-implemented methods 2300, 2400, and 2500 that can facilitate automatic product support systems and methods via generative artificial intelligence and customer interactions in accordance with one or more embodiments described herein. In various cases, the product assistance system 102 can facilitate the computer-implemented methods 2300, 2400, or 2500.

First, consider FIG. 23. In various embodiments, act 2302 can include accessing, by a device (e.g., via 118) operatively coupled to a processor (e.g., 114) and from a computing device (e.g., via 106) of a client, a client interaction record (e.g., 202) associated with a software product (e.g., 104).

In various aspects, act 2304 can include synthesizing, by the device (e.g., via 120) and via execution of an LLM (e.g., 108) on the client interaction record, a problem description (e.g., 402) that describes a problem that the client has encountered with the software product.

In various instances, act 2306 can include searching, by the device (e.g., via 122) and based on embeddings or keywords, an available software feature repository (e.g., 602) for available software features (e.g., 810) that might potentially solve or address the problem.

In various cases, act 2308 can include determining, by the device (e.g., via 122), whether there are any available software products that might potentially solve or address the problem. If so, the computer-implemented method 2300 can proceed to act 2310. If not, the computer-implemented method 2300 can instead proceed to act 2402 of the computer-implemented method 2400.

In various aspects, act 2310 can include identifying, by the device (e.g., via 122) via execution of the LLM or a re-ranker (e.g., 1002), and from those available software features that might potentially solve or address the problem (e.g., as described with respect to FIGS. 7-11), one or more available software features (e.g., 604) that actually solve or address the problem.

In various instances, act 2312 can include generating, by the device (e.g., via 124) and via execution of the LLM, one or more respective tutorials (e.g., 1306) that explain how to implement or invoke the one or more identified available software features.

In various cases, act 2314 can include transmitting, by the device (e.g., via 124) and to the computing device, a notification (e.g., 1202) that indicates the one or more identified available software features and their respective tutorials.

Now, consider FIG. 24. In various embodiments, act 2402 can include generating, by the device (e.g., via 124) and via execution of the LLM on the problem description, a respective common problem determination (e.g., 1604) for each past client interaction record (e.g., 1502) in an historic client interaction repository (e.g., 1402) corresponding to a plurality of other, different, or past clients that use or have used the software product.

In various aspects, act 2404 can include determining, by the device (e.g., via 124), whether at least a threshold number of the past client interaction records pertain, as inferred by the LLM, to the problem indicated in the problem description. If not, the computer-implemented method 2400 can proceed to act 2406. If so, the computer-implemented method 2400 can instead proceed to act 2408.

In various instances, act 2406 can include transmitting, by the device (e.g., via 124) and to the computing device, a notification that indicates that there is no available software feature to address the problem and that the problem is so rare that development of a solution to the problem is not warranted.

In various cases, act 2408 can include identifying, by the device (e.g., via 124), within a technical document repository (e.g., 1404), based on embeddings or keywords, and via execution of the LLM or the re-ranker (e.g., as described with respect to FIGS. 17-18), one or more technical documents (e.g., 1804) that are semantically relevant to the problem. In various aspects, such technical documents can include technical handbook sections, service logs, code snippets, or standard operating procedures that are associated with the software product or with any other software product. In various instances, the computer-implemented method 2400 can proceed to act 2502 of the computer-implemented method 2500.

Now, consider FIG. 25. In various embodiments, act 2502 can include synthesizing, by the device (e.g., via 124) and via execution of the LLM on the problem description and on the one or more identified technical documents, a recommended design alteration (e.g., 1406) that includes synthesized text (e.g., 1904) or synthesized code (e.g., 1908) describing or containing a coding edit to the software product that would solve or address the problem.

In various aspects, act 2504 can include transmitting, by the device (e.g., via 124) and to the computing device of the client or to another computing device of a technician associated with the software product, the recommended design alteration.

In various instances, act 2506 can include receiving, by the device (e.g., via 118) and from the computing device or the another computing device, feedback (e.g., 2002) regarding the recommended design alteration.

In various cases, act 2508 can include determining, by the device (e.g., via 124) whether the feedback indicates, as inferred by the LLM, that the recommended design alteration is acceptable. If so, the computer-implemented method 2500 can end. If not, the computer-implemented method 2500 can proceed to act 2510.

In various aspects, act 2510 can include updating, by the device (e.g., via 124) and via execution of the LLM on the feedback, the recommended design alteration.

In various instances, act 2512 can include transmitting, by the device (e.g., via 124) and to the computing device or to the another computing device, the updated version (e.g., 2004) of the recommended design alteration. In various cases, the computer-implemented method 2500 can return back to act 2506.

In order for the various herein-described outputs of the LLM 108 (e.g., problem description 402; embeddings 704, 806, or 1704; helpfulness determinations 1104 or 1808; feature tutorials 1306; common problem determinations 1604; acceptability determination 2104; recommended design alteration 1406; updated design alteration 2004) to be accurate or correct in accordance with various embodiments described herein, the LLM 108 (as well as the re-ranker 1002) can first undergo training. A non-limiting example of such training is described with respect to FIG. 26.

Figure 26:
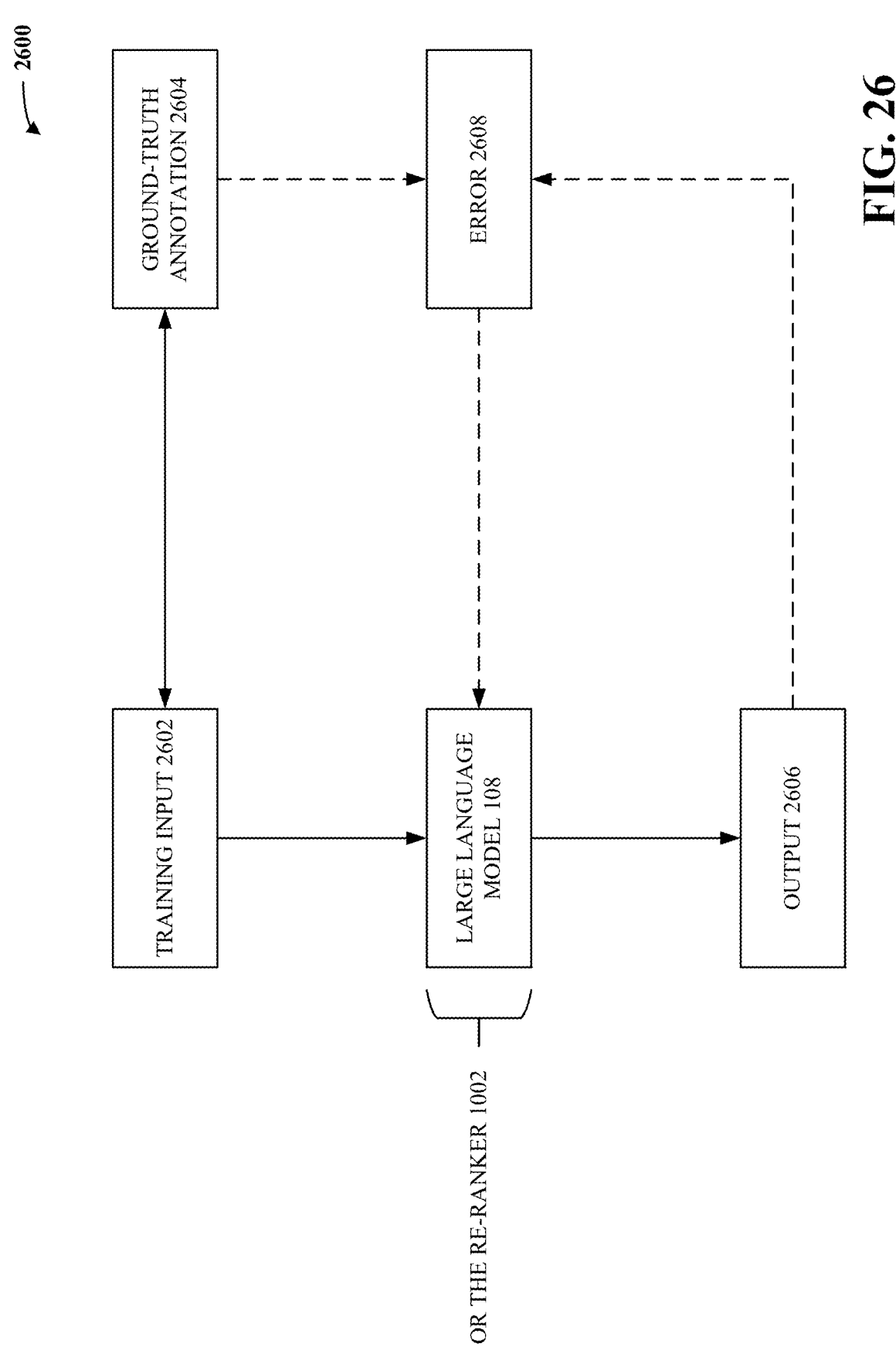
FIG. 26 illustrates an example, non-limiting block diagram showing how artificial intelligence models can be trained in accordance with one or more embodiments described herein.

FIG. 26 illustrates an example, non-limiting block diagram 2600 showing how the LLM 108 (or the re-ranker 1002) can be trained in accordance with one or more embodiments described herein.

In various aspects, prior to beginning training, the trainable internal parameters (e.g., convolutional kernels, weight matrices, bias values) of the LLM 108 (or of the re-ranker 1002) can be initialized in any suitable fashion (e.g., via random initialization) by the product assistance system 102.

In various embodiments, there can be a training input 2602 and a ground-truth annotation 2604. When it is desired to train the LLM 108, the training input 2602 can be any suitable textual, numerical, or graphical data (or concatenation thereof) that can be received by the LLM 108 as described herein. As some mere non-limiting examples, the training input 2602 can be any suitable training client interaction records (e.g., such as 202 or 1502), any suitable training supplemental prompts (e.g., such as 502, 1102, 1304, 1602, 1806, 1902, 2102, or 2202), any suitable training texts (e.g., such as 402, 804, 808, 1302, 1504, 1702, or 1804), any suitable training recommended design alterations (e.g., such as 1406), or any concatenation of any suitable combination thereof. Accordingly, the ground-truth annotation 2604 can be whatever correct or accurate synthesized textual, graphical, or coding content (e.g., such as 402, 1104, 1406, 1604, 1808; 2004, or 2104) that is known or deemed to correspond to the training input 2602. Instead, when it is desired to train the re-ranker 1002, the training input 2602 can be any suitable pair of text, and the ground-truth annotation 2604 can be whatever correct or accurate similarity score that is known or deemed to correspond to the training input 2602.

In any case, the product assistance system 102 can cause the LLM 108 (or the re-ranker 1002) to be executed on the training input 2602, thereby causing the LLM 108 (or the re-ranker 1002) to produce an output 2606. More specifically, in some cases, the training input 2602 can be fed or routed to the input layer of the LLM 108 (or of the re-ranker 1002), the training input 2602 can complete a forward pass through the one or more hidden layers of the LLM 108 (or of the re-ranker 1002), and the output layer of the LLM 108 (or the re-ranker 1002) can compute the output 2606 based on activation maps or feature maps provided by the one or more hidden layers of the LLM 108 (or of the re-ranker 1002).

Note that the format, size, or dimensionality of the output 2606 can be dictated by the number, arrangement, sizes, or other characteristics of the neurons, convolutional kernels, attention blocks, or other internal parameters of the output layer (or of any other layers) of the LLM 108 (or of the re-ranker 1002). Accordingly, the output 2606 can be forced to have any desired format, size, or dimensionality, by adding, removing, or otherwise adjusting characteristics of the output layer (or of any other layers) of the LLM 108 (or of the re-ranker 1002).

In various aspects, if the output 2606 is produced by the LLM 108, the output 2606 can be considered as the predicted or inferred textual content or code (e.g., predicted or inferred problem description, predicted or inferred helpfulness determinations, predicted or inferred feature tutorials, predicted or inferred common problem determinations, predicted or inferred recommended design alterations, predicted or inferred acceptability determinations, predicted or inferred updated design alterations) that the LLM 108 has synthesized based on the training input 2602. Instead, if the output 2606 is produced by the re-ranker 1002, the output 2606 can be considered as the predicted or inferred similarity score that the re-ranker 1002 has produced for the training input 2602. In any case, the ground-truth annotation 2604 can be considered as whatever correct or accurate result that is known or deemed to correspond to the training input 2602. Note that, if the LLM 108 (or the re-ranker 1002) has so far undergone no or little training, then the output 2606 can be highly inaccurate. In other words, the output 2606 can be very different from the ground-truth annotation 2604.

In various aspects, an error 2608 (e.g., MAE, MSE, cross-entropy error) between the output 2606 and the ground-truth annotation 2604 can be computed by the product assistance system 102. In various instances, the trainable internal parameters of the LLM 108 (or the re-ranker 1002) can be incrementally updated via backpropagation (e.g., stochastic gradient descent) based on the error 2608.

In various cases, such execution-and-update procedure can be repeated for any suitable number input-annotation pairs. This can ultimately cause the trainable internal parameters of the LLM 108 (or of the re-ranker 1002) to become iteratively optimized for accurately performing text synthesis, code synthesis, or embedding generation (or for accurately computing similarity scores). In various aspects, any suitable training batch sizes, any suitable error/loss functions, or any suitable training termination criteria can be utilized during such training.

Although the herein disclosure mainly describes the LLM 108 (or the re-ranker 1002) as being trained in supervised fashion, this is a mere non-limiting example for ease of explanation and illustration. In various embodiments, any other suitable training paradigms can be used to train the LLM 108 (or the re-ranker 1002), such as unsupervised training, semi-supervised training, reinforcement learning, or transfer learning, any of which may be federated or unfederated. In unsupervised learning, a model can be trained on unlabeled data, where the correct output is not provided for each input. In such case, the model can learn to generate outputs that are similar to the underlying structure of the data. In semi-supervised learning, a model can be trained on a combination of labeled and unlabeled data. In such case, the model can learn to generate outputs that are similar to the labeled data, while also taking into account the structure of the unlabeled data. In reinforcement learning, a model can learn by interacting with an environment and receiving feedback in the form of rewards or punishments. In such case, the model can learn to generate outputs that maximize the expected reward or minimize the expected punishment. In transfer learning, a model can be pre-trained on one task and then fine-tuned on a related task. In such case, the model can learn to generate outputs that are similar to the pre-trained task, while also taking into account the specific requirements of the related task.

FIGS. 27-28 illustrate flow diagrams of example, non-limiting computer-implemented methods 2700 and 2800 that can facilitate automatic product support systems and methods via generative artificial intelligence and customer interactions in accordance with one or more embodiments described herein. In various cases, the product assistance system 102 can facilitate the computer-implemented methods 2700 or 2800.

First, consider FIG. 27. In various embodiments, act 2702 can include accessing, by a device (e.g., via 118) operatively coupled to a processor (e.g., 114), an electronic interaction record (e.g., 202) that is provided by a computing device (e.g., 106) of a client and that pertains to a software product (e.g., 104) used by the client.

In various aspects, act 2704 can include synthesizing, by the device (e.g., via 120) and via execution of a large language model (e.g., 108) on the electronic interaction record, first text (e.g., 402) that describes a problem afflicting the software product that is suggested by the electronic interaction record.

Although not explicitly shown in FIG. 27, the electronic interaction record can comprise: a textual conversation (e.g., 302) between the computing device of the client and a chatbot associated with the software product; an audio recording (e.g., 304) captured by a microphone of the computing device and containing verbal questions, complaints, or exclamations spoken by the client during use of the software product; a video recording (e.g., 306) captured by a camera of the computing device and showing facial expressions or body language of the client during use of the software product; a user-interface tracking log (e.g., 308) captured by the computing device and showing where the client has clicked, moved, or scrolled within a user-interface of the software product; or a textual document (e.g., 310) typed on the computing device and pertaining to the software product.

Although not explicitly shown in FIG. 27, an input layer of the large language model can receive both the electronic interaction record and a problem identification prompt (e.g., 502), wherein both the electronic interaction record and the problem identification prompt can complete a forward pass through hidden layers of the large language model, and wherein an output layer of the large language model can synthesize as output the first text based on hidden activation maps produced by the hidden layers of the large language model.

Although not explicitly shown in FIG. 27, the computer-implemented method 2700 can comprise: searching, by the device (e.g., via 122), an available software feature repository (e.g., 602) for one or more available software features that address or solve the problem described by the first text, wherein each available software feature (e.g., one of 802) in the available software feature repository can correspond to a respective textual description (e.g., one of 804), and wherein the device can facilitate such searching by: comparing, via cosine similarity or Euclidean distance, embeddings (e.g., 806) respectively produced by the large language model for the textual descriptions in the available software feature repository to an embedding (e.g., 704) produced by the large language model for the first text; or identifying textual descriptions in the available software feature repository that recite one or more keywords that are present in the first text.

Although not explicitly shown in FIG. 27, the computer-implemented method 2700 can comprise: identifying, by the device (e.g., via 122), a set of available software features (e.g., 810) that potentially address or solve the problem described by the first text; generating, by the device (e.g., via 122) and via execution of a trained re-ranker (e.g., 1002) with respect to the first text, a set of similarity scores (e.g., 1004) respectively corresponding to the set of available software features; and concluding, by the device (e.g., via 122), that whichever, if any, of the set of available software features have similarity scores that satisfy a threshold similarity value actually address or solve the problem described by the first text.

Although not explicitly shown in FIG. 27, the computer-implemented method 2700 can comprise: identifying, by the device (e.g., via 122), a set of available software features (e.g., 810) that potentially address or solve the problem described by the first text; and executing, by the device (e.g., via 122), the large language model on the first text, on respective textual descriptions (e.g., 808) of the set of available software features, and on a helpfulness prompt (e.g., 1102), thereby causing the large language model to synthesize second texts (e.g., 1104) that explain which, if any, of the set of available software features actually address or solve the problem described by the first text.

Although not explicitly shown in FIG. 27, the computer-implemented method 2700 can comprise: in response to identifying an available software feature (e.g., one of 604) that addresses or solves the problem described by the first text, transmitting, by the device (e.g., via 124) and to the computing device of the client, an electronic notification (e.g., 1202) identifying the available software feature.

Although not explicitly shown in FIG. 27, the computer-implemented method 2700 can comprise: executing, by the device (e.g., via 124), the large language model on the first text, on a respective textual description (e.g., one of 1302) of the available software feature, and on a tutorial prompt (e.g., 1304), thereby causing the large language model to synthesize second text (e.g., 1306) that explains how to implement or access the available software feature using the software product, and wherein the electronic notification comprises the second text.

Now, consider FIG. 28. In various embodiments, act 2802 can include determining, by a device (e.g., via 122) operatively coupled to a processor (e.g., 114) and based on executing a large language model (e.g., 108) on an electronic client interaction record (e.g., 202) associated with a software product (e.g., 104), whether there is an available software feature (e.g., 610) that addresses or solves a problem afflicting the software product.

In various aspects, act 2804 can include, in response to a determination that there is no available software feature that addresses or solves the problem, synthesizing, by the device (e.g., via 124) and via execution of the large language model, a recommended design alteration (e.g., 1406) to the software product that would address or solve the problem.

Although not explicitly shown in FIG. 28, the recommended design alteration can comprise synthetic text (e.g., 1904) or synthetic diagrams (e.g., 1906) describing or showing how a code base of the software product should be redesigned to address or solve the problem, and the computer-implemented method 2800 can comprise: transmitting, by the device (e.g., via 124) and to a computing device (e.g., 106 or other) associated with a technician of the software product, an electronic message instructing that the code base be edited in accordance with the recommended design alteration.

Although not explicitly shown in FIG. 28, the recommended design alteration can comprise one or more synthesized lines of computer code (e.g., 1908) the insertion of which into a code base of the software product would address or solve the problem, and the computer-implemented method 2800 can comprise: inserting, by the device (e.g., via 124), the one or more synthesized lines of computer code into the code base.

Although not explicitly shown in FIG. 28, an input layer of the large language model can receive first text (e.g., 402) describing the problem and a solution generation prompt (e.g., 1902), wherein both the first text and the solution generation prompt can complete a forward pass through hidden layers of the large language model, and wherein an output layer of the large language model can synthesize as output the recommended design alteration based on hidden activation maps produced by the hidden layers of the large language model.

Although not explicitly shown in FIG. 28, the computer-implemented method 2800 can comprise: searching, by the device (e.g., via 124), a technical document repository (e.g., 1404) for one or more technical documents (e.g., 1804) that are relevant to addressing or solving the problem, wherein the device can facilitate such searching by: comparing, via cosine similarity or Euclidean distance, embeddings (e.g., 1704) respectively produced by the large language model for technical documents (e.g., 1504) in the technical document repository to an embedding (e.g., 704) produced by the large language model for the first text; or identifying technical documents in the technical document repository that recite one or more keywords that are present in the first text; and wherein the input layer of the large language model can receive the one or more technical documents in addition to the first text and the solution generation prompt.

Although not explicitly shown in FIG. 28, the one or more technical documents that are relevant to addressing or solving the problem can comprise: chapters or sections of an operating manual of the software product; service log entries recorded by the software product; standard operating procedures promulgated by a manufacturer of the software product; or sections of a code base of the software product.

Various embodiments described herein can be considered as a clever or inventive pipeline that leverages the text-synthesis, image-synthesis, and code-synthesis capabilities of LLMs, to facilitate the automatic detection and rectification of software product deficiencies or problems. Such embodiments are inherently computer-centric and help to continually or regularly maintain or improve the performance of software products during their deployments. Such embodiments thus qualify as concrete technical improvements in the field of software product development and maintenance and certainly constitute a practical application of computer technology.

In some instances, various embodiments described herein can be considered as innovations in prompt engineering that enable or cause the LLM 108 to facilitate automatic detection and rectification of software product deficiencies or problems. In other words, various systems and methods described herein can involve the creation or formulation of appropriate input prompts for the LLM 108. In still other words, the herein describes prompts (e.g., 502, 1102, 1304, 1602, 1806, 1902, 2102, 2202) can be considered as technical aspects that cause the LLM 108 to generate and refine the recommended design alteration 1406. Consider the following discussion regarding prompt engineering.

Prompt engineering for generative artificial intelligence (GAI) refers to the process of designing and creating prompts that can be used to guide the generation of new content, ideas, or solutions. Prompts are typically used to provide a GAI system with a starting point or a set of constraints that can be used to guide the generation process. Some tips for doing good prompt engineering for GAI can include the following:

Be specific: When creating prompts for GAI, textual or descriptive specificity can help the GAI system to understand the task at hand and generate outputs that are relevant and useful.

Provide constraints: Constraints recited in a prompt can guide the generation process. This might include things like the desired output format, the desired level of complexity, or the desired level of creativity.

Use examples: Examples can be a powerful tool for prompt engineering. Prompts that recite examples of the type of output that is desired can cause the GAI system to learn from those examples and generate outputs that are similar in nature.

Test and refine: Once an initial prompt for GAI is created, it can be iteratively refined or reworded as needed. This might involve generating a small number of outputs and evaluating them to see if they meet the desired output criteria, or it might involve generating a larger number of outputs and using statistical methods to analyze the results.

Although the herein disclosure mainly describes various embodiments as being applicable to the software product 104, these are mere non-limiting examples for ease of explanation and illustration. It should be appreciated and understood that various embodiments described herein can be applied or extrapolated to any suitable physical products that are developed, deployed, sold, or licensed for use by end-customers. More specifically, during deployment, any suitable physical product (e.g., a medical imaging scanner such as a computed tomography scanner or an X-ray scanner; a fully or partially automated surgery apparatus such as a laparoscopic robot; a computerized vital sign monitor such as an automated blood pressure monitor or an automated blood oximeter; a non-computerized or non-automated physical product such as a stethoscope or a prosthesis) can experience or encounter problems, shortcomings, or other limitations that were not experienced or encountered during research or development of the physical product. Accordingly, such problems, shortcomings, or limitations can be explicitly or implicitly conveyed in the client interaction record 202, and various embodiments described herein can leverage the LLM 108 to: predict, infer, or otherwise identify such problems, shortcomings, or limitations (e.g., such prediction, inference, or identification can be facilitated by the problem component 120); determine whether or not any available product features (e.g., 802) already solve or address those problems, shortcomings, or limitations (e.g., such determination can be facilitated by the gap component 122); and, in response to determining that no available product features already solve or address those problems, shortcomings, or limitations, synthesize a recommended design alteration (e.g., 1406) for the physical product that would solve or address those problems, shortcomings, or limitations (e.g., such synthesis can be facilitated by the solution component 124). Accordingly, various embodiments described herein are not limited to supporting software products alone. Instead, various embodiments described herein can be applied to support any suitable products, whether physical or software.

Although the herein disclosure mainly describes various embodiments as implementing the LLM 108, these are mere non-limiting examples for ease of explanation and illustration. It should be appreciated and understood that various embodiments described herein can be implemented using any suitable generative artificial intelligence model (e.g., not limited just to LLMs). Indeed, in various aspects, the LLM 108 can be replaced herein with any suitable generative artificial intelligence model or models that can: receive as input any suitable text, any suitable images or videos, any suitable audio waveforms, any suitable code, or any suitable combination thereof; and produce as output any suitable synthetic text, any suitable synthetic images or synthetic videos, any suitable synthetic audio waveforms, any suitable synthetic code, or any suitable combination thereof. A generative artificial intelligence model can learn (e.g., through any suitable training paradigm such as supervised, unsupervised, or reinforcement learning) the patterns, distributions, or other characteristics that are present in whatever data on which it is trained, and can subsequently generate or synthesize new data that has similar patterns, distributions, or characteristics. As a non-limiting example, such a generative artificial intelligence model can be or comprise any suitable foundational model. A foundational model can be a type of generative artificial intelligence model that is designed to learn a broad range of tasks and capabilities, rather than being specialized for a specific task. A foundational model can be used as a starting point for building more specialized models, since the foundational model can learn to generate outputs in a variety of domains and can be fine-tuned for specific tasks. Foundational models are typically trained on large amounts of data and use deep learning algorithms, such as transformers, to learn patterns and generate new outputs. They are often used in natural language processing, computer vision, and other fields where it is important to be able to generate outputs in a variety of domains. Other non-limiting examples of such a generative artificial intelligence model can be or comprise: any suitable generative adversarial network (e.g., DALL-E, Style-GAN); any suitable diffusion model (e.g., Stable Diffusion, DALL-E 2); any suitable variational autoencoder; or any suitable flow model.

Note that a generative artificial intelligence model can comprise several internal components, such as the following:

Encoder: The encoder can be a neural network that processes the input text and generates a fixed-length representation of the text, called the "encoder output" or "embeddings".

Decoder: The decoder can be a neural network that generates new text based on the encoder output. The decoder can comprise multiple layers of self-attention mechanisms, which allow the generative artificial intelligence model to learn the underlying structure of the text.

Attention mechanism: The attention mechanism can allow the generative artificial intelligence model to focus on different parts of the input text when generating new text.

Positional encoding: Positional encoding can be a technique used to encode the position of each word in the input text, which helps the generative artificial intelligence model to learn the sequence of words in the text.

Tokenization: Tokenization can be the process of breaking the input text into individual words, which are then encoded as numerical vectors.

Vocabulary: The vocabulary can be the set of all the words in the input text, which are used to encode the input text as numerical vectors.

Language synthesizer: The language model can be a component of the generative artificial intelligence model that generates new text based on the encoder output. The language synthesizer can be trained on a large corpus of text data and is able to generate text that is similar to the training data.

Although the herein disclosure mainly describes various embodiments in which the set of relevant available software features 604 are identified via embedding-based or keyword-based searching of the available software feature repository 602, these are mere non-limiting examples for ease of explanation and illustration. In various aspects, the set of relevant available software features 604 can be identified via direct inference of the LLM 108 or of any other artificial intelligence model. Indeed, in various instances, service manuals, user manuals, or other technical documentation (e.g., the plurality of textual descriptions 804) regarding the plurality of available software features 802 can be used to fine-tune the LLM 108 or any other artificial intelligence model, such that the LLM 108 or other artificial intelligence model can know the identities or purposes of the plurality of available software features 802. Accordingly, a prompt that is engineered to ask the LLM 108 or other artificial intelligence model which of the plurality of available software features 802 solves the performance gap indicated in the problem description 402 can be fed to the LLM 108 or to the other artificial intelligence model, thereby causing the LLM 108 or other artificial intelligence model to directly return or output: the set of relevant available software features 604; or an indication that none of the plurality of available software features 802 solves the performance gap. In other words, the available software feature repository 602 may be tokenized and used in training or fine-tuning of the LLM 108 or of any other artificial intelligence model (e.g., foundational model, generative model), so that the LLM 108 or that other artificial intelligence model can directly identify the set of relevant available software features 604. In like fashion, the technical document repository 1404 may be tokenized and used in training or fine-tuning of the LLM 108 or of any other artificial intelligence model (e.g., foundational model, generative model), so that the LLM 108 or that other artificial intelligence model can directly identify the set of relevant technical documents 1804.

Although the herein disclosure mainly describes various embodiments in which the set of potentially-relevant available software features 810 are identified via embedding-based or keyword-based searching, these are mere non-limiting examples for ease of explanation or illustration. It should be appreciated that the gap component 122 can electronically identify the set of potentially-relevant relevant available software features 810 in any other suitable fashion. As a non-limiting example, the gap component 122 can identify the set of potentially-relevant available software features 810 based on how other computing clients have been using the software product 104. Indeed, other computing clients can have indicated explicitly (e.g., through formal feedback or chatbot conversations) or implicitly (e.g., through their own computing choices, such as which available software features they choose to download, use, or otherwise implement after complaining about a specific problem) that some available software features are potentially relevant or useful for certain performance gaps but not for other performance gaps. Indeed, if the gap component 122 identifies any of the set of potentially-relevant available software features 810 based on usage statistics of various computing clients (e.g., based on which available software features are seeing the most or least use in response to specified problems), the gap component 122 can, in some embodiments, present those usage statistics as evidence or proof-of-work to explain why the set of potentially-relevant available software features 810 was selected. As another non-limiting example, the gap component 122 can identify the set of potentially-relevant available software features 810 by proactively initiating a chatbot session with a field engineer, support person, or other support staff. Indeed, as mentioned above, the LLM 108 can infer which specific personnel roles are pertinent to the problem description 402, and the gap component 122 can transmit a text message to those personnel roles, where the text message can include the problem description 402 (or any other text or question synthesized by the LLM 108 and pertaining to the software product 104). Those personnel roles then may know an answer from their professional experience with the software product 104 and quickly text back to the gap component 122 with a response that identifies or indicates the set of potentially-relevant available software features 810.

Although the herein disclosure mainly describes various embodiments in which a single instantiation of the LLM 108 (or any other artificial intelligence model) is implemented, this is a mere non-limiting example for ease of explanation and illustration. In various embodiments, any suitable number of instantiations of the LLM 108 (or any other artificial intelligence model) can be implemented to facilitate any of the aspects described herein. As a non-limiting example, one instantiation of the LLM 108 (e.g., having its own uniquely trained or fine-tuned layers or internal parameters) can be implemented at or on the client computing device 106, and another instantiation of the LLM 108 (e.g., having differently trained or fine-tuned layers or internal parameters) can be implemented at or on the product assistance system 102 (e.g., manufacturer-side). In such cases, the client-side instantiation of the LLM 108 can generate the problem description 402, whereas the manufacturer-side instantiation of the LLM 108 can be leveraged to identify the set of relevant available software features 604, to analyze the historic client interaction repository 1402, to identify the set of relevant technical documents 1804, to generate the recommended design alteration 1406, to analyze the client feedback 2002, or to generate the updated design alteration 2004. In fact, in some instances, multiple instantiations of the LLM 108 can be implemented manufacturer-side, each instantiation being fine-tuned or specialized for performance of a respective inferencing task (e.g., a first manufacturer-side instantiation specialized to identify the set of relevant available software features 604; a second manufacturer-side instantiation specialized to analyze the historic client interaction repository 1402; a third manufacturer-side instantiation specialized to identify the set of relevant technical documents 1804; a fourth manufacturer-side instantiation specialized to generate the recommended design alteration 1406; a fifth manufacturer-side instantiation specialized to analyze the client feedback 2002; a sixth manufacturer-side instantiation specialized to generate the updated design alteration 2004).

Various non-limiting aspects are described with respect to FIGS. 29-34.

Figure 29:
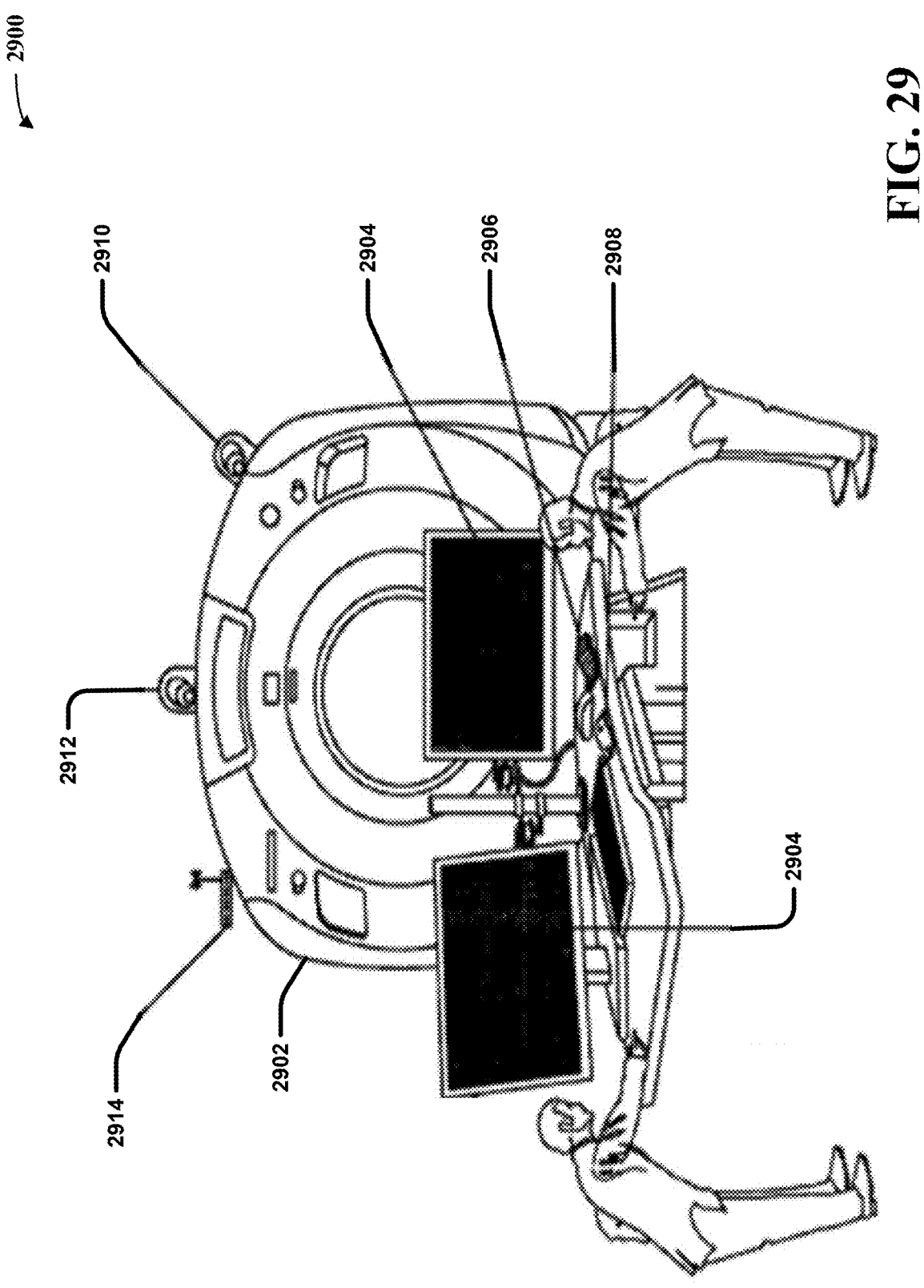

FIG. 29 illustrates a block diagram of an example, non-limiting medical imaging scanner 2900 to which various embodiments described herein can be implemented. In the non-limiting example of FIG. 29, the medical imaging scanner 2900 is an MRI scanning device comprising a gantry 2902. In various aspects, as shown, any suitable users, clients, or technicians can control or otherwise interact with the medical imaging scanner 2900 via any suitable human-computer interface devices, such as one or more computer screens 2904, a computer mouse 2906, or a computer keyboard 2908. As some non-limiting examples, the users, clients, or technicians can utilize such human-computer interface devices to type, create, or view any suitable documents regarding the medical imaging scanner 2900, such as: design documents or drawings; professional reports; slide deck presentations; email messages; or collaboration meeting minutes. In some cases, the users, clients, or technicians can electronically navigate through a graphical user-interface of the medical imaging scanner 2900 (by utilizing the one or more computer screens 2904, the computer mouse 2906, or the computer keyboard 2908), and the medical imaging scanner 2900 can log, record, or otherwise track such navigation (e.g., which scanning features or buttons the user, client, or technician clicked on or scrolled to at what times). In various aspects, the medical imaging scanner 2900 can comprise a microphone 2910 or a camera 2912. Accordingly, audio recordings (e.g., 304) or video recordings (e.g., 306) of the user, client, or technician can be captured as, during, or while the user, client, or technician interacts with the medical imaging scanner 2900. Thus, if the user, client, or technician expresses visible or audible dissatisfaction with the medical imaging scanner 2900, such dissatisfaction can be recorded or captured. In various instances, the medical imaging scanner 2900 can comprise a wireless fidelity router 2914. In various cases, the medical imaging scanner 2900 can leverage the wireless fidelity router 2914 to electronically share whatever data it captures (e.g., scanned medical images; documents or drawings typed, created, or viewed using the one or more computer screens 2904, the computer mouse 2906, or the computer keyboard 2908; electronic navigation logs recorded or tracked by the one or more computer screens 2904, the computer mouse 2906, or the computer keyboard 2908; audio or video captured by the microphone 2910 or the camera 2912) with any suitable computing devices. In some cases, such data can be considered as the client interaction record 202, and the medical imaging scanner 2900 can transmit the client interaction record 202 to the product assistance system 102 for fault detection and rectification as described herein.

Figure 30:
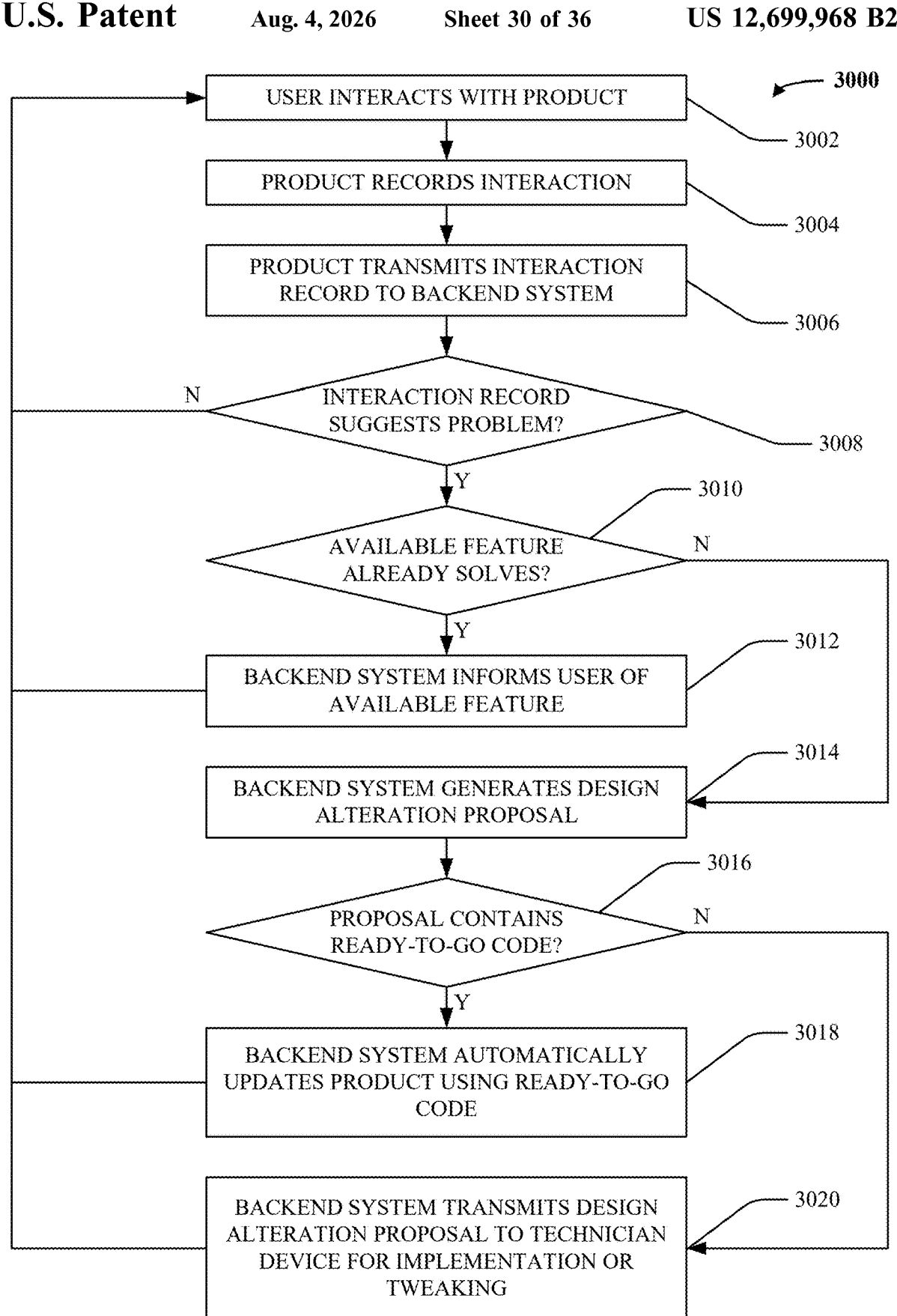

FIG. 30 illustrates a flow diagram 3000 in accordance with various embodiments described herein.

In various embodiments, as shown by numeral 3002, a human user can interact with a product (e.g., 104, 2900). In various cases, such interaction can be in any suitable form (e.g., electronic navigation through a GUI of the product; manual handling, gripping, or manipulation of physical buttons or handles of the product).

In various aspects, as shown by numeral 3004, the product (or any suitable computing device associated with the product) can record the interaction of the human user. In various cases, such recording (e.g., 202) can be in any suitable electronic format (e.g., electronic navigation log showing where the human user clicked or scrolled within a GUI of the product; video recorded by a built-in camera of the product and showing the human user's body language, gestures, facial expressions, or gaze direction while interacting with the product; audio recorded by a built-in microphone of the product and containing words, exclamations, curses, or complaints uttered by the human user while interacting with the product; textual conversation that the human user engaged in with a chatbot associated with the product; any other suitable textual document, message, review, or complaint pertaining to the product that the human user has typed or otherwise created).

In various instances, as shown by numeral 3006, the product can transmit the interaction record to a backend system (e.g., 102).

In various embodiments, as shown by numeral 3008, the backend system can determine whether or not the interaction record suggests or otherwise indicates that the product suffers from a performance problem. In various cases, such determination can be facilitated by any suitable generative model (e.g., 108) being executed on the interaction record and being conditioned on any suitable input prompt (e.g., 502). In various instances, the performance problem can be any suitable limitation or shortcoming of the product (e.g., a functionality that is missing from the product but that is nevertheless desired by the human user; a bug, glitch, or other difficulty that the product exhibits). If the backend system concludes that the interaction record does not suggest or indicate a performance problem with the product, the flow diagram 3000 can return back to numeral 3002. On the other hand, if the backend system instead concludes that the interaction record does suggest or indicate a performance problem with the product, the flow diagram 3000 can proceed to numeral 3010.

In various aspects, as shown by numeral 3010, the backend system can determine whether there is any available feature or tool (e.g., 604) that already addresses or solves the performance problem. In various cases, such determination can be facilitated by applying any suitable searching techniques (e.g., embedding search; keyword search; fine-tuned generative model being executed on a textual description of the performance problem and being conditioned on any suitable input prompt) to an available software feature repository (e.g., 602). Note that the available software feature repository can, in some instances, be considered as the Internet or any suitable portion thereof. If the backend system concludes that there is an available feature or tool that solves or addresses the performance problem, the flow diagram 3000 can proceed to numeral 3012. On the other hand, if the backend system instead concludes that there is no available feature or tool that solves or addresses the performance problem, the flow diagram 3000 can proceed to numeral 3014.

In various embodiments, as shown in numeral 3012, the backend system can inform the human user of the available feature or tool. In some cases, this can be facilitated by transmitting to the product (or to any other computing device associated with the human user) a notification (e.g., 1202) that identifies the available feature or tool. In some instances, such notification can be accompanied by any suitable tutorial (e.g., 1306) that teaches the human user how to use, operate, or activate the available feature or tool. The synthesis or generation of such tutorial can be facilitated by any suitable generative model (e.g., 108) being executed on a textual description of the available feature or tool and being conditioned on any suitable input prompt (e.g., 1304). In some cases, the available feature or tool can be automatically usable, operatable, or activatable. In such situations, the backend system can automatically use, operate, or activate the available feature or tool with respect to the product. As shown, the flow diagram 3000 can then return back to numeral 3002.

In various aspects, as shown in numeral 3014, the backend system can generate a design alteration proposal (e.g., 1406) so as to solve the performance problem of the product. Such generation can be facilitated by any suitable generative model (e.g., 108) being executed on a textual description of the performance problem (e.g., 402) and being conditioned on any suitable references (e.g., 1804) in addition to any suitable input prompt (e.g., 1902). In some cases, the design alteration proposal can be made of synthesized text or images (e.g., GUI mockups) that describe or illustrate how the product should be changed, modified, redesigned, or otherwise altered to address or solve the performance problem. In some cases, the design alteration proposal can be made of synthesized computer code (e.g., synthetic C++ scripts) that, if inserted into a code base of the product, would address or solve the performance problem.

In various instances, as shown by numeral 3016, the backend system can determine whether the design alteration proposal contains ready-to-go code. If so (e.g., if the design alteration proposal contains synthetic code that is ready or otherwise intended to be deployed as-is), the flow diagram

3000 can proceed to numeral 3018. On the other hand, if not (e.g., if the design alteration proposal contains no synthetic code at all; or if the design alteration proposal contains synthetic code that is desired or otherwise intended to be tweaked or to serve as a starting point for product technicians), the flow diagram 3000 can instead proceed to numeral 3020.

In various aspects, as shown by numeral 3018, the backend system can automatically update the product using the ready-to-go code (e.g., by pasting or inserting the ready-to-go code into the code base of the product). As shown, the flow diagram 3000 can then return back to numeral 3002.

In various cases, as shown by numeral 3020, the backend system can transmit the design alteration proposal to a computing device of a technician associated with the product. Accordingly, the technician can proceed to implement or reduce-to-practice the design alteration proposal, or to tweak the design alteration proposal in any way they see fit (e.g., the design alteration proposal can be considered as a robust spring-board or starting point from which the technician can brainstorm a fuller solution to the performance problem). As shown, the flow diagram 3000 can then return back to numeral 3002.

As FIG. 30 shows, various embodiments described herein can improve the experience of the human user (e.g., by automatically detecting and remedying performance problems) and can also improve the experience of the technician (e.g., by automatically performing a significant amount of product improvement coding or brainstorming, such that the technician can be considered as having a head-start for solving or addressing the performance problem).

Figure 31:
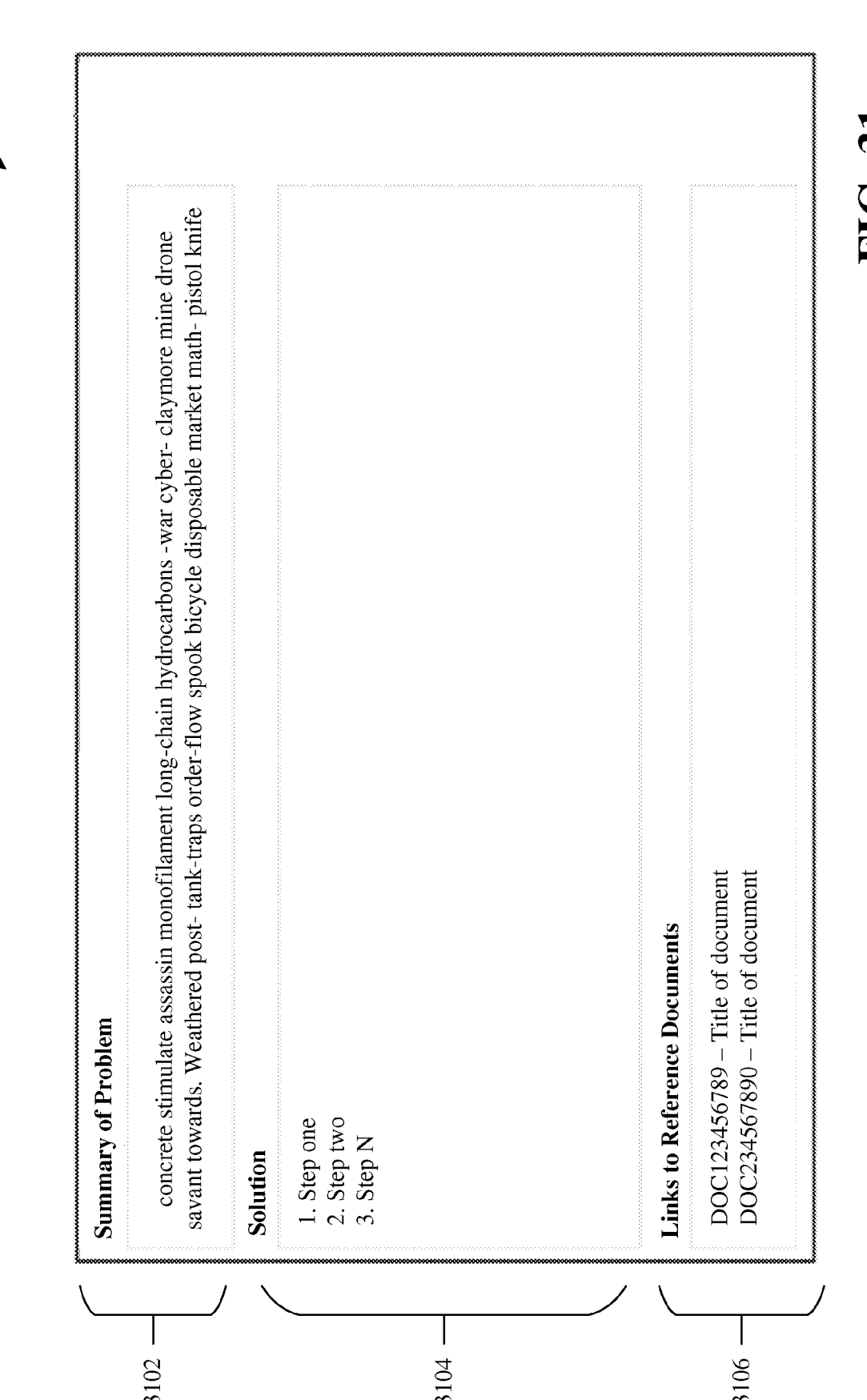
Figure 32:
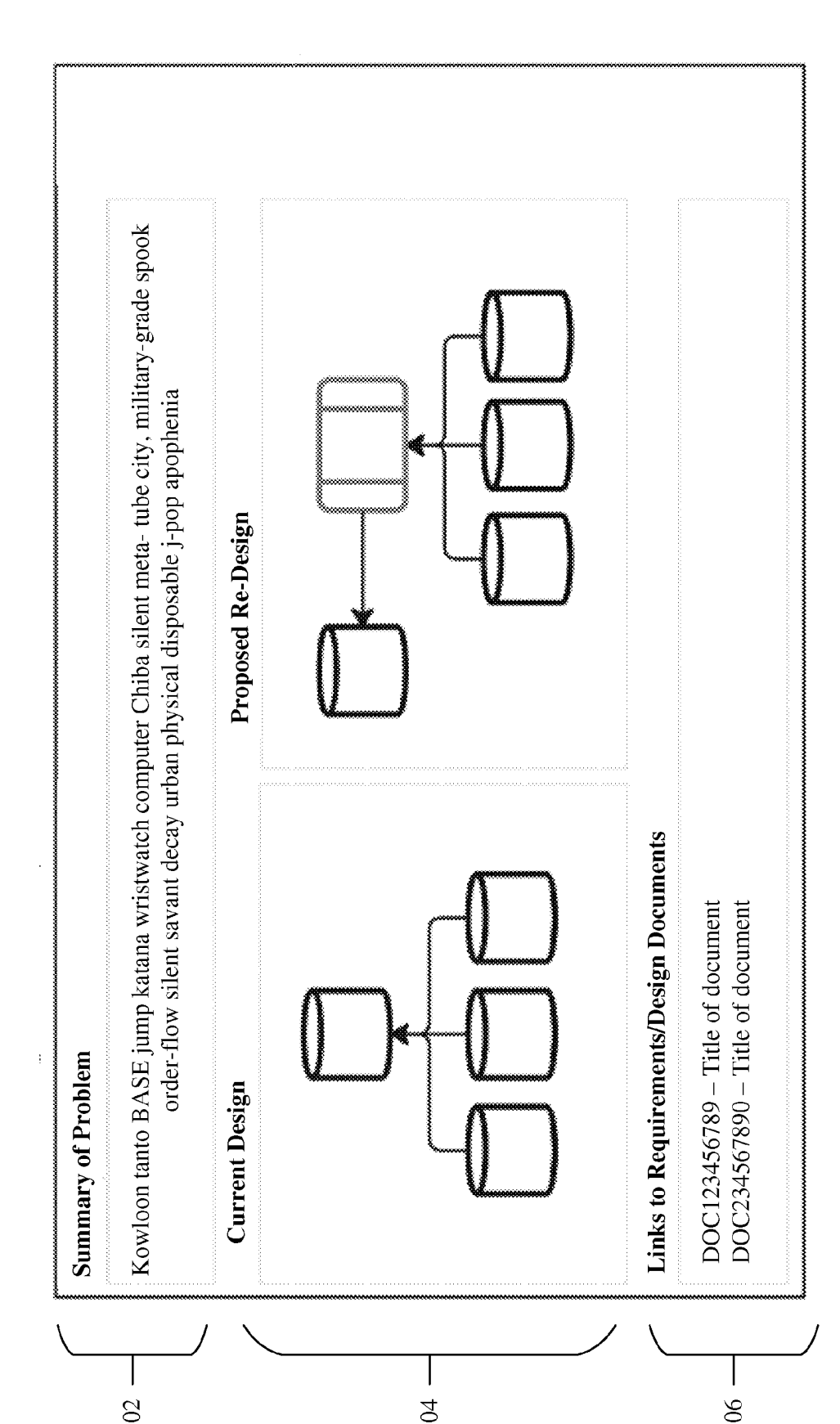

FIGS. 31-33 illustrate example, non-limiting graphical user-interface visualizations 3100, 3200, and 3300 that can be produced or displayed to users or clients in accordance with various embodiments described herein.

First, consider FIG. 31. In various embodiments, a recommended design alteration (e.g., 1406) that is generated or synthesized as described herein can be visually presented or displayed to the human user or client of any given product, or to a human technician or engineer of the given product, by, via, or through the graphical user-interface visualization 3100. In various aspects, as shown, the graphical user-interface visualization 3100 can comprise a section 3102, a section 3104, and a section 3106. In various instances, the section 3102 can describe or summarize whatever performance gap or problem has been detected for the product (e.g., the section 3102 can contain or display the problem description 402). In situations where the recommended design alteration comprises synthesized text (e.g., 1904) describing or explaining what sequence of steps or actions should be taken to address or solve the performance gap or problem, the section 3104 can display or show such synthesized text. In cases where the recommended design alteration is appended with indicators or footnotes linked to the specific references from which such synthesized text was derived, the section 3106 can display or show such indicators or footnotes.

Next, consider FIG. 32. In various embodiments, a recommended design alteration (e.g., 1406) that is generated or synthesized as described herein can be visually presented or displayed to the human user or client of any given product, or to a human technician or engineer of the given product, by, via, or through the graphical user-interface visualization 3200. In various aspects, as shown, the graphical user-interface visualization 3200 can comprise a section 3202, a section 3204, and a section 3206. In various instances, the section 3202 can describe or summarize whatever performance gap or problem has been detected for the product (e.g., the section 3202 can contain or display the problem description 402). In situations where the recommended design alteration comprises synthesized diagrams (e.g., 1906) illustrating or depicting how an architecture or organization of the given product should be changed so as to address or solve the performance gap or problem, the section 3204 can display or show such synthesized diagrams. In cases where the recommended design alteration is appended with indicators or footnotes linked to the specific references from which such synthesized diagrams were derived, the section 3206 can display or show such indicators or footnotes.

Now, consider FIG. 33. In various embodiments, a recommended design alteration (e.g., 1406) that is generated or synthesized as described herein can be visually presented or displayed to the human user or client of any given product, or to a human technician or engineer of the given product, by, via, or through the graphical user-interface visualization 3300. In various aspects, as shown, the graphical user-interface visualization 3300 can comprise a section 3302 and a section 3304. In various instances, the section 3302 can describe or summarize whatever performance gap or problem has been detected for the product (e.g., the section 3302 can contain or display the problem description 402). In situations where the recommended design alteration comprises synthesized code (e.g., 1908) that would address or solve the performance gap or problem if it were inserted into the code base of the given product, the section 3304 can display or show such synthesized code. Although not explicitly shown in FIG. 33, it should be appreciated that the recommended design alteration can be appended with indicators or footnotes linked to the specific references from which such synthesized code was derived, and that such indicators or footnotes can be shown or displayed in the graphical user-interface visualization 3300.

It should be appreciated that FIGS. 31-33 are mere non-limiting examples of GUI visualizations that can be outputted or displayed in accordance with various embodiments described herein. In various aspects, any other suitable GUI visualizations can be implemented to display or show whatever recommended design alterations are generated or synthesized as described herein.

FIG. 34 illustrates a non-limiting, example product development workflow 3400. In various embodiments, the product development workflow 3400 can comprise any suitable stages or phases of product development. Non-limiting examples of such stages or phases can include: identification or analysis of a problem or need; design or brainstorming of a solution to the problem or need; development of the solution to the problem or need; testing or troubleshooting of the developed solution; deployment of the developed solution; or maintenance of the developed solution. In various aspects, various embodiments described herein can leverage generative artificial intelligence so as to assist the facilitation of any of such stages or phases. As a non-limiting example, generative artificial intelligence (e.g., 108) can be fed appropriate input prompts during the problem identification/ analysis phase, so as to automatically interpret user feedback or complaints and thereby identify the problem, or so as to automatically identify, itemize or distil requirements, goals, or objectives for addressing the problem. As another non-limiting example, generative artificial intelligence (e.g., 108) can be fed appropriate input prompts during the solution design phase, so as to automatically author high-level solution architecture mockups, solution flow diagram mockups, solution data model mockups, or solution user-interface mockups. As yet another non-limiting example, generative artificial intelligence (e.g., 108) can be fed appropriate input prompts during the solution development phase, so as to flesh out or reduce to practice the high-level solution design, such as via automated code generation. As even another non-limiting example, generative artificial intelligence (e.g., 108) can be fed appropriate input prompts during the solution testing phase, so as to troubleshoot or debug the developed solution, such as via automated stress-test writing or test code generation. As still another non-limiting example, generative artificial intelligence (e.g., 108) can be fed appropriate input prompts during the solution deployment phase, so as to perform deployment functionalities such as automated script support writing. As another non-limiting example, generative artificial intelligence (e.g., 108) can be fed appropriate input prompts during the solution maintenance phase, so as to perform maintenance functionalities such as automated feedback interpretation or remedy suggestion.

At a higher-level, the product development workflow 3400 can be considered as containing requirements-gathering phases and build phases. Various embodiments described herein can assist in the requirements-gathering phases. Indeed, generative artificial intelligence (e.g., 108) can significantly simplify the requirements-gathering phases by constructing quick prototypes of complex software products, and by minimizing the risks of miscommunication (e.g., after all, technicians and clients can align on the prototype before proceeding to the build phases). Likewise, generative artificial intelligence (e.g., 108) can significantly simplify the build phases by generating code in any suitable syntax or languages. Accordingly, generative artificial intelligence could be used to supplement developers by writing small components of code, thus enhancing the productivity of developers and software quality. Generative artificial intelligence even can enable citizen developers to write code without the knowledge of programming language. Moreover, a developer can train a generative artificial intelligence model to create a new web application. So, by providing the model with information on the application's functionality, design, and technical requirements, the model can generate a significant portion of the application's code, thereby saving developers time and effort, allowing them to focus on other application development aspects.

For at least these reasons, various embodiments described herein are undeniably practical applications of computer technology that facilitate real-world benefits to real-world clients, technicians, and product developers.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=$confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 35:
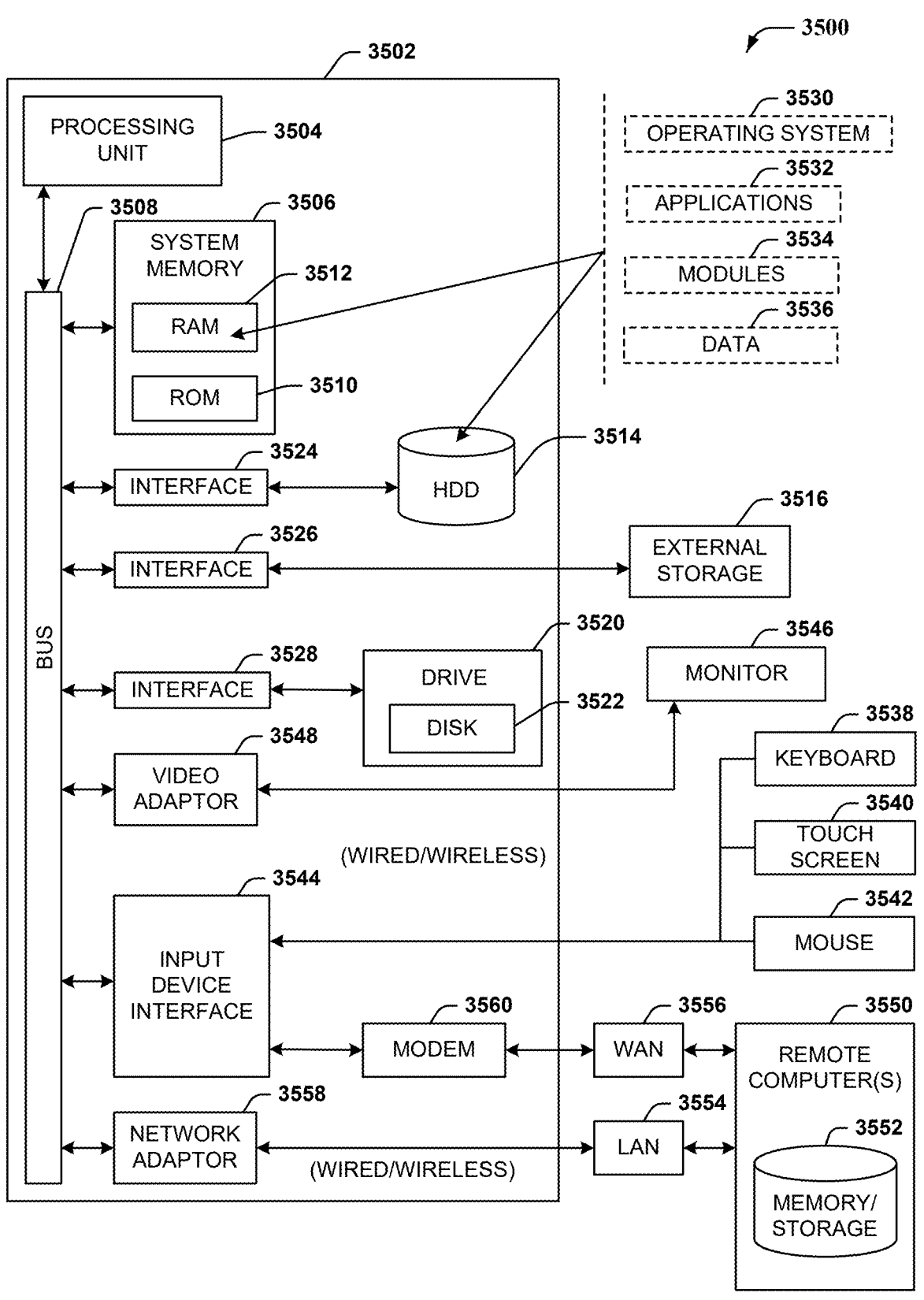
FIG. 35 illustrates a block diagram of an example, non-limiting operating environment in which one or more embodiments described herein can be facilitated.

In order to provide additional context for various embodiments described herein, FIG. 35 and the following discussion are intended to provide a brief, general description of a suitable computing environment 3500 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 35, the example environment 3500 for implementing various embodiments of the aspects described herein includes a computer 3502, the computer 3502 including a processing unit 3504, a system memory 3506 and a system bus 3508. The system bus 3508 couples system components including, but not limited to, the system memory 3506 to the processing unit 3504. The processing unit 3504 can be any of various commercially available processors. Dual microprocessors and other multi-processor architectures can also be employed as the processing unit 3504.

The system bus 3508 can be any of several types of bus structure that can further interconnect to a memory bus (with or without a memory controller), a peripheral bus, and a local bus using any of a variety of commercially available bus architectures. The system memory 3506 includes ROM 3510 and RAM 3512. A basic input/output system (BIOS) can be stored in a non-volatile memory such as ROM, erasable programmable read only memory (EPROM), EEPROM, which BIOS contains the basic routines that help to transfer information between elements within the computer 3502, such as during startup. The RAM 3512 can also include a high-speed RAM such as static RAM for caching data.

The computer 3502 further includes an internal hard disk drive (HDD) 3514 (e.g., EIDE, SATA), one or more external storage devices 3516 (e.g., a magnetic floppy disk drive (FDD) 3516, a memory stick or flash drive reader, a memory card reader, etc.) and a drive 3520, e.g., such as a solid state drive, an optical disk drive, which can read or write from a disk 3522, such as a CD-ROM disc, a DVD, a BD, etc. Alternatively, where a solid state drive is involved, disk 3522 would not be included, unless separate. While the internal HDD 3514 is illustrated as located within the computer 3502, the internal HDD 3514 can also be configured for external use in a suitable chassis (not shown). Additionally, while not shown in environment 3500, a solid state drive (SSD) could be used in addition to, or in place of, an HDD 3514. The HDD 3514, external storage device(s) 3516 and drive 3520 can be connected to the system bus 3508 by an HDD interface 3524, an external storage interface 3526 and a drive interface 3528, respectively. The interface 3524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3512, including an operating system 3530, one or more application programs 3532, other program modules 3534 and program data 3536. All or portions of the operating system, applications, modules, or data can also be cached in the RAM 3512. The systems and methods described herein can be implemented utilizing various commercially available operating systems or combinations of operating systems.

Computer 3502 can optionally comprise emulation technologies. For example, a hypervisor (not shown) or other intermediary can emulate a hardware environment for operating system 3530, and the emulated hardware can optionally be different from the hardware illustrated in FIG. 35. In such an embodiment, operating system 3530 can comprise one virtual machine (VM) of multiple VMs hosted at computer 3502. Furthermore, operating system 3530 can provide runtime environments, such as the Java runtime environment or the .NET framework, for applications 3532. Runtime environments are consistent execution environments that allow applications 3532 to run on any operating system that includes the runtime environment. Similarly, operating system 3530 can support containers, and applications 3532 can be in the form of containers, which are lightweight, standalone, executable packages of software that include, e.g., code, runtime, system tools, system libraries and settings for an application.

Further, computer 3502 can be enable with a security module, such as a trusted processing module (TPM). For instance with a TPM, boot components hash next in time boot components, and wait for a match of results to secured values, before loading a next boot component. This process can take place at any layer in the code execution stack of computer 3502, e.g., applied at the application execution level or at the operating system (OS) kernel level, thereby enabling security at any level of code execution.

A user can enter commands and information into the computer 3502 through one or more wired/wireless input devices, e.g., a keyboard 3538, a touch screen 3540, and a pointing device, such as a mouse 3542. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3504 through an input device interface 3544 that can be coupled to the system bus 3508, but can be connected by other interfaces, such as a parallel port, an IEEE 1394 serial port, a game port, a USB port, an IR interface, a BLUETOOTH® interface, etc.

A monitor 3546 or other type of display device can be also connected to the system bus 3508 via an interface, such as a video adapter 3548. In addition to the monitor 3546, a computer typically includes other peripheral output devices (not shown), such as speakers, printers, etc.

The computer 3502 can operate in a networked environment using logical connections via wired or wireless communications to one or more remote computers, such as a remote computer(s) 3550. The remote computer(s) 3550 can be a workstation, a server computer, a router, a personal computer, portable computer, microprocessor-based entertainment appliance, a peer device or other common network node, and typically includes many or all of the elements described relative to the computer 3502, although, for purposes of brevity, only a memory/storage device 3552 is illustrated. The logical connections depicted include wired/wireless connectivity to a local area network (LAN) 3554 or larger networks, e.g., a wide area network (WAN) 3556. Such LAN and WAN networking environments are commonplace in offices and companies, and facilitate enterprise-wide computer networks, such as intranets, all of which can connect to a global communications network, e.g., the Internet.

When used in a LAN networking environment, the computer 3502 can be connected to the local network 3554 through a wired or wireless communication network interface or adapter 3558. The adapter 3558 can facilitate wired or wireless communication to the LAN 3554, which can also include a wireless access point (AP) disposed thereon for communicating with the adapter 3558 in a wireless mode.

When used in a WAN networking environment, the computer 3502 can include a modem 3560 or can be connected to a communications server on the WAN 3556 via other means for establishing communications over the WAN 3556, such as by way of the Internet. The modem 3560, which can be internal or external and a wired or wireless device, can be connected to the system bus 3508 via the input device interface 3544. In a networked environment, program modules depicted relative to the computer 3502 or portions thereof, can be stored in the remote memory/storage device 3552. It will be appreciated that the network connections shown are example and other means of establishing a communications link between the computers can be used.

When used in either a LAN or WAN networking environment, the computer 3502 can access cloud storage systems or other network-based storage systems in addition to, or in place of, external storage devices 3516 as described above, such as but not limited to a network virtual machine providing one or more aspects of storage or processing of information. Generally, a connection between the computer 3502 and a cloud storage system can be established over a LAN 3554 or WAN 3556 e.g., by the adapter 3558 or modem 3560, respectively. Upon connecting the computer 3502 to an associated cloud storage system, the external storage interface 3526 can, with the aid of the adapter 3558 or modem 3560, manage storage provided by the cloud storage system as it would other types of external storage. For instance, the external storage interface 3526 can be configured to provide access to cloud storage sources as if those sources were physically connected to the computer 3502.

The computer 3502 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 36:
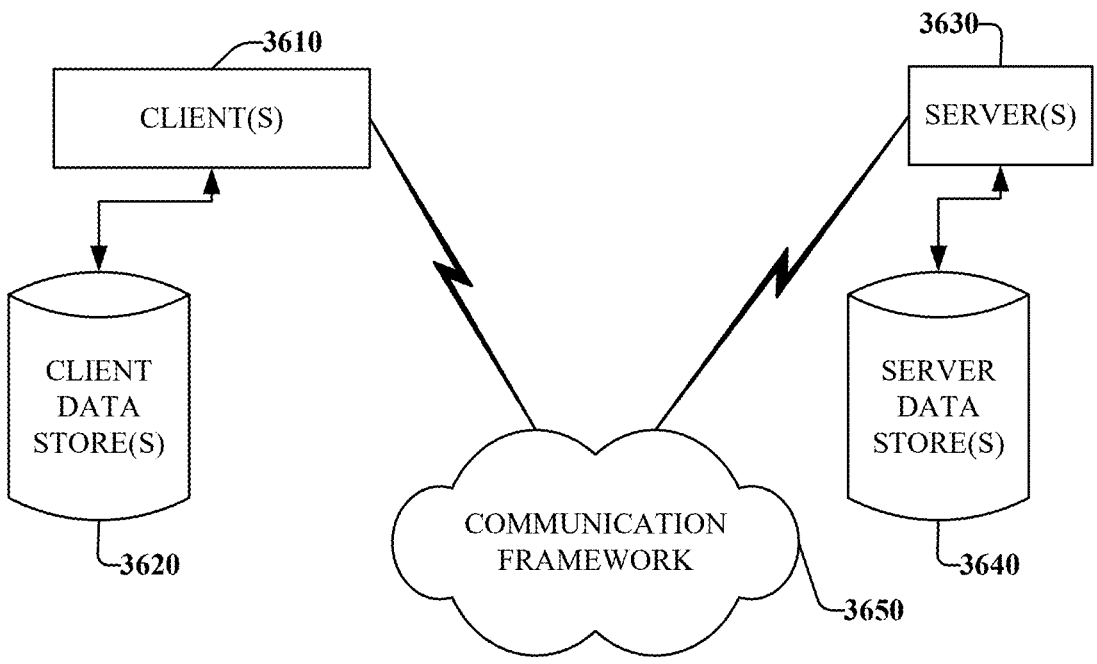
FIG. 36 illustrates an example networking environment operable to execute various implementations described herein.

FIG. 36 is a schematic block diagram of a sample computing environment 3600 with which the disclosed subject matter can interact. The sample computing environment 3600 includes one or more client(s) 3610. The client(s) 3610 can be hardware or software (e.g., threads, processes, computing devices). The sample computing environment 3600 also includes one or more server(s) 3630. The server(s) 3630 can also be hardware or software (e.g., threads, processes, computing devices). The servers 3630 can house threads to perform transformations by employing one or more embodiments as described herein, for example. One possible communication between a client 3610 and a server 3630 can be in the form of a data packet adapted to be transmitted between two or more computer processes. The sample computing environment 3600 includes a communication framework 3650 that can be employed to facilitate communications between the client(s) 3610 and the server(s) 3630. The client(s) 3610 are operably connected to one or more client data store(s) 3620 that can be employed to store information local to the client(s) 3610. Similarly, the server(s) 3630 are operably connected to one or more server data store(s) 3640 that can be employed to store information local to the servers 3630.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a solid state drive such as M.2 (including non-volatile memory express (NVMe) or serial advanced technology attachment (SATA)), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects are described in the following clauses.

CLAUSE 1: A system can comprise: a processor that can execute computer-executable components stored in a non-transitory computer-readable memory, wherein the computer-executable components can comprise: an access component that can access an electronic interaction record that is provided by a computing device of a client and that pertains to a software product used by the client; and a problem component that can synthesize, via execution of a generative model on the electronic interaction record, first text that describes a problem afflicting the software product that is suggested by the electronic interaction record.

CLAUSE 2: The system of any preceding clause can be implemented, wherein the electronic interaction record can comprise: a textual conversation between the computing device of the client and a chatbot associated with the software product; an audio recording captured by a microphone of the computing device and containing verbal questions, complaints, or exclamations spoken by the client during use of the software product; a video recording captured by a camera of the computing device and showing facial expressions or body language of the client during use of the software product; a user-interface tracking log captured by the computing device and showing where the client has clicked, moved, or scrolled within a user-interface of the software product; or a textual document typed on the computing device and pertaining to the software product.

CLAUSE 3: The system of any preceding clause can be implemented, wherein an input layer of the generative model can receive both the electronic interaction record and a problem identification prompt, wherein both the electronic interaction record and the problem identification prompt can complete a forward pass through hidden layers of the generative model, and wherein an output layer of the generative model can synthesize as output the first text based on hidden activation maps produced by the hidden layers of the generative model.

CLAUSE 4: The system of any preceding clause can be implemented, wherein the computer-executable components can comprise: a gap component that can search an available software feature repository for one or more available software features that address or solve the problem described by the first text, wherein each available software feature in the available software feature repository corresponds to a respective textual description, and wherein the gap component can facilitate such searching by: comparing embeddings respectively produced by the generative model for the textual descriptions in the available software feature repository to an embedding produced by the generative model for the first text; or identifying textual descriptions in the available software feature repository that recite one or more keywords that are present in the first text.

CLAUSE 5: The system of any preceding clause can be implemented, wherein the computer-executable components can comprise: a gap component that can: identify a set of available software features that potentially address or solve the problem described by the first text; generate, via execution of a trained re-ranker with respect to the first text, a set of similarity scores respectively corresponding to the set of available software features; and conclude that whichever, if any, of the set of available software features have similarity scores that satisfy a threshold similarity value actually address or solve the problem described by the first text.

CLAUSE 6: The system of any preceding clause can be implemented, wherein the computer-executable components can comprise: a gap component that can: identify a set of available software features that potentially address or solve the problem described by the first text; and execute the generative model on the first text, on respective textual descriptions of the set of available software features, and on a helpfulness prompt, thereby causing the generative model to synthesize second texts that explain which, if any, of the set of available software features actually address or solve the problem described by the first text.

CLAUSE 7: The system of any preceding clause can be implemented, wherein the computer-executable components can comprise: a solution component that, in response to identification of an available software feature that addresses or solves the problem described by the first text, can transmit to the computing device of the client an electronic notification identifying the available software feature.

CLAUSE 8: The system of any preceding clause can be implemented, wherein the solution component can execute the generative model on the first text, on a respective textual description of the available software feature, and on a tutorial prompt, thereby causing the generative model to synthesize second text that explains how to implement or access the available software feature using the software product, and wherein the electronic notification comprises the second text.

In various cases, any combination or combinations of CLAUSES 1-8 can be implemented.

CLAUSE 9: A computer-implemented method can comprise: accessing, by a device operatively coupled to a processor, an electronic interaction record that is provided by a computing device of a client and that pertains to a software product used by the client; and synthesizing, by the device and via execution of a generative model on the electronic interaction record, first text that describes a problem afflicting the software product that is suggested by the electronic interaction record.

CLAUSE 10: The computer-implemented method of any preceding clause can be implemented, wherein the electronic interaction record can comprise: a textual conversation between the computing device of the client and a chatbot associated with the software product; an audio recording captured by a microphone of the computing device and containing verbal questions, complaints, or exclamations spoken by the client during use of the software product; a video recording captured by a camera of the computing device and showing facial expressions or body language of the client during use of the software product; a user-interface tracking log captured by the computing device and showing where the client has clicked, moved, or scrolled within a user-interface of the software product; or a textual document typed on the computing device and pertaining to the software product.

CLAUSE 11: The computer-implemented method of any preceding clause can be implemented, wherein an input layer of the generative model can receive both the electronic interaction record and a problem identification prompt, wherein both the electronic interaction record and the problem identification prompt can complete a forward pass through hidden layers of the generative model, and wherein an output layer of the generative model can synthesize as output the first text based on hidden activation maps produced by the hidden layers of the generative model.

CLAUSE 12: The computer-implemented method of any preceding clause can be implemented, further comprising: searching, by the device, an available software feature repository for one or more available software features that address or solve the problem described by the first text, wherein each available software feature in the available software feature repository corresponds to a respective textual description, and wherein the device can facilitate such searching by: comparing embeddings respectively produced by the generative model for the textual descriptions in the available software feature repository to an embedding produced by the generative model for the first text; or identifying textual descriptions in the available software feature repository that recite one or more keywords that are present in the first text.

CLAUSE 13: The computer-implemented method of any preceding clause can be implemented, further comprising: identifying, by the device, a set of available software features that potentially address or solve the problem described by the first text; generating, by the device and via execution of a trained re-ranker with respect to the first text, a set of similarity scores respectively corresponding to the set of available software features; and concluding, by the device, that whichever, if any, of the set of available software features have similarity scores that satisfy a threshold similarity value actually address or solve the problem described by the first text.

CLAUSE 14: The computer-implemented method of any preceding clause can be implemented, further comprising: identifying, by the device, a set of available software features that potentially address or solve the problem described by the first text; and executing, by the device, the generative model on the first text, on respective textual descriptions of the set of available software features, and on a helpfulness prompt, thereby causing the generative model to synthesize second texts that explain which, if any, of the set of available software features actually address or solve the problem described by the first text.

CLAUSE 15: The computer-implemented method of any preceding clause can be implemented, further comprising: in response to identification of an available software feature that addresses or solves the problem described by the first text, transmitting, by the device and to the computing device of the client, an electronic notification identifying the available software feature.

CLAUSE 16: The computer-implemented method of any preceding clause can be implemented, further comprising: executing, by the device, the generative model on the first text, on a respective textual description of the available software feature, and on a tutorial prompt, thereby causing the generative model to synthesize second text that explains how to implement or access the available software feature using the software product, and wherein the electronic notification comprises the second text.

In various cases, any combination or combinations of CLAUSES 9-16 can be implemented.

CLAUSE 17: A computer program product for facilitating automatic product support systems and methods via generative artificial intelligence and customer interactions can comprise a non-transitory computer-readable memory having program instructions embodied therewith, wherein the program instructions can be executable by a processor to cause the processor to: access an electronic interaction record that is provided by a computing device of a client and that pertains to a software product used by the client; synthesize, via execution of a generative model on the electronic interaction record, first text that describes a problem afflicting the software product that is suggested by the electronic interaction record; search an available software feature repository for an available software feature that solves the problem described by the first text; and return to the computing device an electronic notification indicating the available software feature and including a textual tutorial explaining how to implement the available software feature.

CLAUSE 18: The computer program product of any preceding clause can be implemented, wherein the electronic interaction record can comprise: a textual conversation between the computing device of the client and a chatbot associated with the software product; an audio recording captured by a microphone of the computing device and containing verbal questions, complaints, or exclamations spoken by the client during use of the software product; a video recording captured by a camera of the computing device and showing facial expressions or body language of the client during use of the software product; a user-interface tracking log captured by the computing device and showing where the client has clicked, moved, or scrolled within a user-interface of the software product; or a textual document typed on the computing device and pertaining to the software product.

CLAUSE 19: The computer program product of any preceding clause can be implemented, wherein an input layer of the generative model can receive both the electronic interaction record and a problem identification prompt, wherein both the electronic interaction record and the problem identification prompt can complete a forward pass through hidden layers of the generative model, and wherein an output layer of the generative model can synthesize as output the first text based on hidden activation maps produced by the hidden layers of the generative model.

CLAUSE 20: The computer program product of any preceding clause can be implemented, wherein each available software feature in the available software feature repository can correspond to a respective textual description, and wherein the processor can facilitate the search by: comparing embeddings respectively produced by the generative model for the textual descriptions in the available software feature repository to an embedding produced by the generative model for the first text; or identifying textual descriptions in the available software feature repository that recite one or more keywords that are present in the first text.

In various cases, any combination or combinations of CLAUSES 17-20 can be implemented.

CLAUSE 21: A system can comprise: a processor that can execute computer-executable components stored in a non-transitory computer-readable memory, wherein the computer-executable components can comprise: a gap component that can determine, based on executing a generative model on an electronic client interaction record associated with a software product, whether there is an available software feature that addresses or solves a problem afflicting the software product; and a solution component that, in response to a determination that there is no available software feature that addresses or solves the problem, can synthesize, via execution of the generative model, a recommended design alteration to the software product that would address or solve the problem.

CLAUSE 22: The system of any preceding clause can be implemented, wherein: the recommended design alteration can comprise synthetic text or synthetic diagrams describing or showing how a code base of the software product should be redesigned to address or solve the problem, and wherein the solution component can transmit, to a computing device associated with a technician of the software product, an electronic message instructing that the code base be edited in accordance with the recommended design alteration; or the recommended design alteration can comprise one or more synthesized lines of computer code an insertion of which into the code base of the software product would address or solve the problem, and wherein the solution component can insert the one or more synthesized lines of computer code into the code base.

CLAUSE 23: The system of any preceding clause can be implemented, wherein the electronic client interaction record can comprise: a textual conversation between a computing device of a client and a chatbot associated with the software product; an audio recording captured by a microphone of the computing device and containing verbal questions, complaints, or exclamations spoken by the client during use of the software product; a video recording captured by a camera of the computing device and showing facial expressions or body language of the client during use of the software product; a user-interface tracking log captured by the computing device and showing where the client has clicked, moved, or scrolled within a user-interface of the software product; or a textual document typed on the computing device and pertaining to the software product.

CLAUSE 24: The system of any preceding clause can be implemented, wherein an input layer of the generative model can receive first text describing the problem and a solution generation prompt, wherein both the first text and the solution generation prompt can complete a forward pass through hidden layers of the generative model, and wherein an output layer of the generative model can synthesize as output the recommended design alteration based on hidden activation maps produced by the hidden layers of the generative model.

CLAUSE 25: The system of any preceding clause can be implemented, wherein the solution component can search a technical document repository for one or more technical documents that are relevant to addressing or solving the problem, wherein the solution component can facilitate such searching by: comparing embeddings respectively produced by the generative model for technical documents in the technical document repository to an embedding produced by generative model for the first text; or identifying technical documents in the technical document repository that recite one or more keywords that are present in the first text; and wherein the input layer of the generative model can receive the one or more technical documents in addition to the first text and the solution generation prompt.

CLAUSE 26: The system of any preceding clause can be implemented, wherein the solution generation prompt can instruct the generative model to identify, by referring to the one or more technical documents, how to redesign or alter the software product to fix the problem.

CLAUSE 27: The system of any preceding clause can be implemented, wherein the solution generation prompt can further instruct the generative model to: identify, by referring to the one or more technical documents, a personnel role at a manufacturer of the software product to whose attention the problem should be brought; and tailor a text-image-code proportion of the recommended design alteration to the personnel role.

CLAUSE 28: The system of any preceding clause can be implemented, wherein the recommended design alteration can comprise reference indicators that point to which of the one or more technical documents that the generative model relied upon to synthesize the recommended design alteration.

CLAUSE 29: The system of any preceding clause can be implemented, wherein the one or more technical documents that are relevant to addressing or solving the problem can comprise: chapters or sections of an operating manual of the software product; service log entries recorded by the software product; standard operating procedures promulgated by a manufacturer of the software product; or sections of a code base of the software product.

In various cases, any combination or combinations of CLAUSES 21-29 can be implemented.

CLAUSE 30: A computer-implemented method can comprise: determining, by a device operatively coupled to a processor and based on executing a generative model on an electronic client interaction record associated with a software product, whether there is an available software feature that addresses or solves a problem afflicting the software product; and in response to a determination that there is no available software feature that addresses or solves the problem, synthesizing, by the device and via execution of the generative model, a recommended design alteration to the software product that would address or solve the problem.

CLAUSE 31: The computer-implemented method of any preceding clause can be implemented, wherein the recommended design alteration can comprise synthetic text or synthetic diagrams describing or showing how a code base of the software product should be redesigned to address or solve the problem, and further comprising: transmitting, by the device and to a computing device associated with a technician of the software product, an electronic message instructing that the code base be edited in accordance with the recommended design alteration; or the recommended design alteration can comprise one or more synthesized lines of computer code an insertion of which into the code base of the software product would address or solve the problem, and further comprising: inserting, by the device, the one or more synthesized lines of computer code into the code base.

CLAUSE 32: The computer-implemented method of any preceding clause can be implemented, wherein the electronic client interaction record can comprise: a textual conversation between a computing device of a client and a chatbot associated with the software product; an audio recording captured by a microphone of the computing device and containing verbal questions, complaints, or exclamations spoken by the client during use of the software product; a video recording captured by a camera of the computing device and showing facial expressions or body language of the client during use of the software product; a user-interface tracking log captured by the computing device and showing where the client has clicked, moved, or scrolled within a user-interface of the software product; or a textual document typed on the computing device and pertaining to the software product.

CLAUSE 33: The computer-implemented method of any preceding clause can be implemented, wherein an input layer of the generative model can receive first text describing the problem and a solution generation prompt, wherein both the first text and the solution generation prompt can complete a forward pass through hidden layers of the generative model, and wherein an output layer of the generative model can synthesize as output the recommended design alteration based on hidden activation maps produced by the hidden layers of the generative model.

CLAUSE 34: The computer-implemented method of any preceding clause can be implemented, further comprising: searching, by the device, a technical document repository for one or more technical documents that are relevant to addressing or solving the problem, wherein the device can facilitate such searching by: comparing embeddings respectively produced by the generative model for technical documents in the technical document repository to an embedding produced by generative model for the first text; or identifying technical documents in the technical document repository that recite one or more keywords that are present in the first text; and wherein the input layer of the generative model can receive the one or more technical documents in addition to the first text and the solution generation prompt.

CLAUSE 35: The computer-implemented method of any preceding clause can be implemented, wherein the solution generation prompt can instruct the generative model to identify, by referring to the one or more technical documents, how to redesign or alter the software product to fix the problem.

CLAUSE 36: The computer-implemented method of any preceding clause can be implemented, wherein the solution generation prompt can further instruct the generative model to: identify, by referring to the one or more technical documents, a personnel role at a manufacturer of the software product to whose attention the problem should be brought; and tailor a text-image-code proportion of the recommended design alteration to the personnel role.

CLAUSE 37: The computer-implemented method of any preceding clause can be implemented, wherein the recommended design alteration can comprise reference indicators that point to which of the one or more technical documents that the generative model relied upon to synthesize the recommended design alteration.

CLAUSE 38: The computer-implemented method of any preceding clause can be implemented, wherein the one or more technical documents that are relevant to addressing or solving the problem can comprise: chapters or sections of an operating manual of the software product; service log entries recorded by the software product; standard operating procedures promulgated by a manufacturer of the software product; or sections of a code base of the software product.

In various cases, any combination or combinations of CLAUSES 30-38 can be implemented.

CLAUSE 39: A computer program product for facilitating automatic product support systems and methods via generative artificial intelligence and customer interactions can comprise a non-transitory computer-readable memory having program instructions embodied therewith, wherein the program instructions can be executable by a processor to cause the processor to: determine, based on executing a generative model on an electronic client interaction record associated with a software product, whether there is an available software feature that addresses or solves a problem afflicting the software product; in response to a determination that there is no available software feature that addresses or solves the problem, synthesize, via execution of the generative model, a recommended design alteration comprising one or more synthesized lines of computer code an insertion of which into a code base of the software product would address or solve the problem; and insert the one or more synthesized lines of computer code into the code base of the software product.

CLAUSE 40: The computer program product of any preceding clause can be implemented, wherein the electronic client interaction record can comprise: a textual conversation between a computing device of a client and a chatbot associated with the software product; an audio recording captured by a microphone of the computing device and containing verbal questions, complaints, or exclamations spoken by the client during use of the software product; a video recording captured by a camera of the computing device and showing facial expressions or body language of the client during use of the software product; a user-interface tracking log captured by the computing device and showing where the client has clicked, moved, or scrolled within a user-interface of the software product; or a textual document typed on the computing device and pertaining to the software product.

In various cases, any combination or combinations of CLAUSES 39-40 can be implemented.

In various cases, any combination or combinations of CLAUSES 21-40 can be implemented.

In various cases, any combination or combinations of CLAUSES 1-40 can be implemented.

What is claimed is:

1. A system, comprising:
a processor that executes computer-executable instructions stored in a non-transitory computer-readable memory, wherein execution of the computer-executable instructions causes the processor to:
access a deficiency description, wherein the deficiency description is natural language text describing a software deficiency afflicting a software application;
access a software feature repository comprising a plurality of software features each being a respective plug-in, add-on, or functionality that is already coded for, developed for, or part of the software application, wherein each of the plurality of software features is described by a respective textual description;
determine whether available software features in the software feature repository address or solve the software deficiency, wherein such determining comprises at least one of:
comparing first embeddings respectively produced by a generative model for textual descriptions in the software feature repository to an embedding produced by the generative model for the deficiency description; or
identifying textual descriptions in the software feature repository that recite one or more first keywords that are present in the deficiency description;
feed, in response to determining that there is an available software feature in the software feature repository that addresses or solves the software deficiency, to an input layer of the generative model the deficiency description, a textual description corresponding to the available software feature, and a tutorial prompt instructing the generative model to synthesize a text string, a diagram, or a video teaching a user of the software application how to activate or utilize the available software feature, wherein the deficiency description, the textual description, and the tutorial prompt complete a first forward pass through hidden layers of the generative model, and wherein an output layer of the generative model synthesizes as first output the text string, the diagram, or the video based on first hidden activation maps produced by the hidden layers of the generative model;

search, in response to determining that there is no available software feature in the software feature repository that addresses or solves the software deficiency, a technical document repository for one or more technical documents that are relevant to addressing or solving the software deficiency, wherein such searching comprises at least one of:

comparing second embeddings respectively produced by the generative model for technical documents in the technical document repository to the embedding produced by the generative model for the deficiency description; or identifying technical documents in the technical document repository that recite one or more second keywords that are present in the deficiency description; and feed to the input layer of the generative model the deficiency description, the one or more technical documents, and a solution generation prompt instructing the generative model to identify, by referring to the one or more technical documents, how to redesign or alter the software application to fix the software deficiency, wherein the deficiency description, the one or more technical documents, and the solution generation prompt complete a second forward pass through the hidden layers of the generative model, and wherein the output layer of the generative model synthesizes as second output a recommended design alteration to the software application based on second hidden activation maps produced by the hidden layers of the generative model.

2. The system of claim 1, wherein:

the recommended design alteration comprises synthetic text or synthetic diagrams describing or showing how a code base of the software application should be redesigned to address or solve the software deficiency, and wherein the processor transmits, to a computing device associated with a technician of the software application, an electronic message instructing that the code base be edited in accordance with the recommended design alteration; or the recommended design alteration comprises one or more synthesized lines of computer code an insertion of which into the code base of the software application would address or solve the software deficiency, and wherein the processor inserts the one or more synthesized lines of computer code into the code base.

3. The system of claim 1;

wherein execution of the computer-executable instructions further causes the processor to determine whether a past electronic client interaction record pertains to the software deficiency;

wherein the searching is in response to both:

determining that there is no available software feature in the software feature repository that addresses or solves the software deficiency; and determining that the past electronic client interaction record pertains to the software deficiency; and wherein the past electronic client interaction record comprises at least one of:

a textual conversation between a computing device of a client and a chatbot associated with the software application;

an audio recording captured by a microphone of the computing device and containing verbal questions, complaints, or exclamations spoken by the client during use of the software application;

a video recording captured by a camera of the computing device and showing facial expressions or body language of the client during use of the software application;

a user-interface tracking log captured by the computing device and showing where the client has clicked, moved, or scrolled within a user-interface of the software application; or a textual document typed on the computing device and pertaining to the software application.

4. The system of claim 3, wherein the determining whether the past electronic client interaction record pertains to the software deficiency comprises:

feeding to the input layer of the generative model the deficiency description, the past electronic client interaction record, and a common deficiency prompt instructing the generative model to determine whether or not the past electronic client interaction indicates or suggests the same deficiency as the deficiency description, wherein the deficiency description, the past electronic client interaction record, and the common deficiency prompt complete a third forward pass through the hidden layers of the generative model, and wherein the output layer of the generative model synthesizes as third output text answering the common deficiency prompt based on third hidden activation maps produced by the hidden layers of the generative model.

5. The system of claim 1:

wherein the comparing the first embeddings or the identifying the textual descriptions reveals a potentially-relevant available software feature in the software feature repository that might potentially address or solve the software deficiency; and wherein execution of the computer-executable instructions further causes the processor to:

feed to the input layer of the generative model the deficiency description, another textual description of the potentially-relevant software feature, and a helpfulness prompt instructing the generative model to determine whether or not the potentially-relevant software feature would help to address or solve the software deficiency, wherein the deficiency description, the another textual description, and the helpfulness prompt complete a third forward pass through the hidden layers of the generative model, and wherein the output layer of the generative model synthesizes as third output text answering the helpfulness prompt based on third hidden activation maps produced by the hidden layers of the generative model.

6. The system of claim 1, wherein execution of the computer-executable instructions further causes the processor to:

access feedback indicating a client's audible reaction or body language reaction to the recommended design alteration; and feed to the input layer of the generative model the recommended design alteration, the feedback, and an acceptability prompt instructing the generative model to determine whether or not the feedback indicates or suggests that the recommended design alteration is acceptable to the client, wherein the recommended design alteration, the feedback, and the acceptability prompt complete a third forward pass through the hidden layers of the generative model, and wherein the output layer of the generative model synthesizes as third output text answering the acceptability prompt based on third hidden activation maps produced by the hidden layers of the generative model.

7. The system of claim 1, wherein the solution generation prompt further instructs the generative model to:

identify, by referring to the one or more technical documents, a personnel role at a manufacturer of the software application to whose attention the software deficiency should be brought; and tailor a text-image-code proportion of the recommended design alteration to the personnel role.

8. The system of claim 1, wherein the recommended design alteration comprises reference indicators that point to which of the one or more technical documents that the generative model relied upon to synthesize the recommended design alteration.

9. The system of claim 1, wherein the one or more technical documents that are relevant to addressing or solving the software deficiency comprise:

chapters or sections of an operating manual of the software application;

service log entries recorded by the software application;

standard operating procedures promulgated by a manufacturer of the software application; or sections of a code base of the software application.

10. A computer-implemented method, comprising:

accessing, by a device operatively coupled to a processor, a deficiency description, wherein the deficiency description is natural language text describing a software deficiency afflicting a software application;

accessing, by the device, a software feature repository comprising a plurality of software features each being a respective plug-in, add-on, or functionality that is already coded for, developed for, or part of the software application, wherein each of the plurality of software features is described by a respective textual description;

determining, by the device, whether available software features in the software feature repository address or solve the software deficiency, wherein such determining comprises at least one of:

comparing first embeddings respectively produced by a generative model for textual descriptions in the software feature repository to an embedding produced by the generative model for the deficiency description; or identifying textual descriptions in the software feature repository that recite one or more first keywords that are present in the deficiency description;

feeding, by the device and in response to determining that there is an available software feature in the software feature repository that addresses or solves the software deficiency, to an input layer of the generative model the deficiency description, a textual description corresponding to the available software feature, and a tutorial prompt instructing the generative model to synthesize a text string, a diagram, or a video teaching a user of the software application how to activate or utilize the available software feature, wherein the deficiency description, the textual description, and the tutorial prompt complete a first forward pass through hidden layers of the generative model, and wherein an output layer of the generative model synthesizes as first output the text string, the diagram, or the video based on first hidden activation maps produced by the hidden layers of the generative model searching, by the device and in response to determining that there is no available software feature in the software feature repository that addresses or solves the software deficiency, a technical document repository for one or more technical documents that are relevant to addressing or solving the software deficiency, wherein such searching comprises at least one of:

comparing second embeddings respectively produced by the generative model for technical documents in the technical document repository to the embedding produced by the generative model for the deficiency description; or identifying technical documents in the technical document repository that recite one or more second keywords that are present in the deficiency description; and feeding, by the device, to the input layer of the generative model the deficiency description, the one or more technical documents, and a solution generation prompt instructing the generative model to identify, by referring to the one or more technical documents, how to redesign or alter the software application to fix the software deficiency, wherein the deficiency description, the one or more technical documents, and the solution generation prompt complete a second forward pass through the hidden layers of the generative model, and wherein the output layer of the generative model synthesizes as first output a recommended design alteration to the software application based on second hidden activation maps produced by the hidden layers of the generative model.

11. The computer-implemented method of claim 10, wherein:

the recommended design alteration comprises synthetic text or synthetic diagrams describing or showing how a code base of the software application should be redesigned to address or solve the software deficiency, and further comprising transmitting, by the device and to a computing device associated with a technician of the software application, an electronic message instructing that the code base be edited in accordance with the recommended design alteration; or the recommended design alteration comprises one or more synthesized lines of computer code an insertion of which into the code base of the software application would address or solve the software deficiency, and further comprising inserting, by the device, the one or more synthesized lines of computer code into the code base.

12. The computer-implemented method of claim 10:

wherein the computer-implemented method further comprises determining, by the device, whether a past electronic client interaction record pertains to the software deficiency;

wherein the searching is in response to both:

determining that there is no available software feature in the software feature repository that addresses or solves the software deficiency; and determining that the past electronic client interaction record pertains to the software deficiency; and wherein the past electronic client interaction record comprises at least one of:

a textual conversation between a computing device of a client and a chatbot associated with the software application;

an audio recording captured by a microphone of the computing device and containing verbal questions, complaints, or exclamations spoken by the client during use of the software application;

a video recording captured by a camera of the computing device and showing facial expressions or body language of the client during use of the software application;

a user-interface tracking log captured by the computing device and showing where the client has clicked, moved, or scrolled within a user-interface of the software application; or a textual document typed on the computing device and pertaining to the software application.

13. The computer-implemented method of claim 12, wherein the determining whether the past electronic client interaction record pertains to the software deficiency comprises:

feeding to the input layer of the generative model the deficiency description, the past electronic client interaction record, and a common deficiency prompt instructing the generative model to determine whether or not the past electronic client interaction indicates or suggests the same deficiency as the deficiency description, wherein the deficiency description, the past electronic client interaction record, and the common deficiency prompt complete a third forward pass through the hidden layers of the generative model, and wherein the output layer of the generative model synthesizes as third output text answering the common deficiency prompt based on third hidden activation maps produced by the hidden layers of the generative model.

14. The computer-implemented method of claim 10:

wherein the comparing the first embeddings or the identifying the textual descriptions reveals a potentially-relevant available software feature in the software feature repository that might potentially address or solve the software deficiency; and wherein the computer-implemented method further comprises feeding, by the device, to the input layer of the generative model the deficiency description, another textual description of the potentially-relevant software feature, and a helpfulness prompt instructing the generative model to determine whether or not the potentially-relevant software feature would help to address or solve the software deficiency, wherein the deficiency description, the another textual description, and the helpfulness prompt complete a third forward pass through the hidden layers of the generative model, and wherein the output layer of the generative model synthesizes as third output text answering the helpfulness prompt based on third hidden activation maps produced by the hidden layers of the generative model.

15. The computer-implemented method of claim 10, further comprising:

accessing, by the device, feedback indicating a client's audible reaction or body language reaction to the recommended design alteration; and feeding, by the device, to the input layer of the generative model the recommended design alteration, the feedback, and an acceptability prompt instructing the generative model to determine whether or not the feedback indicates or suggests that the recommended design alteration is acceptable to the client, wherein the recommended design alteration, the feedback and the acceptability prompt complete a third forward pass through the hidden layers of the generative model, and wherein the output layer of the generative model synthesizes as third output text answering the acceptability prompt based on third hidden activation maps produced by the hidden layers of the generative model.

16. The computer-implemented method of claim 10, wherein the solution generation prompt further instructs the generative model to:

identify, by referring to the one or more technical documents, a personnel role at a manufacturer of the software application to whose attention the software deficiency should be brought; and tailor a text-image-code proportion of the recommended design alteration to the personnel role.

17. The computer-implemented method of claim 10, wherein the recommended design alteration comprises reference indicators that point to which of the one or more technical documents that the generative model relied upon to synthesize the recommended design alteration.

18. The computer-implemented method of claim 10, wherein the one or more technical documents that are relevant to addressing or solving the software deficiency comprise:

chapters or sections of an operating manual of the software application;

service log entries recorded by the software application;

standard operating procedures promulgated by a manufacturer of the software application; or sections of a code base of the software application.

19. A computer program product for facilitating client-tailored software application alteration via generative models, the computer program product comprising a non-transitory computer-readable memory having program instructions embodied therewith, the program instructions executable by a processor to cause the processor to:

access a deficiency description, wherein the deficiency description is natural language text describing a software deficiency afflicting a software application;

access a software feature repository comprising a plurality of software features each being a respective plug-in, add-on, or functionality that is already coded for, developed for, or part of the software application, wherein each of the plurality of software features is described by a respective textual description;

determine whether available software features in the software feature repository address or solve the software deficiency, wherein such determining comprises at least one of:

comparing first embeddings respectively produced by a generative model for textual descriptions in the software feature repository to an embedding produced by the generative model for the deficiency description; or identifying textual descriptions in the software feature repository that recite one or more first keywords that are present in the deficiency description;

feed, in response to determining that there is an available software feature in the software feature repository that addresses or solves the software deficiency, to an input layer of the generative model the deficiency description, a textual description corresponding to the available software feature, and a tutorial prompt instructing the generative model to synthesize a text string, a diagram, or a video teaching a user of the software application how to activate or utilize the available software feature, wherein the deficiency description, the textual description, and the tutorial prompt complete a first forward pass through hidden layers of the generative model, and wherein an output layer of the generative model synthesizes as first output the text string, the diagram, or the video based on first hidden activation maps produced by the hidden layers of the generative model search, in response to determining that there is no available software feature in the software feature repository that addresses or solves the software deficiency, a technical document repository for one or more technical documents that are relevant to addressing or solving the software deficiency, wherein such searching comprises at least one of:

comparing second embeddings respectively produced by the generative model for technical documents in the technical document repository to the embedding produced by the generative model for the deficiency description; or identifying technical documents in the technical document repository that recite one or more second keywords that are present in the deficiency description;

feed to the input layer of the generative model the deficiency description, the one or more technical documents, and a solution generation prompt instructing the generative model to identify, by referring to the one or more technical documents, how to redesign or alter the software application to fix the software deficiency, wherein the deficiency description, the one or more technical documents, and the solution generation prompt complete a second forward pass through the hidden layers of the generative model, and wherein the output layer of the generative model synthesizes as second output a recommended design alteration to the software application based on second hidden activation maps produced by the hidden layers of the generative model, wherein the recommended design alteration comprises one or more synthesized lines of computer code an insertion of which into a code base of the software application would address or solve the software deficiency; and insert the one or more synthesized lines of computer code into the code base of the software application.

20. The computer program product of claim 19, wherein the generative model creates the deficiency description based on being executed on an electronic client interaction record that comprises at least one of:

a textual conversation between a computing device of a client and a chatbot associated with the software application;

an audio recording captured by a microphone of the computing device and containing verbal questions, complaints, or exclamations spoken by the client during use of the software application;

a video recording captured by a camera of the computing device and showing facial expressions or body language of the client during use of the software application;

a user-interface tracking log captured by the computing device and showing where the client has clicked, moved, or scrolled within a user-interface of the software application; or a textual document typed on the computing device and pertaining to the software application.

* * * * *